US010908366B2

(12) United States Patent
Zimmel et al.

(10) Patent No.: US 10,908,366 B2
(45) Date of Patent: Feb. 2, 2021

(54) MULTI-FIBER FERRULE-LESS DUPLEX FIBER OPTIC CONNECTORS WITH MULTI-FIBER ALIGNMENT DEVICES

(71) Applicant: COMMSCOPE TECHNOLOGIES LLC, Hickory, NC (US)

(72) Inventors: Steven C. Zimmel, Hickory, NC (US); Michael James Ott, Hickory, NC (US); Danny Willy August Verheyden, Hickory, NC (US); Michael Aaron Kadar-Kallen, Hickory, NC (US); Gary William Adams, Hickory, NC (US); Robert Charles Flaig, Hickory, NC (US); Gregory J. Schaible, Hickory, NC (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/466,766

(22) PCT Filed: Dec. 5, 2017

(86) PCT No.: PCT/US2017/064671
§ 371 (c)(1),
(2) Date: Jun. 5, 2019

(87) PCT Pub. No.: WO2018/144128
PCT Pub. Date: Aug. 9, 2018

(65) Prior Publication Data
US 2019/0346627 A1 Nov. 14, 2019

Related U.S. Application Data

(60) Provisional application No. 62/430,343, filed on Dec. 5, 2016, provisional application No. 62/565,323, filed on Sep. 29, 2017.

(51) Int. Cl.
*G02B 6/38* (2006.01)
*G02B 6/36* (2006.01)

(52) U.S. Cl.
CPC ......... *G02B 6/3809* (2013.01); *G02B 6/3806* (2013.01); *G02B 6/364* (2013.01); *G02B 6/3885* (2013.01)

(58) Field of Classification Search
CPC .. G02B 6/3809; G02B 6/3806; G02B 6/3885; G02B 6/364
See application file for complete search history.

(56) References Cited

U.S. PATENT DOCUMENTS 4,274,708 A 6/1981 Cocito et al.
4,634,216 A 1/1987 Calevo et al.
(Continued)

FOREIGN PATENT DOCUMENTS

EP 1 406 102 A1 4/2004
EP 2 549 313 A1 1/2013
(Continued)

OTHER PUBLICATIONS

International Search Report and Written Opinion of the International Searching Authority for corresponding International Patent Application No. PCT/US2017/064671 dated Dec. 11, 2018, 19 pages.
(Continued)

*Primary Examiner* — Leslie C Pascal
(74) *Attorney, Agent, or Firm* — Merchant & Gould P.C.

(57) ABSTRACT

Aspects and techniques of the present disclosure relate to an alignment device that includes a groove-type alignment structure with a support region for receiving an optical fiber inserted along a fiber insertion axis. The optical fiber has a first side and a second, opposite side. The groove-type alignment structure engages the first side of the optical fiber.
(Continued)

The alignment device includes a stabilization structure that engages the first side of the optical fiber and a first angled transition surface that engages the second, opposite side of the optical fiber. The present disclosure also relates to an alignment system that includes a first housing piece; a second housing piece adapted to mate with the first housing piece; and a flat structure positioned between the first and second housing pieces.

8 Claims, 64 Drawing Sheets

(56) References Cited

U.S. PATENT DOCUMENTS

| | | | |
|---|---|---|---|
| 4,676,589 | A | 6/1987 | Miyashita et al. |
| 5,742,718 | A * | 4/1998 | Harman .............. A61B 18/24 385/53 |
| 6,132,105 | A * | 10/2000 | Konda .............. G02B 6/3839 385/65 |
| 6,142,676 | A | 11/2000 | Lu |
| 6,779,931 | B2 | 8/2004 | Murata et al. |
| 7,641,397 | B2 | 1/2010 | Koreeda et al. |
| 8,870,466 | B2 | 10/2014 | Lu |
| 9,575,263 | B2 | 2/2017 | Gurreri et al. |
| 9,759,869 | B2 * | 9/2017 | Verheyden .............. G02B 6/3825 |
| 10,197,745 | B2 * | 2/2019 | Watte .............. G02B 6/3885 |
| 2002/0035310 | A1 | 3/2002 | Akui et al. |
| 2005/0148884 | A1 | 7/2005 | Parks et al. |
| 2005/0265666 | A1 | 12/2005 | Johnson |
| 2010/0076461 | A1 | 3/2010 | Viola et al. |
| 2013/0071066 | A1 | 3/2013 | Lu |
| 2016/0097904 | A1 | 4/2016 | Eberle et al. |

FOREIGN PATENT DOCUMENTS

| | | |
|---|---|---|
| EP | 2 549 314 A1 | 1/2013 |
| JP | S57-139716 A | 8/1982 |
| JP | S59-064808 A | 4/1984 |
| WO | 2012/112344 A1 | 8/2012 |
| WO | 2013/117598 A2 | 8/2013 |
| WO | 2015/048198 A1 | 4/2015 |
| WO | 2016/043922 A1 | 3/2016 |
| WO | 2017/192461 A2 | 11/2017 |
| WO | 2018/017883 A1 | 1/2018 |
| WO | 2018/020022 A1 | 2/2018 |

OTHER PUBLICATIONS

SF Connector Optical Interface for Parallel Optical Module, Nippon Telegraph and Telephone Company, 4 pages (2010); http://www.ntt.co.jp/ntt-tec/e/high-tec/ct2-c002.html, downloaded Nov. 22, 2016.
Partial Supplementary European Search Report for corresponding European Patent Application No. 17895010.1 dated Jul. 2, 2020, 12 pages.
Extended European Search Report for corresponding European Patent Application No. 17895010.1 dated Oct. 16, 2020, 12 pages.

* cited by examiner

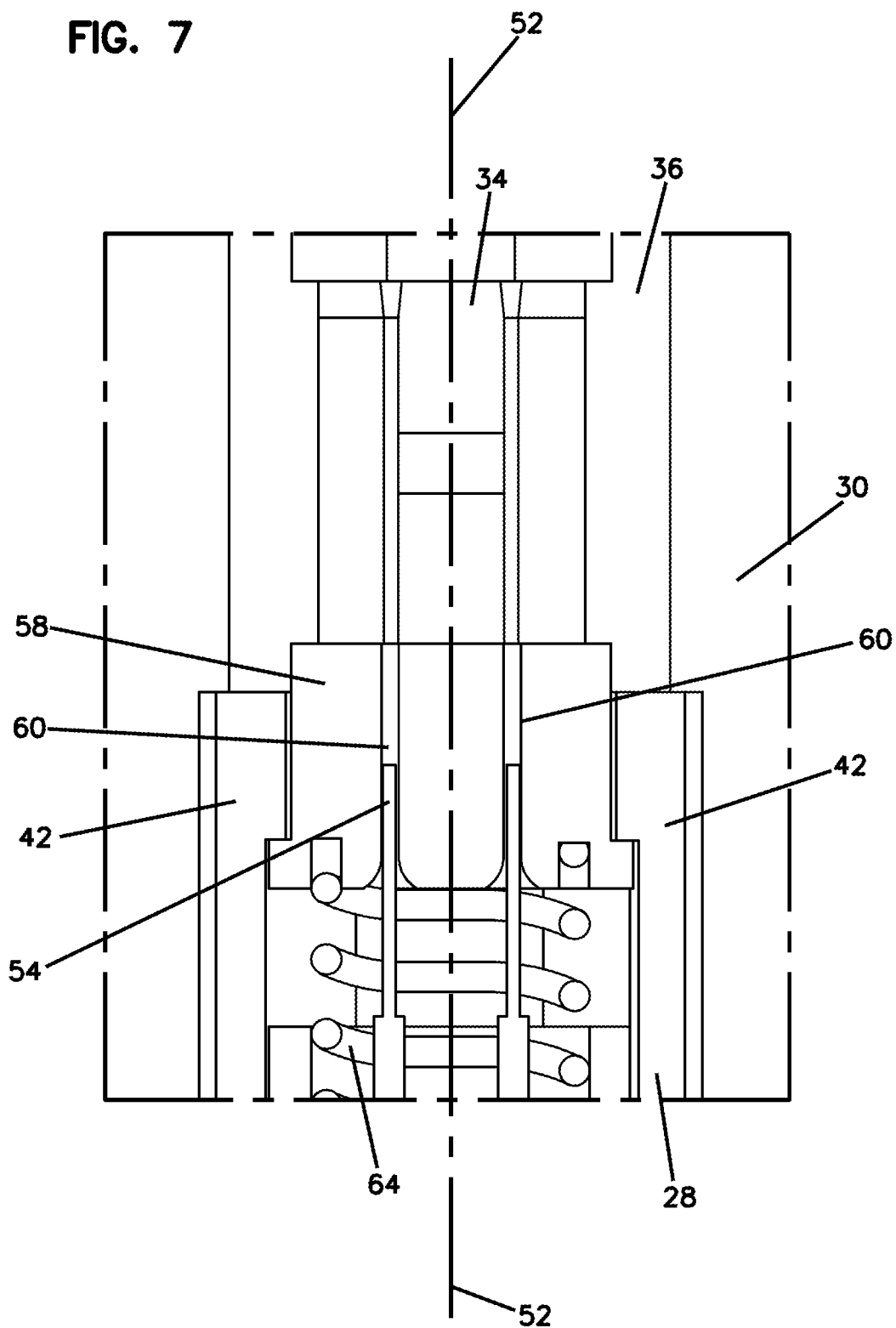

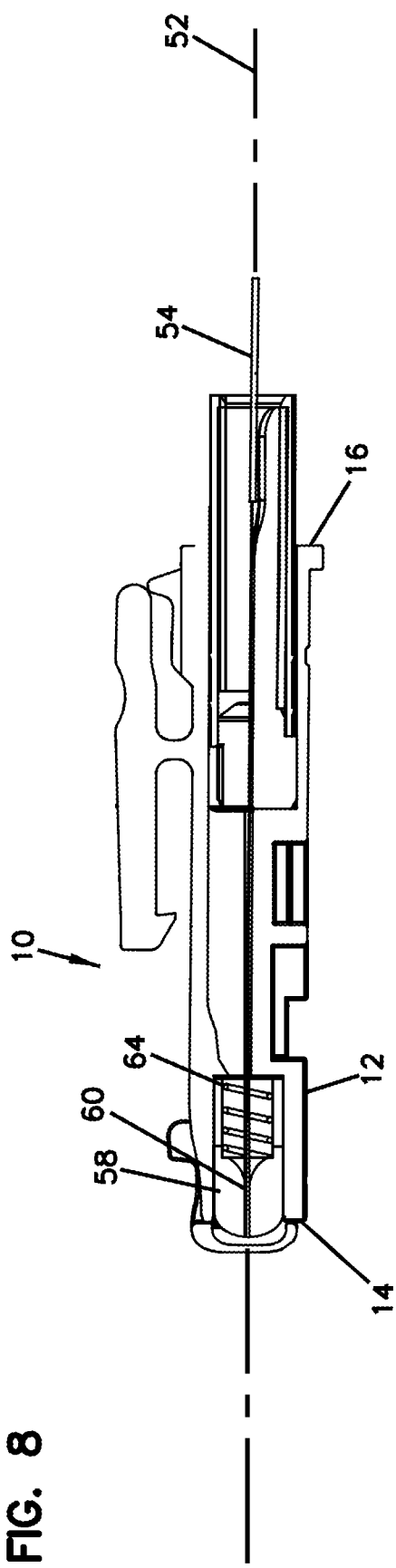
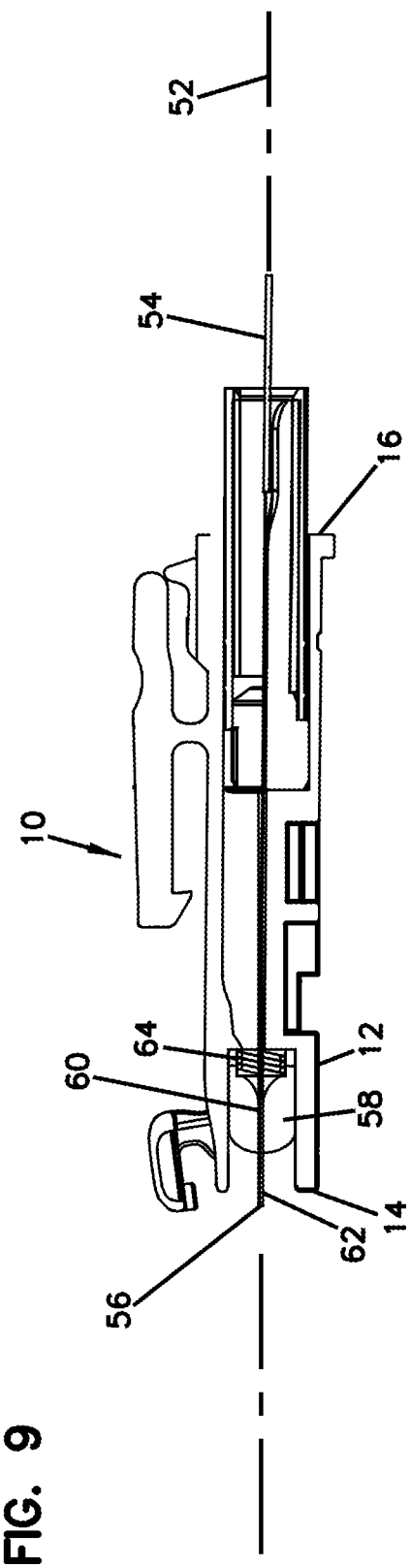

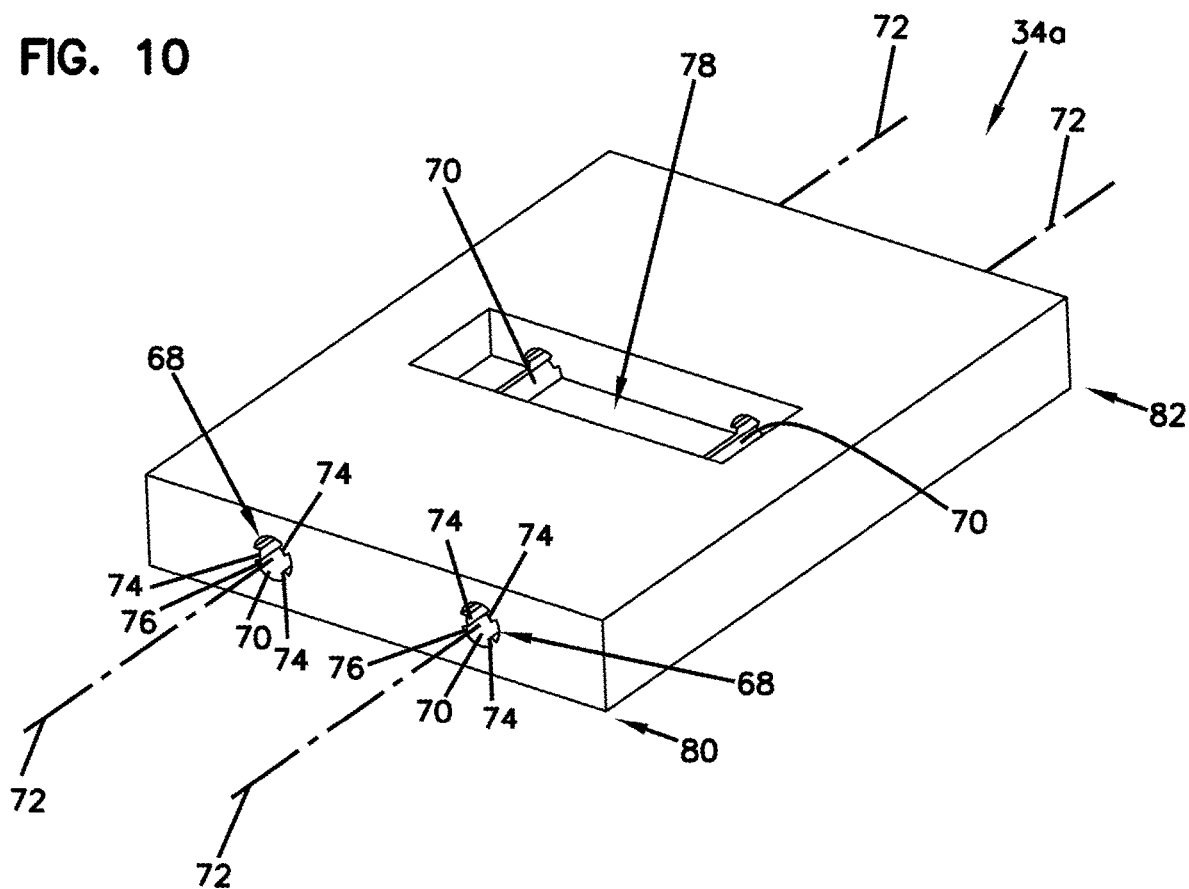
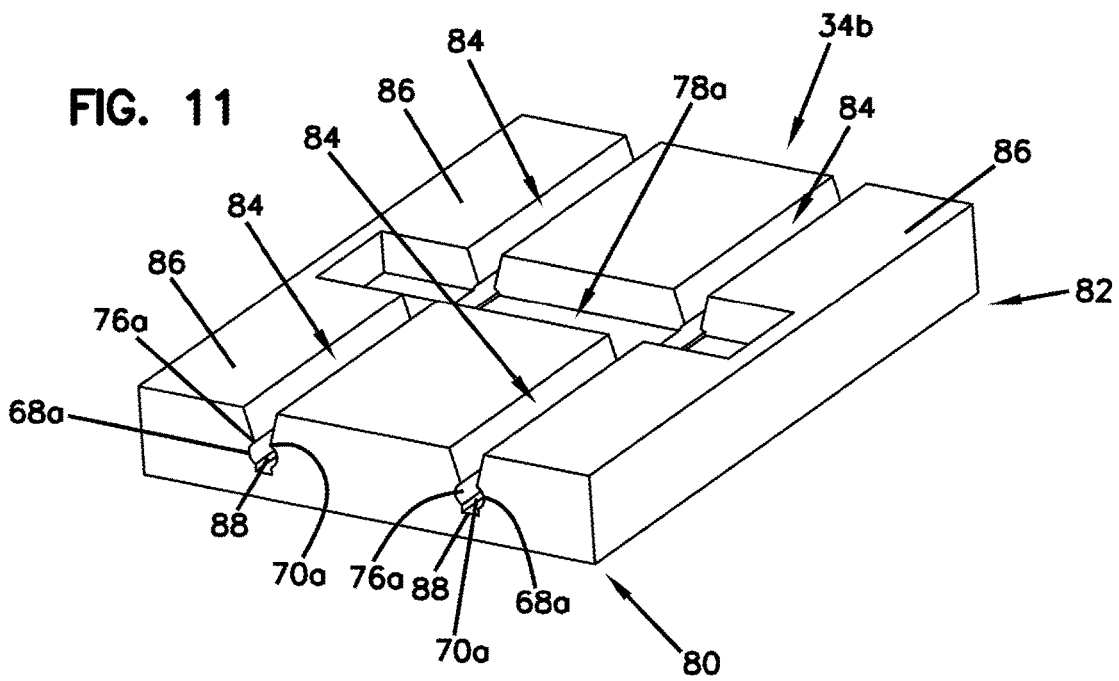

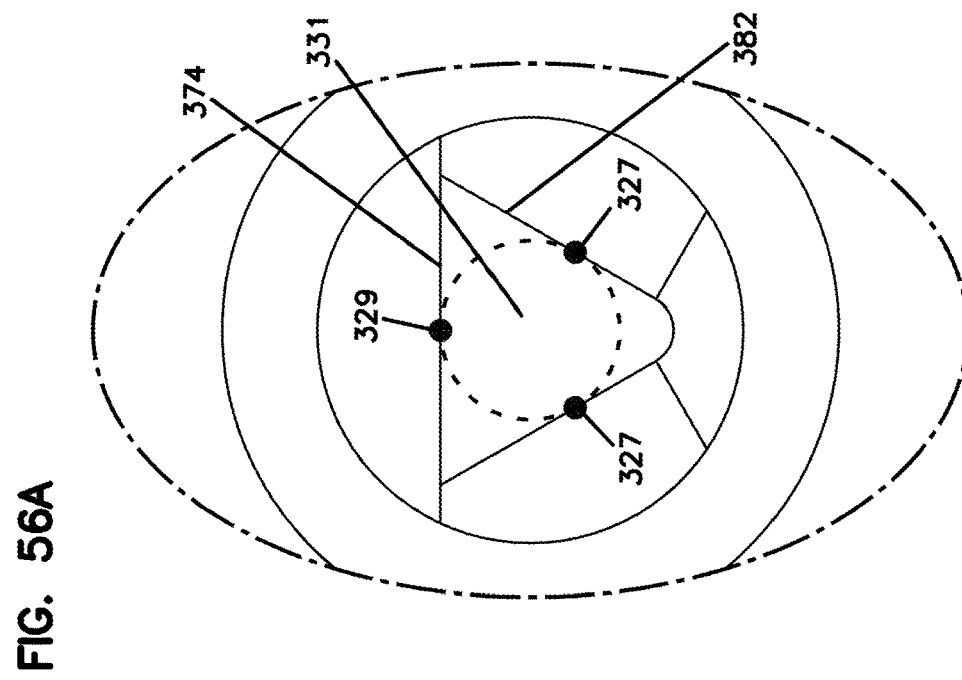
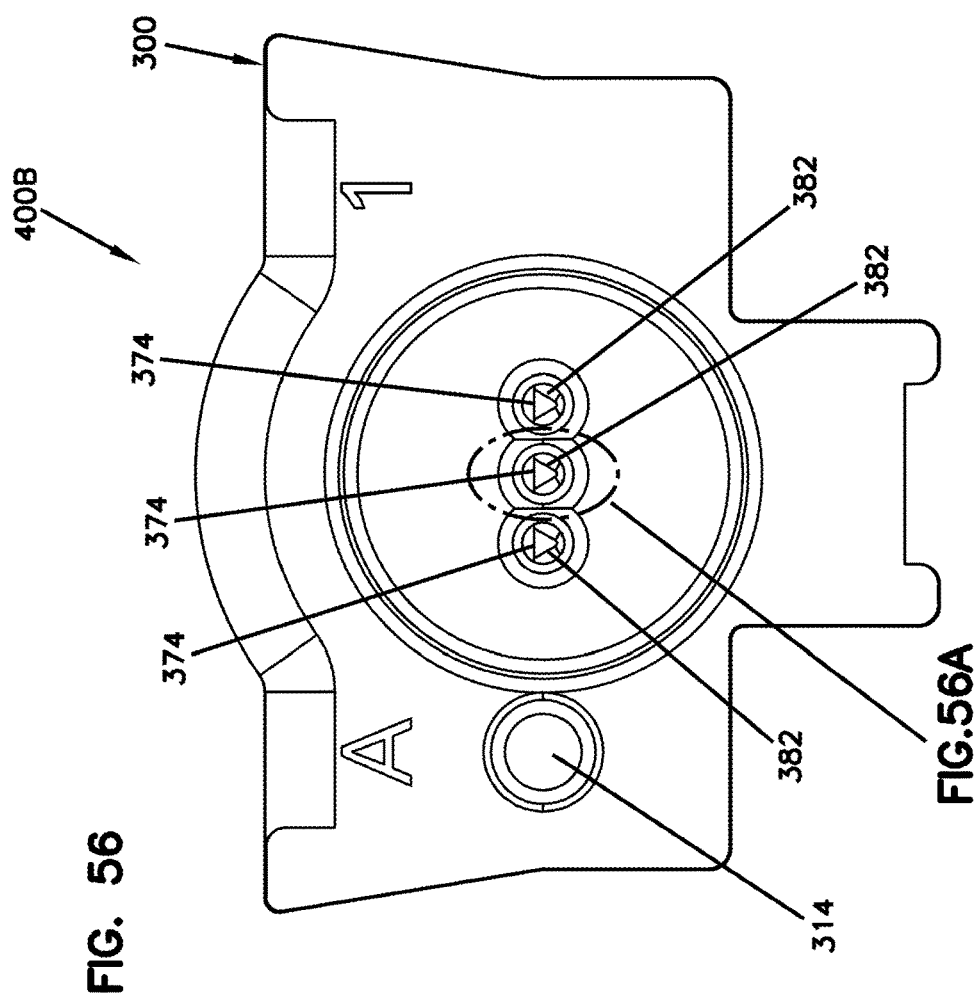

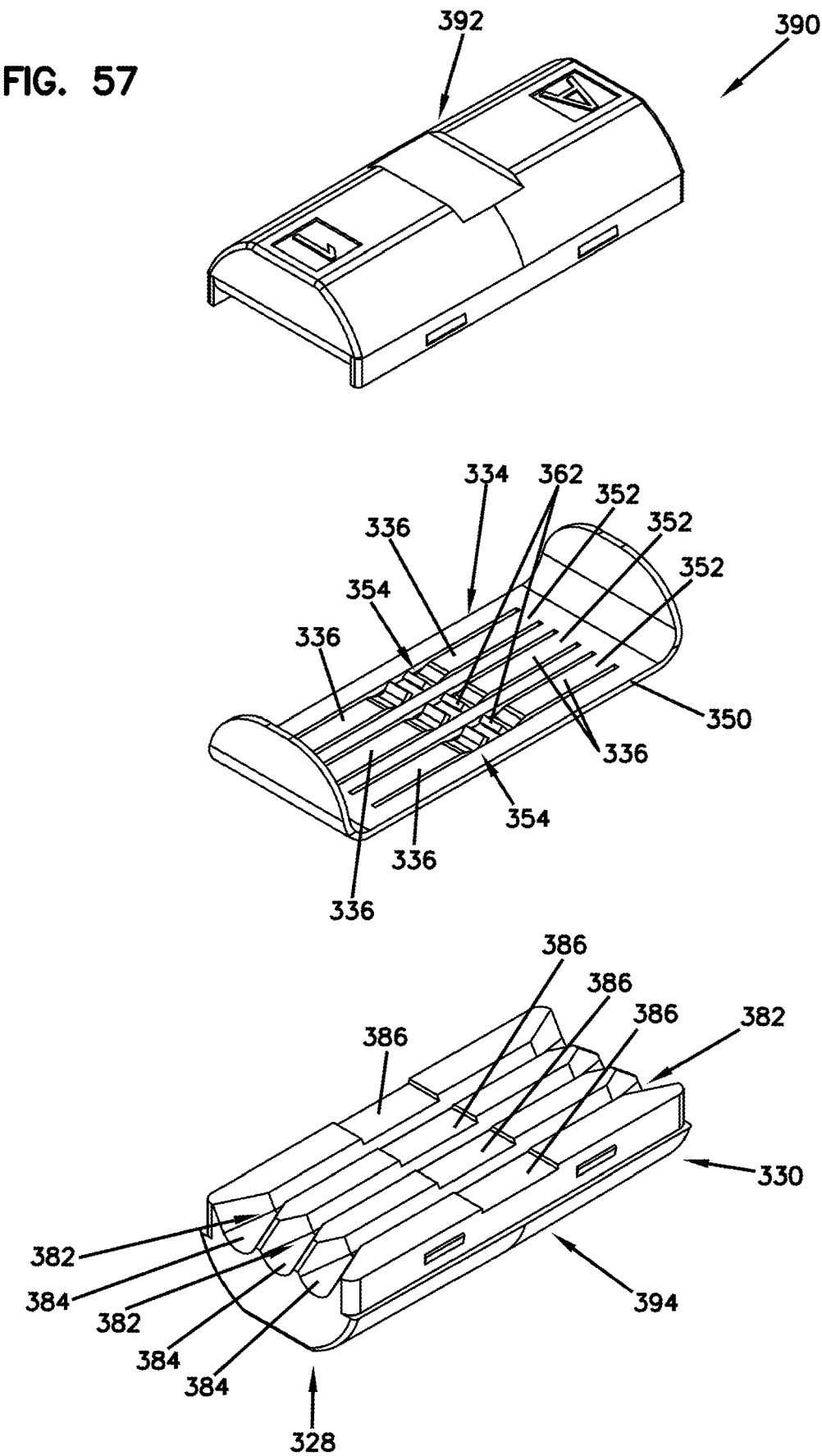

MULTI-FIBER FERRULE-LESS DUPLEX FIBER OPTIC CONNECTORS WITH MULTI-FIBER ALIGNMENT DEVICES

CROSS-REFERENCE TO RELATED APPLICATIONS

This application is a National Stage Application of PCT/US2017/064671, filed on Dec. 5, 2017, which claims the benefit of U.S. patent application Ser. No. 62/430,343, filed on Dec. 5, 2016, and claims the benefit of U.S. patent application Ser. No. 62/565,323, filed on Sep. 29, 2017, the disclosures of which are incorporated herein by reference in their entireties. To the extent appropriate, a claim of priority is made to each of the above disclosed applications.

TECHNICAL FIELD

The present disclosure relates generally to fiber optic connectors. More particularly, the present disclosure relates to ferrule-less fiber optic connectors with alignment devices.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Optical fiber connectors are an important part of most fiber optic communication systems. Fiber optic connectors allow two optical fibers to be quickly optically connected without requiring a splice. Fiber optic connectors can be used to optically interconnect two lengths of optical fiber. Fiber optic connectors can also be used to interconnect lengths of optical fiber to passive and active equipment.

A typical fiber optic connector includes a ferrule assembly supported at a distal end of a connector housing. A spring is used to bias the ferrule assembly in a distal direction relative to the connector housing. The ferrule functions to support an end portion of at least one optical fiber (in the case of a multi-fiber ferrule, the ends of multiple fibers are supported). The ferrule has a distal end face at which a polished end of the optical fiber is located. When two fiber optic connectors are interconnected, the distal end faces of the ferrules abut one another and the ferrules are forced proximally relative to their respective connector housings against the bias of their respective springs. With the fiber optic connectors connected, their respective optical fibers are coaxially aligned such that the end faces of the optical fibers directly oppose one another. In this way, an optical signal can be transmitted from optical fiber to optical fiber through the aligned end faces of the optical fibers. For many fiber optic connector styles (LC, SC, MPO), alignment between two fiber optic connectors is provided through the use of an intermediate fiber optic adapter.

Another type of fiber optic connector can be referred to as a ferrule-less fiber optic connector. In a ferrule-less fiber optic connector, an end portion of an optical fiber corresponding to the ferrule-less fiber optic connector is not supported by a ferrule. Instead, the end portion of the optical fiber is a free end portion. Similar to the ferruled connectors described above, fiber optic adapters can be used to assist in optically coupling together two ferrule-less fiber optic connectors. Example ferrule-less fiber optic connectors are disclosed by PCT Publication No. WO 2012/112344; PCT Publication No. WO 2013/117598; and U.S. Pat. No. 8,870,466.

Fiber optical adapters are used to optically couple together optical fiber tips of optical connectors. Fiber optical adapters can include specialized fiber alignment devices to receive bare optical fibers and align the fiber tips to enable the transfer of optical signals therebetween. Optical connectors can be secured to the optical adapters when received at the ports of the optical adapters. Improvements are needed in the area of fiber alignment for multi-fiber fiber optic connectors.

SUMMARY

One aspect of the present disclosure relates to a fiber alignment device. Although a multi-fiber alignment device is described herein, the advantages and features of the present disclosure can also relate to a single fiber alignment device.

The fiber alignment device can include a first fixed sized hole that defines a first passage extending along a fiber insertion axis to receive a first optical fiber. The fiber alignment device includes a plurality of projections that extend from an interior surface of the first fixed sized hole. The plurality of projections can define debris collection regions therebetween.

Another aspect of the present disclosure relates to a fiber alignment device for optically coupling first and second optical fibers. The fiber alignment device can include a first fixed sized hole defining a first passage that extends along a fiber insertion axis for receiving the first optical fiber; a second fixed sized hole defining a second passage for receiving the second optical fiber. The second passage can be aligned along the fiber insertion axis and be co-axial with the first passage. The fiber alignment device can also include a cavity region that forms a gap separating the first and second passages, and ends of the first and second optical fibers meet and are co-axially aligned at the cavity region.

Another aspect of the present disclosure relates to a fiber alignment device for optically coupling first and second optical fibers. The fiber alignment device can include a first hole defining a first passage that extends along a fiber insertion axis for receiving the first optical fiber; a second hole defining a second passage for receiving the second optical fiber. The second passage can be aligned along the fiber insertion axis and be co-axial with the first passage. The first and second passages can have open sides, the first and second passages can include hole-defining portions that have circular curvatures, the hole-defining portions can be moveable between a first position where the hole-defining portions define a first diameter and a second position where the hole-defining portions define a second diameter. The first diameter can be larger than the second diameter.

Another aspect of the present disclosure relates to a fiber alignment device for optically coupling first and second optical fiber. The fiber alignment device can include a first hole defining a first passage that extends along a fiber insertion axis for receiving the first optical fiber; a second hole defining a second passage for receiving the second optical fiber. The second passage can be aligned along the fiber insertion axis and be co-axial with the first passage. The first and second passages can have open sides. The first and second passages can include hole-defining portions that can be moveable between a first position where the hole-defining portions define a first diameter along at least a majority of lengths of the first and second passages, and a second position where the hole-defining portions define a second diameter along at least a majority of the lengths of the first and second passages. The first diameter can be larger than the second diameter.

A further aspect of the present disclosure relates to a multi-fiber alignment device. The multi-fiber alignment device can include a base member; a first flexible jaw flange that cooperates with the base member to define a first split-sleeve; a second flexible jaw flange that cooperates with the base member to define a second split-sleeve that is co-axially aligned with the first split-sleeve. The first and second flexible jaw flanges can be moveable between an alignment position and a non-alignment position. When the first and second flexible jaw flanges are in the non-alignment position, the first and second split-sleeves are opened to allow for insertion of an optical fiber. When the first and second flexible jaw flanges are in the alignment position, the first and second split-sleeves are closed to tighten down on fiber cladding of optical fibers to lock optical fibers independently in the first and second split-sleeves, respectively.

Another aspect of the present disclosure relates to an alignment device that can include an alignment body; a first fixed sized hole that can be defined in the alignment body, the first fixed sized hole defining a first passage that extends along a fiber insertion axis to receive a first optical fiber; and a second fixed sized hole that can be defined in the alignment body. The second fixed sized hole defining a second passage that can extend along the fiber insertion axis to receive a second optical fiber. The first and second passages can be co-axially aligned. Where the alignment device does not include any structure associated with the first and second fixed sized holes that deflects upon insertion of the first and second optical fibers.

Another aspect of the present disclosure relates to a fiber optic connector. The fiber optic connector can include a connector body having a front end and an opposite rear end. The connector body defining a longitudinal axis that extends through the connector body in an orientation that extends from the front end to the rear end of the connector body. The fiber optic connector can include at least one optical fiber that extends through the connector body from the rear end to the front end. The optical fiber can have a fiber end accessible at the front end of the connector body. A retractable nose piece can be mounted at the front end of the connector body. The retractable nose piece defining a fiber passage through which the optical fiber extends. The retractable nose piece can be movable along the longitudinal axis between an extended position where a front end portion of the optical fiber is protected within the fiber passages and a retracted position where the front end portion of the optical fiber projects forwardly beyond the retractable nose piece. The fiber optic connector can include a cavity defined in the retractable nose piece and configured to receive a fiber tip of the optical fiber when the nose piece is not retracted. The cavity can contain gel for encapsulating the fiber tip.

A further aspect of the present disclosure relates to an alignment system that includes a first housing piece; a second housing piece adapted to mate with the first housing piece; a groove-type alignment structure; and a plate that includes a plurality of elastic members that cooperates with the groove-type alignment structure. The plate can be positioned between the first and second housing pieces.

A further aspect of the present disclosure relates to an alignment system that includes a first housing piece; a second housing piece adapted to mate with the first housing piece; and a flat structure positioned between the first and second housing pieces.

Another aspect of the present disclosure relates to an alignment device that includes a groove-type alignment structure that has a support region for receiving an optical fiber inserted along a fiber insertion axis, the optical fiber has a first side and a second, opposite side. The groove-type alignment structure engages the first side of the optical fiber. The alignment device includes a stabilization structure that engages the first side of the optical fiber and a first angled transition surface that engages the second, opposite side of the optical fiber.

A further aspect of the present disclosure relates to a fiber alignment device for receiving an optical fiber of a ferrule-less fiber optic connector. The optical fiber can include a first side and an opposite second side. The fiber alignment device can include: a first piece that defines a fiber deflection structure; a second piece that includes a groove-type fiber alignment structure and a fiber stabilization structure that each face in an opposing direction as compared to the fiber deflection structure; and a fiber path for receiving the optical fiber. The fiber path can be defined between the first and second pieces, where the fiber path can include a first fiber contact location provided by the groove-type fiber alignment structure, a second fiber contact location provided by the fiber deflection structure, and a third fiber contact location provided by the fiber stabilization structure. The first fiber contact location can be spaced from the third fiber contact location in an orientation along the fiber path, and the second fiber contact location can be positioned between the first and third fiber contact locations in the orientation along the fiber path. When the optical fiber has been fully inserted along the fiber path: a) the first side of the optical fiber contacts the second fiber contact location causing the optical fiber to be deflected such that the second side of the optical fiber comes into contact with the first fiber contact location and the third fiber contact location; and b) the optical fiber is flexed between the first and third fiber contact locations by engagement with the second fiber contact location. The inherent elasticity of the flexed optical fiber causes an end portion of the optical fiber to be biased within the groove-type fiber alignment structure at the first fiber contact location.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 7 illustrates a cross-sectional view of a portion of the ferrule-less fiber optic connector shown in FIG. 6;

FIG. 8 is a cross-sectional view showing the ferrule-less fiber optic connector shown in FIG. 1, the fiber optic connector is shown with a shutter in a closed position and a nose piece in an extended position;

FIG. 9 illustrates the ferrule-less fiber optic connector of FIG. 8 with the shutter in an open position and the nose piece in a retracted position;

FIG. 10 illustrates an example multi-fiber alignment device in accordance with the principles of the present disclosure;

FIG. 11 illustrates another example multi-fiber alignment device in accordance with the principles of the present disclosure;

FIG. 56 illustrates an end view of the multi-fiber alignment device of FIGS. 54-55 mounted inside of the housing of FIGS. 48-49;

FIG. 56A is an enlarged view of a portion of FIG. 56;

FIGS. 57-58 illustrate another example multi-fiber alignment device in accordance with the principles of the present disclosure;

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

As used herein, a "ferrule" is a relatively hard structure adapted to receive and support an optical fiber near the end or at the end of the optical fiber. A ferrule is typically adapted to assist in providing alignment of an optical fiber with a corresponding optical fiber of a mated fiber optic connector. In the case of single-fiber ferrules, such ferrules are often cylindrical and often have a construction made of ceramic or of relatively hard plastic. Examples of these types of ferrules can include SC ferrules and LC ferrules. Ferrules can also include multi-fiber ferrules that receive and support a plurality of optical fibers. An example multi-fiber ferrule can include an MPO ferrule.

As used herein, a bare fiber is a section of optical fiber that does not include any coating. Instead, the bare fiber includes a core surrounded by a cladding layer. The optical fiber is "bare" because the cladding layer is exposed and not covered by a supplemental coating layer such as acrylate.

Figure 1:
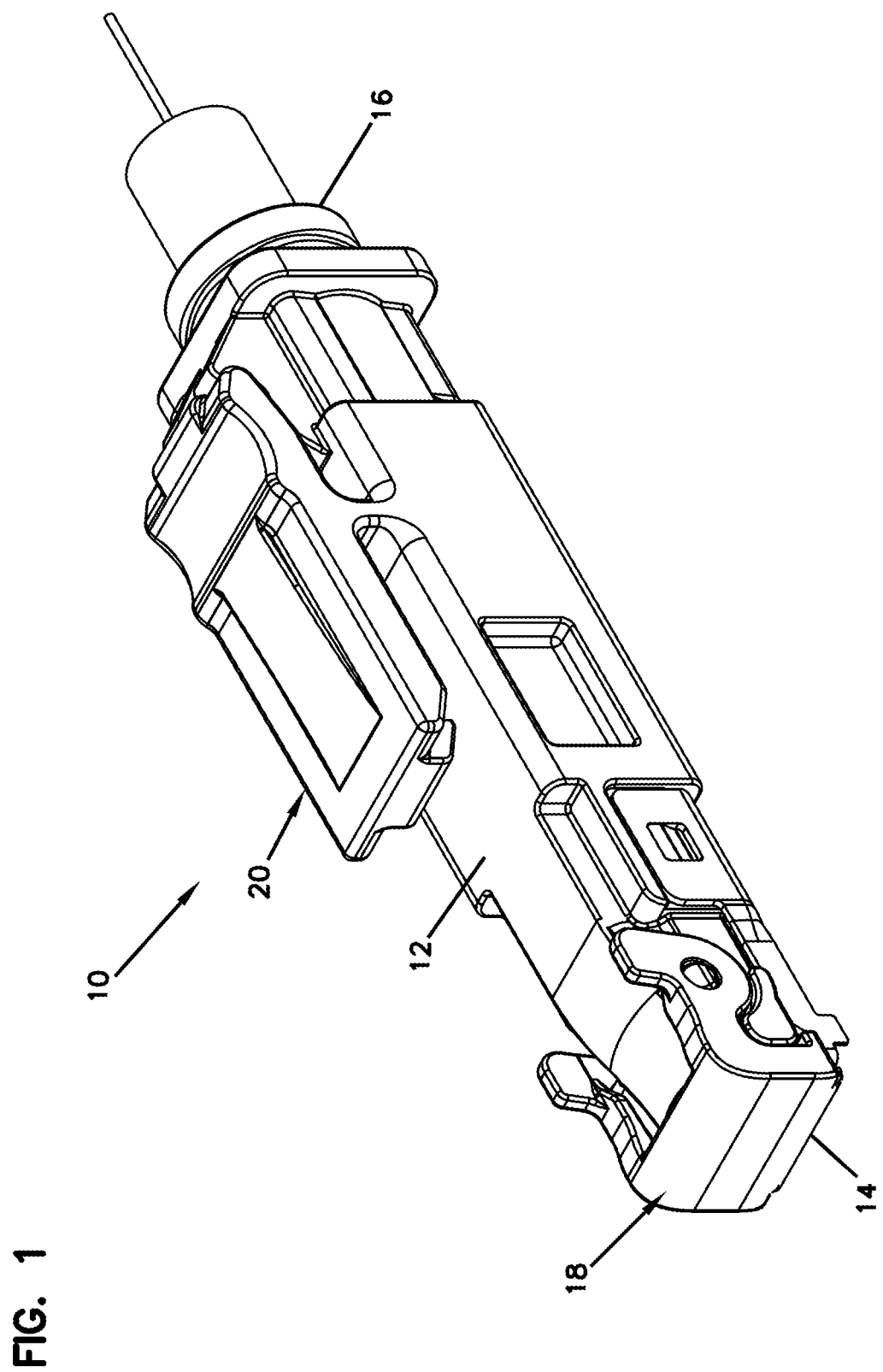
FIG. 1 illustrates a prior art ferrule-less fiber optic connector.

Optical connectors can include ferrule-less optical connectors. For example, an example ferrule-less optical connector 10 known in the art is shown at FIG. 1. The optical connector 10 includes a connector body 12 having a front mating end 14 and a rear cable terminating end 16. An optical fiber extends forwardly through the connector body 12 and has a ferrule-less end portion that is accessible at the front mating end 14 of the connector body 12. The optical fiber is anchored adjacent the rear cable terminating end 16 against axial movement relative to the connector body 12. When two optical connectors 10 are coupled together, the end faces of the ferrule-less end portions abut one another, thereby causing the optical fibers to be forced rearwardly into the connector bodies 12 and to buckle/bend within fiber buckling regions of the connector bodies 12. A shutter 18 moves between closed and open positions. The shutter 18 protects the ferrule-less end portion of the optical fiber from contamination when shut and allows access to the ferrule-less end portion when open.

Figure 2:
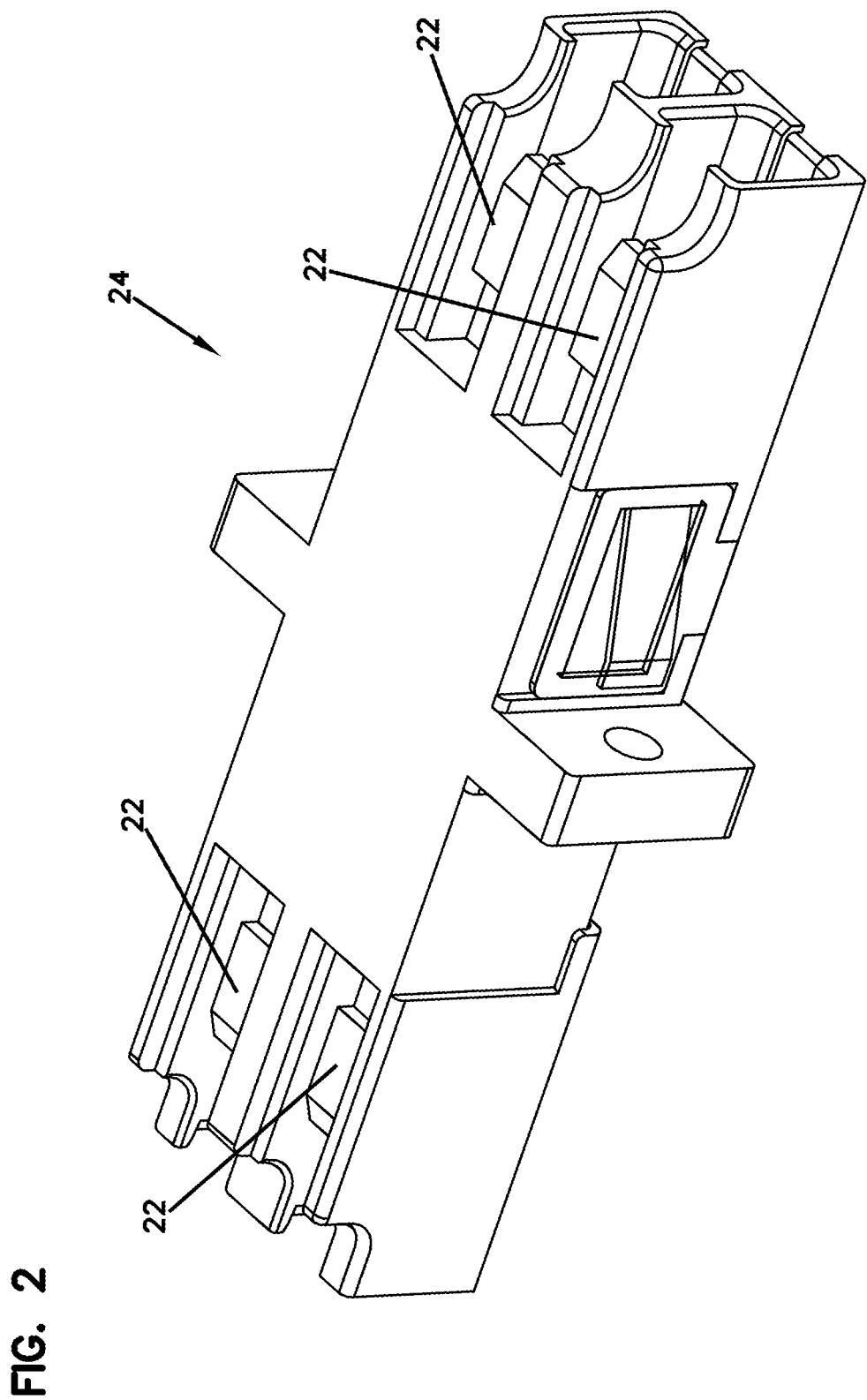
FIG. 2 illustrates a prior art fiber optic adapter compatible with the ferrule-less fiber optic connector of FIG. 1.

The optical connector 10 also includes a latch 20 that engages a catch 22 of a fiber optic adapter 24 (see FIG. 2). The latch 20 includes a resilient cantilever style latch. When the optical connectors 10 are inserted within the coaxially aligned ports of the adapter 24, the shutters 18 of the optical connectors 10 are retracted, thereby exposing the ferrule-less ends of the optical fibers. Continued insertion causes the ferrule-less ends to enter an optical fiber alignment device. Other examples of ferrule-less optical connectors and corresponding optical adapters can be found in U.S. patent application Ser. No. 14/377,189, filed Aug. 7, 2014, and titled "Optical Fiber Connection System Including Optical Fiber Alignment Device," the disclosure of which is incorporated herein by reference.

Figure 3:
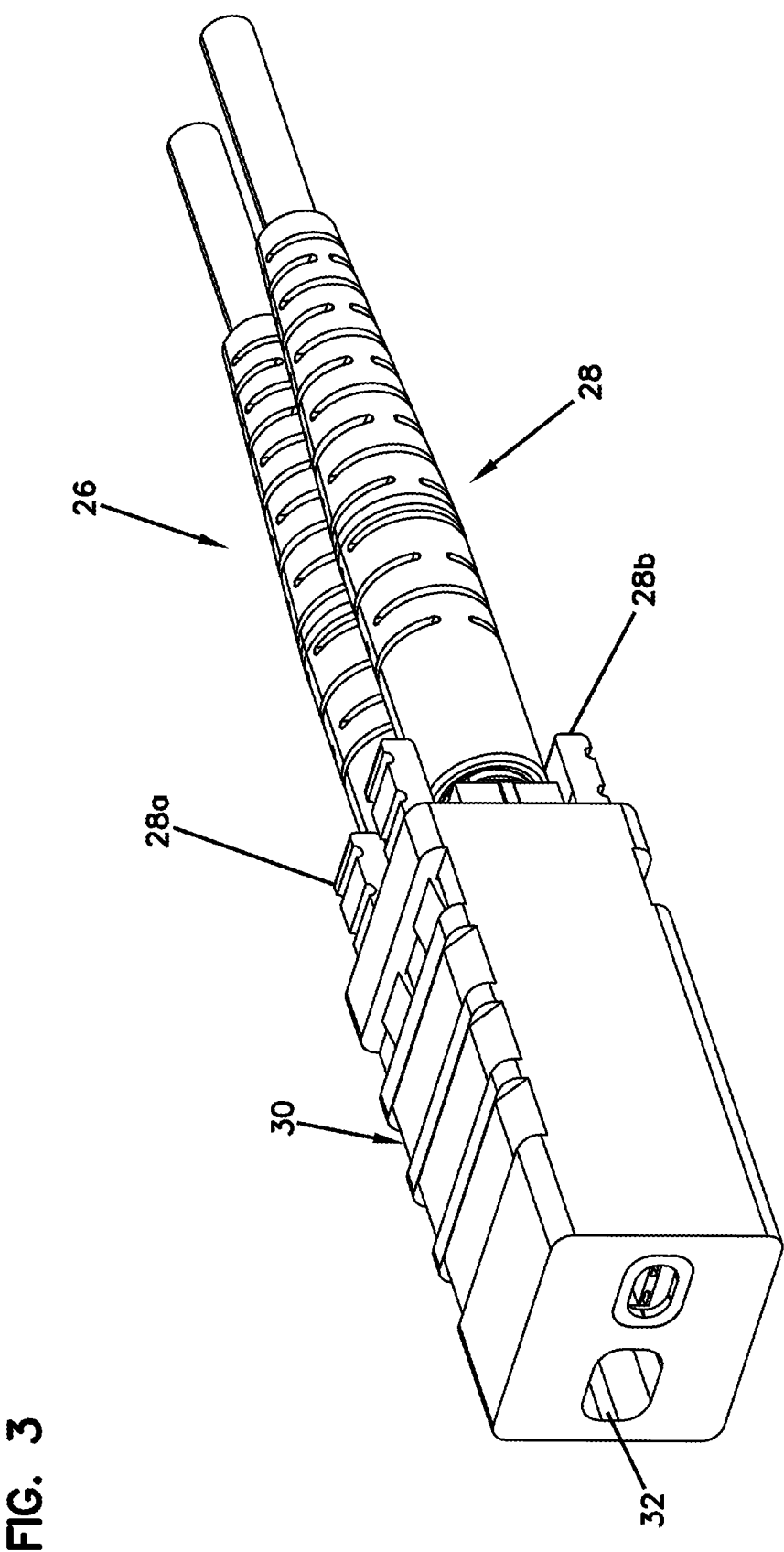
FIG. 3 illustrates a ferrule-less fiber optic connection system in accordance with the principles of the present disclosure, the system shows two duplex fiber optic connectors positioned within an intermediate fiber optic adapter for mating the duplex fiber optic connectors with another duplex fiber optic connector; in accordance with the principles of the present disclosure.

FIG. 3 shows a fiber optic connection system 26 in accordance with the principles of the present disclosure. The fiber optic connection system 26 includes a duplex fiber optic connector 28 and a fiber optic adapter 30 (e.g., secure engagement). The duplex fiber optic connector 28 is depicted as a ferrule-less fiber optic connector. The fiber optic adapter 30 includes adapter ports 32 for receiving the duplex fiber optic connector 28. In the depicted example of FIG. 3, the duplex fiber optic connectors 28a and 28b are shown loaded within respective adapter ports 32 of the fiber optic adapter 30. The duplex fiber optic connectors 28a and 28b are respectively adapted to be optically and mechanically coupled to another one of a duplex fiber optic connector (not shown). It will be appreciated that the duplex fiber optic connectors 28a and 28b can have identical configurations and therefore the general reference number 28 is applicable to each of the duplex fiber optic connectors 28a and 28b.

Figure 4:
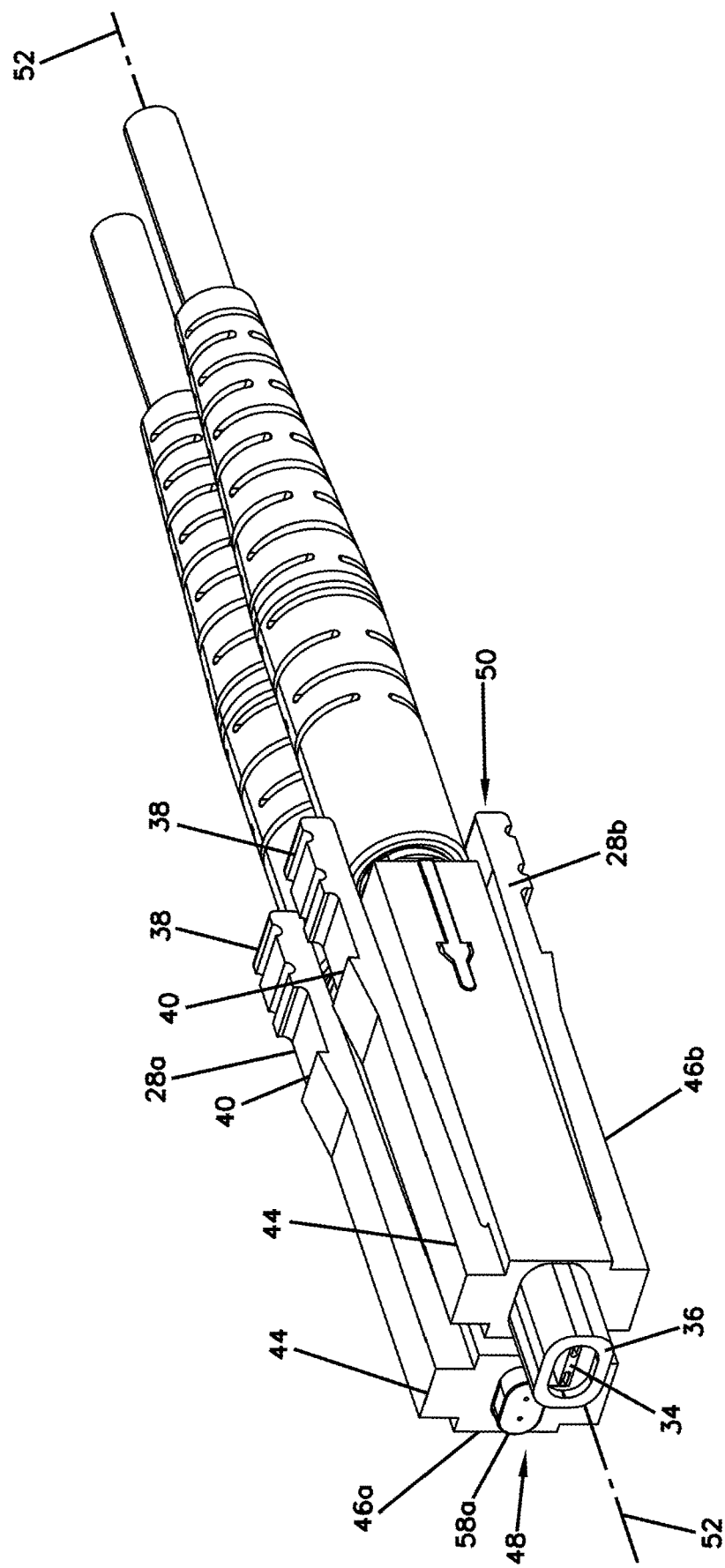
FIG. 4 illustrates the duplex fiber optic connectors shown in FIG. 3 with the fiber optic adapter removed to show an alignment housing with a multi-fiber alignment device; in accordance with the principles of the present disclosure.
Figure 5:
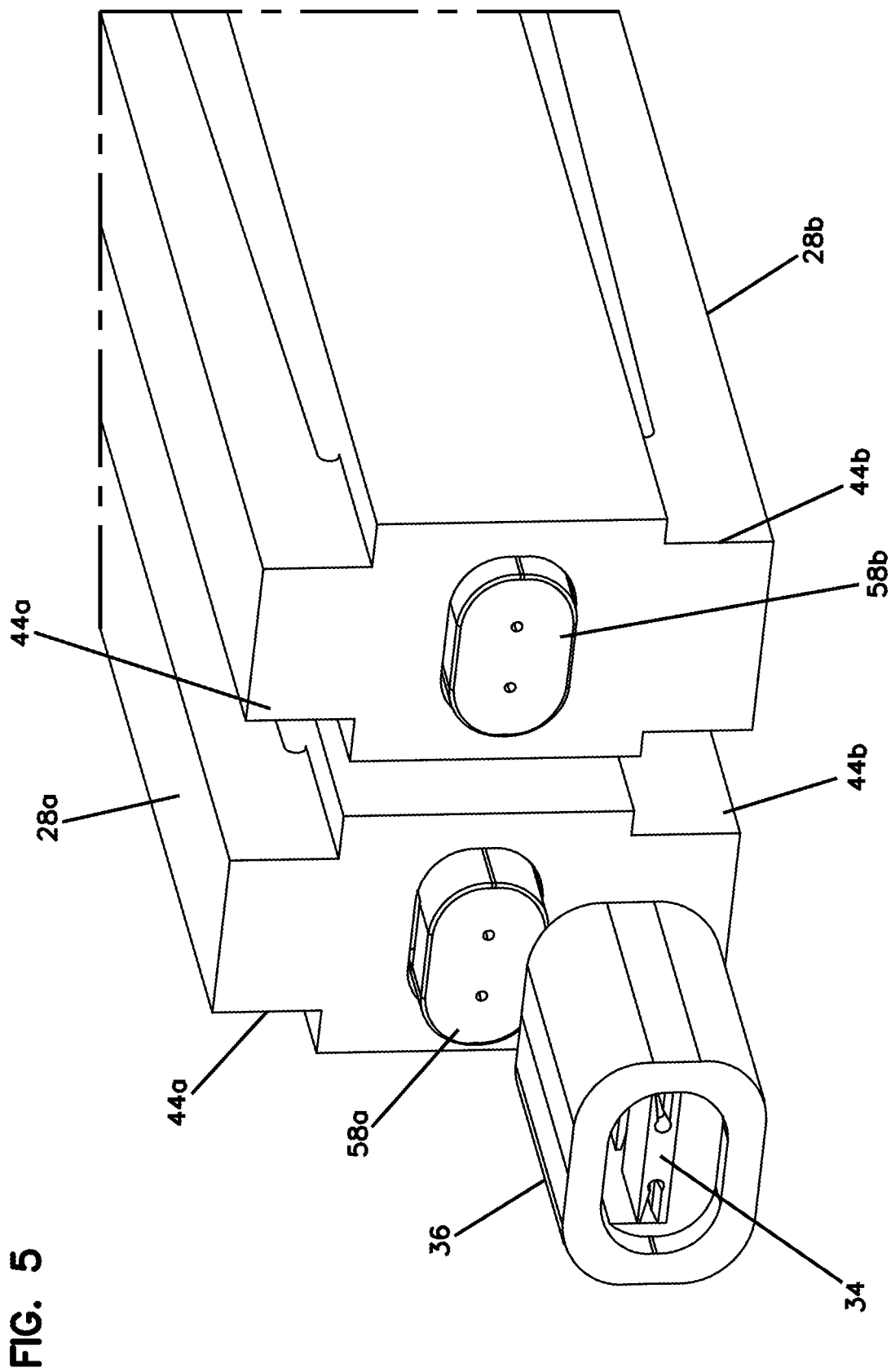
FIG. 5 is an enlarged view of a portion of the duplex fiber optic connector shown in FIG. 4.

FIGS. 4-5 are perspective views showing the duplex fiber optic connectors 28a and 28b removed from the fiber optic adapter 30. The fiber optic adapter 30 is arranged and configured to include a multi-fiber alignment device 34 (e.g., a fiber alignment block, a fiber alignment mechanism, etc.) that provides an alignment interface for respectively aligning optical fibers of the duplex fiber optic connectors 28a, 28b with optical fibers of another duplex fiber optic connector (not shown). Although a multi-fiber alignment device is shown, the features and advantages of the present disclosure may also relate to a single fiber alignment device. As shown, the multi-fiber alignment device 34 is housed within an alignment housing 36 that is arranged and configured to mount within the fiber optic adapter 30. Example multi-fiber alignment devices 34 are illustrated and described in detail with reference to FIGS. 10-41. It will be appreciated that such examples can also relate to single fiber alignment devices.

Optical fibers of the duplex fiber optic connectors 28a, 28b can be received within the multi-fiber alignment device 34 such that the fibers are co-axially aligned with optical fibers of another duplex fiber optic connector (not shown). The duplex fiber optic connectors 28a and 28b each include flexible latches 38 having retention catches 40 that mechanically retain the duplex fiber optic connectors 28a, 28b within their corresponding adapter ports 32 of the fiber optic adapter 30. It will be appreciated that the multi-fiber alignment device 34 is adapted to receive optical fibers that are not supported by or secured within corresponding ferrules. It will also be appreciated that each of the duplex fiber optic connectors 28a, 28b and fiber optic adapter 30 are comprised entirely of non-metallic materials, e.g. plastics, polymers, etc. The absence of any metal within the duplex fiber optic connectors 28a, 28b and fiber optic adapter 30 creates an interference-free signal environment.

In certain examples, the multi-fiber alignment devices 34 can be mounted generally at a mid-plane of the fiber optic adapter 30. The adapter ports 32 can include keyways 42 (see FIG. 8) that receive corresponding keys 44 of the duplex fiber optic connectors 28. The keys 44 and keyways 42 can be configured to interface such that the duplex fiber optic connectors 28 can only be inserted into the adapter ports 32 in one orientation. As depicted, each of the duplex fiber optic connectors 28 includes two keys 44a, 44b (see FIG. 5) respectively positioned on both sides of the duplex fiber optic connectors 28a, 28b. The keys 44a, 44b can each have a width that extends substantially across an entire width of the duplex fiber optic connectors 28a, 28b. In certain examples, keys 44a, 44b have widths that extend across at least a majority of the width of the duplex fiber optic connector 28. In certain examples, the keys 44 can be provided on only one side of the duplex fiber optic connectors 28a, 28b so as to provide a readily apparent visual and physical cue to an installer regarding the proper orientation of the duplex fiber optic connectors 28a, 28b during insertion into the fiber optic adapter 30.

Still referring to FIG. 4, the duplex fiber optic connectors 28a, 28b each include a connector body 46a, 46b having a front end 48 and an opposite rear end 50. The connector body 46a, 46b defines a longitudinal axis 52 that extends through the connector body 46 in an orientation that extends from the front end 48 to the rear end 50 of the connector body 46.

Figure 6:
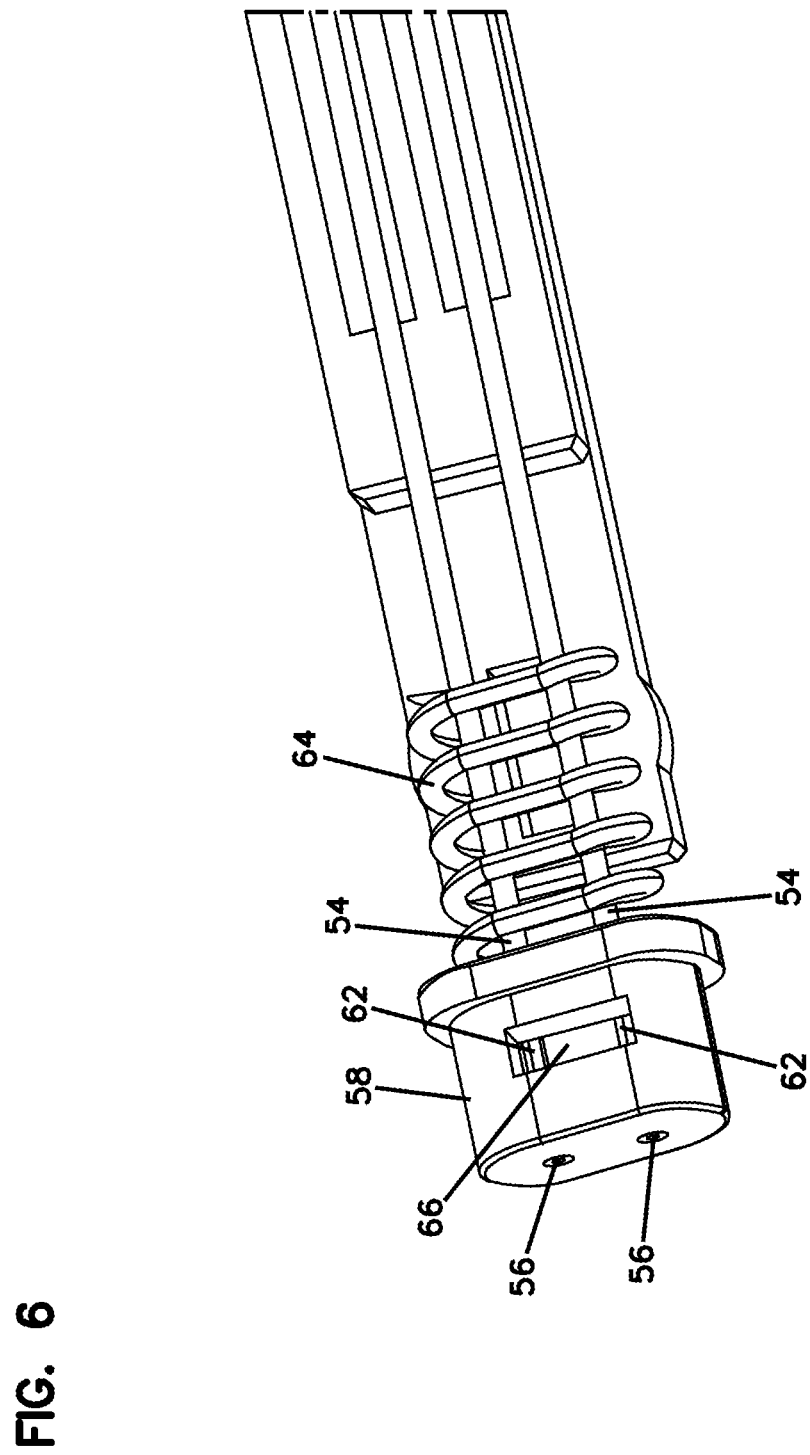
FIG. 6 illustrates a schematic view of portions of a ferrule-less fiber optic connector in accordance with the principles of the present disclosure, the fiber optic connector is shown with a retractable nose piece.

Turning to FIG. 6, optical fibers 54 extend through the connector body 46 from the rear end 50 to the front end 48. The optical fibers 54 have fiber ends 56 accessible at the front end 24 of the connector body 46. The duplex fiber optic connectors 28a, 28b each include a retractable nose piece 58a, 58b (see FIG. 5) respectively mounted at the front end 48 of the connector body 46a, 46b. It will be appreciated that the nose pieces 58a, 58b of the duplex fiber optic connectors 28a and 28b can have identical configurations and therefore the general reference number 58 is applicable to each of the nose pieces 58a, 58b of the duplex fiber optic connectors 28a and 28b.

As shown in FIGS. 7-9 with reference to the optical connector 10 and the duplex fiber optic connector 28, the nose piece 58 defines fiber passages 60 through which the optical fibers 54 extend. The nose piece 58 is movable along the longitudinal axis 52 between an extended position (see FIG. 8) where a front end portion 62 of the optical fibers 54 is protected within the fiber passages 60 and a retracted position (see FIG. 9) where the front end portion 62 of the optical fibers 54 project forwardly beyond the nose piece 58. In certain examples, the optical connector 10 and duplex fiber optic connectors 28a and 28b can each include a spring 64 for biasing the nose piece 58 toward the extended position. In certain examples, the nose piece 58 retracts back into the respective connector body 12, 46 as the nose piece 58 moves from the extended position toward the retracted position. In certain examples, relative movement is permitted between the nose piece 58 and the optical fibers 54 so that the nose piece 58 can slide relative to the optical fibers 54. As shown in FIG. 5, the nose piece 58 can be arranged and configured to coarsely align with the alignment housing 36 upon insertion of the duplex fiber optic connector 28 into the fiber optic adapter 30. In certain examples, a tip of the nose piece 58 abuts against the multi-fiber alignment device 34.

The nose piece 58 can define a cavity 66 (see FIG. 6) that receives fiber tips of the optical fibers 54 when the nose piece 58 is not in the retracted position. The cavity 66 can be at least partially filled with a non-gaseous fluid (e.g., a refractive index matching gel) for encapsulating the fiber tips 56. In certain examples, the non-gaseous fluid can be filled in the cavity 66 in a volume slightly less than a volume of the cavity. The cavity 66 can be in fluid communication with the fiber passage 60 such that the fiber tips 56 of the optical fibers 54 pass therethrough to be cleaned prior to coupling (e.g., mating). The refractive index gel can have a refractive index between 1.45 and 1.60, although alternatives are possible.

In certain examples, the non-gaseous fluid functions to clean the end faces of the optical fibers 54 when the end faces are inserted therein. In certain examples, the non-gaseous fluid generally maintains its shape but has a viscosity that allows the non-gaseous fluid to flow or otherwise move so as to receive the fiber tips of the optical fibers 54. The optical fibers 54 remain immersed in the non-gaseous fluid while the connector is in an unmated state.

In certain examples, a fiber anchoring region can be positioned near the rear end of the connector body where the optical fiber is fixed in position relative to the connector body thereby preventing relative axial movement between the fiber and the connector body at the anchoring location. In certain examples, a fiber buckling region is provided in the connector body between the anchoring region and the end portion of the optical fiber. The buckling region allows the fiber to buckle (i.e., bend, flex) within the connector body when an optical connection is being made.

Figure 10A:
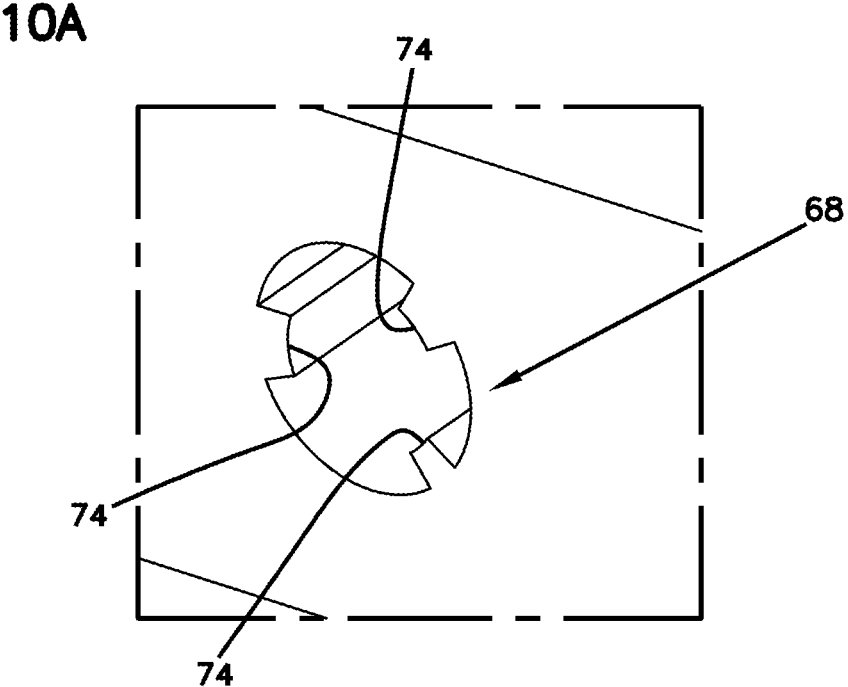
FIG. 10A is an isolated view of a portion of the multi-fiber alignment device shown in FIG. 10.

Referring to FIG. 10, an example multi-fiber alignment device 34a is depicted. It will be appreciated that a variety of different types of multi-fiber alignment devices can be used to provide coaxial alignment of the optical fibers of the duplex fiber optic connectors 28 desired to be optically coupled. Although the design and advantageous features are described herein with reference to the example multi-fiber alignment device 34a, they can also relate to a single fiber alignment device.

The multi-fiber alignment device 34a can be molded out of ceramic or like material, although alternatives are possible. For example, it would also be possible to make the multi-fiber alignment device 34a out of plastic, glass, metal, or any other known material. By using a moldable material, the multi-fiber alignment device 34a may be quickly and easily manufactured as a one piece unit.

The multi-fiber alignment device 34a is provided to precisely align individual fibers of optical connectors secured within ports of an adapter for alignment with fibers in another like connector. The multi-fiber alignment device 34a can be referred to as ferrule-less multi-fiber alignment device since it provides optical fiber alignment without using or receiving ferrules (e.g., SC ferrules, LC ferrules, etc.). It will be appreciated that the arrangement and configuration of the multi-fiber alignment devices 34 described herein would be the same for both mating sides of the duplex fiber optic connectors 28. As such, only half of the multi-fiber alignment device 34a would be described with respect to the duplex fiber optic connectors 28.

The multi-fiber alignment device 34 can include fixed sized holes 68 (e.g., a rigid hole) that each define an alignment passage 70 extending along a fiber insertion axis 72 to receive the optical fiber 54. The fixed sized holes 68 can each have a fixed effective diameter. Herein by the term, "fixed" and variants thereof, in this context, it is meant that the diameter of the fixed sized holes does not change when an optical fiber is inserted therein.

The fixed effective diameter of the fixed sized holes 68 may be larger than a nominal diameter of the optical fiber 54 that is intended to be inserted therethrough. In one example, a fixed effective diameter of the fixed sized holes 68 is no more than 1.5 microns larger than a maximum outer diameter of the optical fiber 54 to be inserted therein. In one example, a fixed effective diameter of the fixed sized holes 68 is no more than 1.0 microns larger than a maximum outer diameter of the optical fiber 54 to be inserted therein. In other examples, a fixed effective diameter of the fixed sized holes 68 is no more than 0.5 microns larger than a maximum outer diameter of the optical fiber 54 to be inserted therein. In certain examples, a fixed effective diameter of the fixed sized holes 68 is no more than 2 microns larger than a maximum outer diameter of the optical fiber 54 to be inserted therein. In one example, a fixed effective diameter can be in the range of about 125.5 microns to about 126.5 microns.

The fixed sized holes 68 can have tolerances in the range of ±0.3 microns. In certain examples, the optical fiber 54 has a diameter of between about 124 microns to about 125 microns, although alternatives are possible. The optical fiber 54 can have tolerances in the range of ±0.5 microns. It is important to note that tolerances will vary depending upon the material used for the multi-fiber alignment device 34a. While the tolerance ranges are important to the proper operation of the present invention, it will be recognized that greater or lesser diameters may be used, without departing from the spirit or scope of the present disclosure.

In certain examples, the multi-fiber alignment devices 34 may not include any structure associated with the fixed sized holes 68 that deflects upon insertion of the optical fibers. For example, the multi-fiber alignment device 34 can be free of depressing members (e.g., rods, flexible cantilevers, or other angled transition surfaces) that can deflect (e.g., flex, move) upon insertion of optical fibers in the fixed sized holes 68.

In one example, the multi-fiber alignment device 34h can include an alignment body, a first fixed sized hole being defined in the alignment body, and a second fixed sized hole being defined in the alignment body. The first fixed sized hole defining a first passage that extends along a fiber insertion axis to receive a first optical fiber; the second fixed sized hole defining a second passage that extends along the fiber insertion axis to receive a second optical fiber. The first and second passages can be co-axially aligned. The alignment device does not include any structure associated with the first and second fixed sized holes that deflects upon insertion of the first and second optical fibers.

As depicted in FIG. 10, the fixed sized holes 68 are generally round holes. The multi-fiber alignment device 34*a* includes fixed sized holes 68 defined at first and second ends 80, 82 for mating duplex fiber optic connectors 28. Each of the first and second sides 80, 82 are independent to allow for two fiber insertions. The fixed sized holes 68 of the multi-fiber alignment device 34*a* can have a rigid construction that allows the fixed sized holes 68 of the multi-fiber alignment device 34*a* to be machined to very tight tolerances. The fixed sized holes 68 are arranged and configured to remain the same size and not change over time. The fixed sized holes 68 allows for a tight tolerance with the optical fiber 54 which helps to deliver low insertion loss.

In certain examples, the alignment passage 70 of the fixed sized holes 68 can have different transverse cross-sectional shapes such as octagonal shapes, circular shapes, triangular shapes, square shapes, or other shapes. In certain examples, the alignment passage 70 of the multi-fiber alignment device 34*a* may include a non-gaseous fluid at the entry thereof to receive and protect the tips of the front end portions 62 of the optical fibers 54. In certain examples, a non-gaseous fluid can at least partially, or completely, fill the alignment passage 70 as to help prevent contamination from entering and help to eliminate the collection of debris within the alignment passage 70. In certain examples, a non-gaseous fluid can have a gel-like composition and can be configured to deform or flow in order to receive the tips of the front end portions 62. In certain examples, the non-gaseous fluid can include a gel such as an index matching gel. In certain examples, the fluid can clean the fiber tips as the fiber tips are inserted through the fluid.

In certain examples, a plurality of projections 74 can extend outwardly from an interior surface 76 of the fixed sized holes 68. In one example, the projections 74 may extend longitudinally along an entire length of the alignment passage 70. In other examples, the projections 74 may extend partially along the length of the alignment passage 70. In the example depicted, the projections 74 are of generally rectangular shape, but may of course be formed with other shapes. In certain examples, the fixed effective diameter can be defined by tips of the projections 74 positioned within the fixed sized holes 68, although alternatives are possible.

The plurality of projections 74 can help to reduce the amount of debris (e.g., dust, dirt) that may collect within the fixed sized holes 68. For example, the plurality of projections can define debris collection regions thereinbetween. Thus, rather than having contamination collect within the alignment passages 70, which may prevent insertion of the optical fiber 54, the debris can collect within gaps formed between the projections 74. In other examples, the alignment passage 70 may be configured with grooves for collecting debris.

The multi-fiber alignment device 34*a* can include a cavity region 78 that is in fluid communication with the alignment passage 70. The cavity region 78 can be positioned between the first and second ends 80, 82 of the multi-fiber alignment device 34*a*. The cavity region 78 can include an open side. The first end 80 defines the fixed sized holes 68 and the second end 82 defines similar fixed sized holes (not shown). The alignment passage 70 of the fixed sized holes 68 positioned at the first end 80 of the multi-fiber alignment device 34*a* can extend along the fiber insertion axis 72 from the first end 80 in a direction toward the cavity region 78. The alignment passage 70 of the fixed sized holes 68 at the second end 82 of the multi-fiber alignment device 34*a* can extend along the fiber insertion axis 72 from the second end 82 in a direction toward the cavity region 78 at an opposite side of the cavity region 78 from the alignment passage 70 of the fixed sized hole 68 at the first end 80 of the multi-fiber alignment device 34*a*.

When the duplex fiber optic connectors 28 are respectively mated at the first and second ends 80, 82, their respective optical fibers meet in the center of the cavity region 78. The cavity region 78 positioned to separate the passages 70 of the respective optical fibers. The cavity region 78 can have an open side. The cavity region 78 can be at least be partially filled with a non-gaseous fluid, such as, a refractive index matching gel, although alternatives are possible. The optical fibers pass through the refractive index matching gel in the cavity region 78 to clean end faces of the optical fibers prior to mating. In certain examples, the multi-fiber alignment device 34*a* includes a lead-in chamfer to facilitate guiding of the optical fiber into the alignment passage.

In certain examples, the plurality of projections 74 of the fixed sized holes 68 defined at the first end 80 of the multi-fiber alignment device 34*a* can extend longitudinally along the alignment passage 70 from the first end 80 of the multi-fiber alignment device 34*a* to the cavity region 78. Similarly, the plurality of projections 74 of the fixed sized holes 68 defined at the second end 82 of the multi-fiber alignment device 34*a* can extend longitudinally along the alignment passage 70 from the second end 82 of the multi-fiber alignment device 34*a* to the cavity region 78.

In one example, the fixed sized holes 68 of the multi-fiber alignment device 34 can include a first fixed sized hole defining a first passage extending along a fiber insertion axis 72 for receiving a first optical fiber and a second fixed sized hole defining a second passage for receiving the second optical fiber. The second passage can be aligned along the fiber insertion axis 72 and can be co-axial with the first passage. The multi-fiber alignment device can include a cavity region 78 that forms a gap separating the first and second passages. Ends of the first and second optical fibers can meet and be co-axially aligned at the cavity region.

Figure 11A:
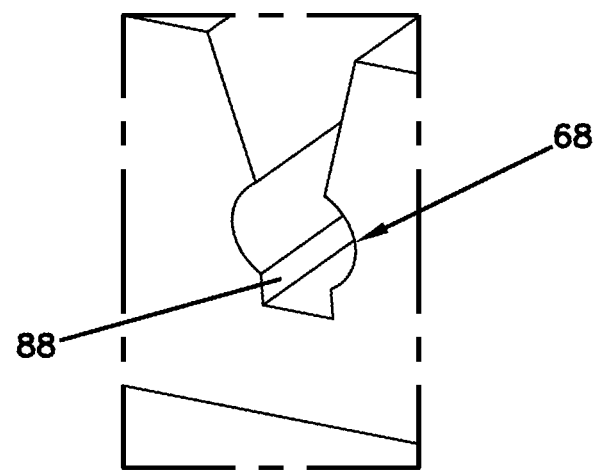
FIG. 11A is an isolated view of a portion of the multi-fiber alignment device shown in FIG. 11.

Referring to FIG. 11, another example multi-fiber alignment device 34*b* is depicted. The multi-fiber alignment device 34*b* can be embodied with some of the same features and advantages as the multi-fiber alignment device 34*a* described above. For the sake of brevity, only those portions that differ from the multi-fiber alignment device 34*a* illustrated in FIG. 10 discussed above will be described in detail.

Similar to the multi-fiber alignment device 34*a* described above, the multi-fiber alignment device 34*b* includes fixed sized holes 68*a* (e.g., rigid holes). In the example shown, the fixed sized holes 68*a* are also defined at both the first and second ends 80, 82. The fixed sized holes 68*a* are arranged and configured with an opening 84 defined in a top surface 86 of the multi-fiber alignment device 34*b*. The opening 84 is generally v-shaped as it extends downwardly from the top surface 86 to the fixed sized hole 68*a*, although alternatives are possible. In certain examples, the multi-fiber alignment device 34*b* includes a lead-in chamfer to facilitate guiding of the optical fiber into the alignment passage.

The fixed sized holes 68a can include grooves 88 that are defined in an interior surface 76a of the alignment passage 70a. Similar to the projections 74 described above, the grooves 88 can reduce the collection of contamination within the alignment passage 70a by providing a location for which debris can collect.

The multi-fiber alignment device 34b also includes a cavity region 78a positioned between the first and second ends 80, 82 of the multi-fiber alignment device 34b. The cavity region 78 forms a gap separating the first and second passages. Ends of the first and second optical fibers can meet and be co-axially aligned at the cavity region 78a. The cavity region 78a includes the same features and advantages as the cavity region 78 illustrated in FIG. 10.

Figure 12:
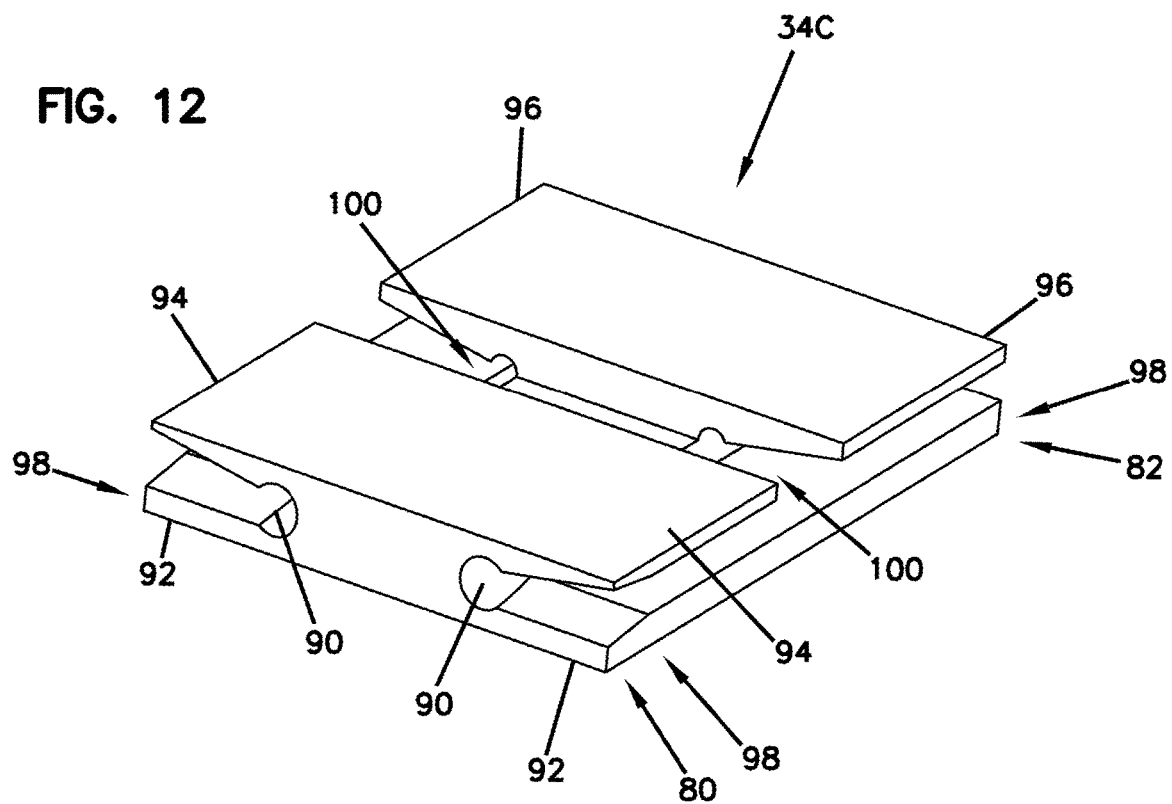
FIGS. 12-13 illustrate another example multi-fiber alignment device in accordance with the principles of the present disclosure.
Figure 13:
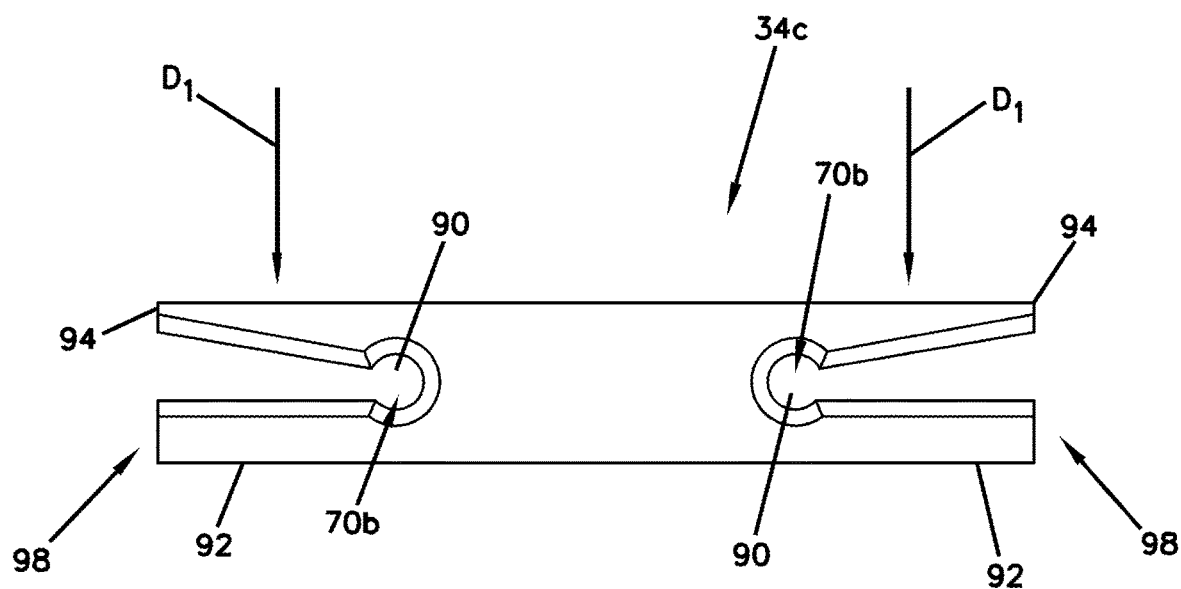

Referring to FIGS. 12 and 13, another example multi-fiber alignment device 34c is depicted. The multi-fiber alignment device 34c is embodied with some of the same features and advantages as the multi-fiber alignment devices 34a, 24b described above. For the sake of brevity, only those portions that differ from the multi-fiber alignment devices 34a, 34b illustrated in FIGS. 10 and 11 discussed above will be described in detail.

The multi-fiber alignment device 34c defines slotted fixed sized holes 90 at first and second ends 80, 82. The multi-fiber alignment device 34c includes a base member 92, a first flexible jaw flange 94 positioned at the first end 80, and a second flexible jaw flange 96 positioned at the second end 82. The first flexible jaw flange 94 cooperates with the base member 92 to define a split-sleeve 98 and the second flexible jaw flange 96 cooperates with the base member 92 to another split-sleeve 98 that is co-axially aligned with the split-sleeve 98. The first and second flexible jaw flanges 94, 96 can be moved between a non-alignment position where the split-sleeves 98 are opened to allow for insertion of optical fibers, and an alignment position where the split-sleeves 98 are closed to tighten down on fiber cladding of the optical fibers to lock optical fibers independently in the split-sleeves.

In certain examples, the optical fibers may come into contact with the fixed sized slotted holes 90 when in the alignment position. In other examples, the slotted fixed sized holes 90 have a diameter larger than a maximum outer diameter of the optical fiber extending therethrough when in the alignment position.

The multi-fiber alignment device 34c can also include a detachable secure mechanism (e.g., clamp, pin, clip, or any actuator structure) (not shown). The detachable secure mechanism can be respectively mounted on the first and second flexible jaw flanges 94, 96 to bias the first and second flexible jaw flanges 94, 96 between the alignment position and the non-alignment position. For example, the detachable secure mechanism can apply a downward force in a direction $D_1$ (See FIG. 13) onto the first and second flexible jaw flanges 94, 96 such that the first and second flexible jaw flanges 94, 96 can be flexed in the direction $D_1$ toward the base member 92. The downward force and flexible action of the first and second flexible jaw flanges 94, 96 can make the slotted fixed sized holes 90 smaller such that the slotted fixed sized holes 90 tighten down on fiber cladding of the optical fiber positioned therein.

The first and second flexible jaw flanges 94, 96 can be actively opened and closed with an actuator structure (not shown) or similar device. In one example, the first and second flexible jaw flanges 94, 96 of the multi-fiber alignment device 34c can be configured initially such that the slotted fixed sized holes 90 are opened or large. For example, the slotted fixed sized holes 90 may have an inner diameter of about 130 microns or greater. An actuator structure can then be used to clamp the slotted fixed sized holes 90 shut to make them smaller and tightened down on the optical fibers. In other examples, the first and second flexible jaw flanges 94, 96 of the multi-fiber alignment device 34c can be configured initially such that the slotted fixed sized holes 90 are small and nearly shut closed. For example, the slotted fixed sized holes 90 may have an inner diameter of about 124 microns or less. An actuator structure can also be used to force open the split sleeve to open the slotted fixed sized holes 90 to about 126 microns or more to allow for insertion of the optical fibers. Once the optical fibers are inserted, the actuator structure disengages to release the split-sleeve 98 to allow the slotted holes 90 to close, compress, or shut tightly around the fiber cladding.

The slotted fixed sized holes 90 can include projections and/or grooves that are defined in an alignment passage 70b to reduce the collection of contamination within the alignment passage 70b by providing a location for which debris can collect.

The multi-fiber alignment device 34c also includes an open region 100 that may be filled with a non-gaseous fluid to clean fiber tips and improve optical mating.

Figure 14:
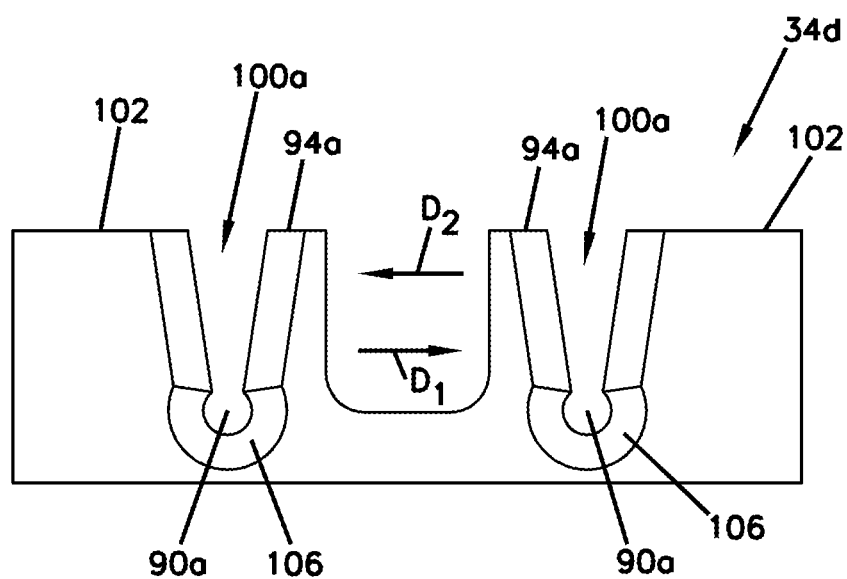
FIGS. 14-15 illustrate another example multi-fiber alignment device in accordance with the principles of the present disclosure.
Figure 15:
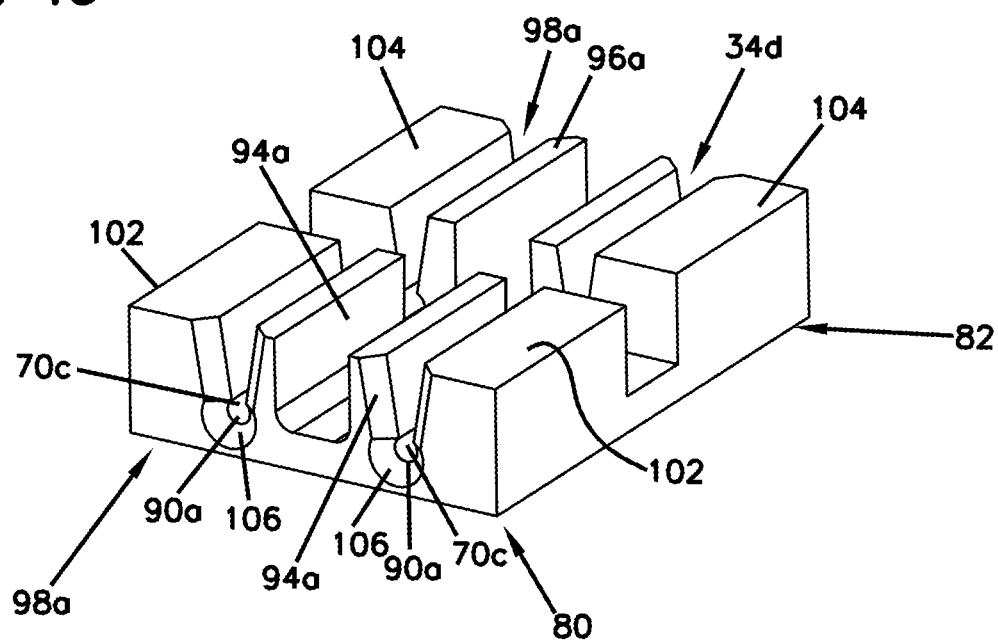
Figure 16:
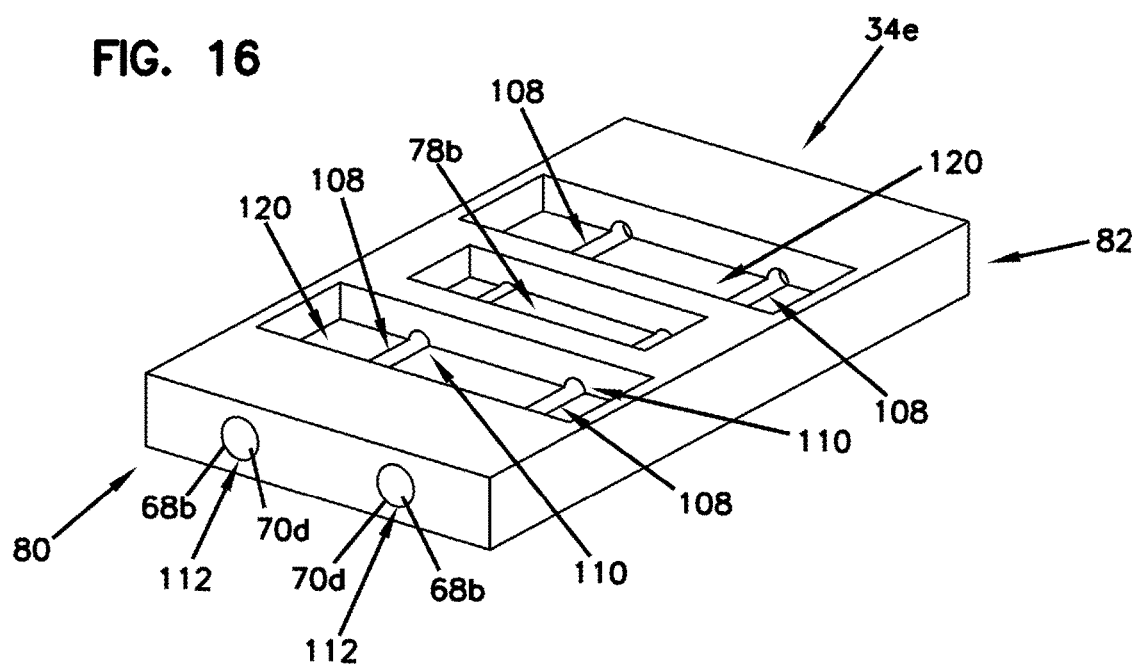
FIGS. 16-19 illustrate yet another example multi-fiber alignment device in accordance with the principles of the present disclosure.
Figure 17:
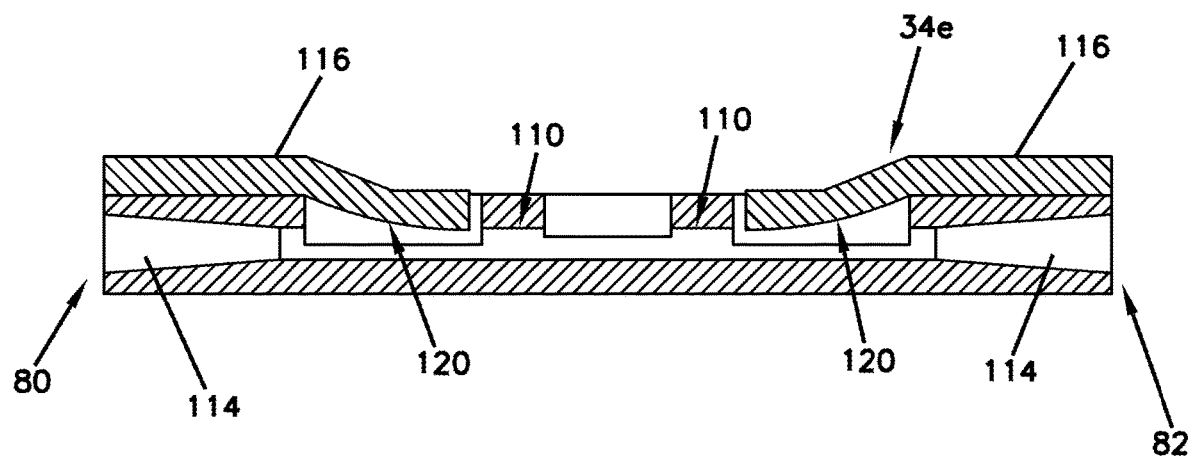

Referring to FIGS. 14 and 15, another example multi-fiber alignment device 34d is depicted with slotted fixed sized holes 90a at first and second ends 80, 82. The multi-fiber alignment device 34d is embodied with some of the same features and advantages as the multi-fiber alignment device 34c described above. For the sake of brevity, only those portions that differ from the multi-fiber alignment device 34c illustrated in FIGS. 12 and 13 discussed above will be described in detail.

The multi-fiber alignment device 34d includes a first side member 102, a first flexible jaw flange 94a that together act as a split sleeve 98a positioned at the first end 80. The multi-fiber alignment device 34d includes a second side member 104 and a second flexible jaw flange 96a that together act as a split sleeve 98a positioned at the second end 82. The first and second flexible jaw flanges 94a, 96a can be respectively moved in directions $D_2$, $D_3$ (see FIG. 14) between a non-alignment position where the slotted fixed sized holes 90a are opened to allow for insertion of optical fibers, and an alignment position where the slotted fixed sized holes 90a are closed to tighten down on fiber cladding of the optical fibers as described above with reference to FIGS. 12-13. The multi-fiber alignment device 34d can include an open region 100a that may be filled with a non-gaseous fluid to clean fiber tips and improve optical mating.

In one example, the fixed sized holes 68a of the multi-fiber alignment device 34a can include a first fixed sized hole defining a first passage extending along a fiber insertion axis 72 for receiving a first optical fiber and a second fixed sized hole defining a second passage for receiving the second optical fiber. The second passage can be aligned along the fiber insertion axis 72 and can be co-axial with the first passage.

In certain examples, the first and second passages can have open sides. The first and second passages can include hole-defining portions having circular curvatures. The hole-defining portions can be moveable between a first position where the hole-defining portions define a first diameter and a second position where the hole-defining portions define a second diameter. The first diameter can be larger than the second diameter. In some examples, a gel-filled gap can be positioned between the first and second passages. The hole-defining portions can be elastically biased toward the first position and elastically biased toward the second position.

In certain examples, the hole-defining portions can be moveable between a first position where the hole-defining portions define a first diameter along at least a majority of lengths of the first and second passages, and a second position where the hole-defining portions define a second diameter along at least a majority of the lengths of the first and second passages. The first diameter can be larger than the second diameter.

The multi-fiber alignment device 34d can include a lead-in chamfer 106 to facilitate guiding of the optical fiber into the alignment passage 70c. The slotted holes 90a can include projections or grooves to help reduce the collection of contamination within the alignment passage 70c by providing a location for which debris can collect.

Referring to FIGS. 16-19, another example multi-fiber alignment device 34e is depicted. The multi-fiber alignment device 34e is embodied with some of the same features and advantages as the multi-fiber alignment device 34a described above. For the sake of brevity, only those portions that differ from the multi-fiber alignment device 34a illustrated in FIG. 10 discussed above will be described in detail.

The example multi-fiber alignment device 34e includes an alignment passage 70d that has a combination of a v-groove (e.g., half circle, sphere, etc.) region 108 and a rigid hole alignment region 110. The multi-fiber alignment device 34e has a lead-in section 112 (e.g., opening, hole) which provides access to the v-groove region 108 for receiving the optical fibers. The lead-in section 112 may include a chamfer to facilitate guiding of the optical fiber into the v-groove region 108 of the alignment passage 70d by providing "funnels", shown generally at 114 (see FIG. 17) to get the optical fiber started in its v-groove region 108. The v-groove region 108 can provide coarse alignment (e.g., pre-alignment) by locating and positioning the optical fiber into the alignment passage 70d. The v-groove region 108 can be created with different widths to accommodate different size fibers. The optical fibers can be securely held in place by lever members 116 (see FIG. 17) respectively positioned in the multi-fiber alignment device 34e. The lever members 116 press the optical fiber toward a v-groove or a gap or slot defined by the v-groove region 108. Distal ends 118 of the lever members 116 facilitate centering and pre-alignment of the optical fibers. The distal ends 118 can extend downwardly in a recess 120 at an angle toward the optical fibers positioned in the v-groove region 108. It will be appreciated that the arrangement and configuration of the lever members 116 may vary in other examples such that they do not angle downward into the recess 120. The distal ends 118 of the lever members 116 are flexible and configured for urging the optical fibers into their respective v-groove regions 108.

Figure 18:
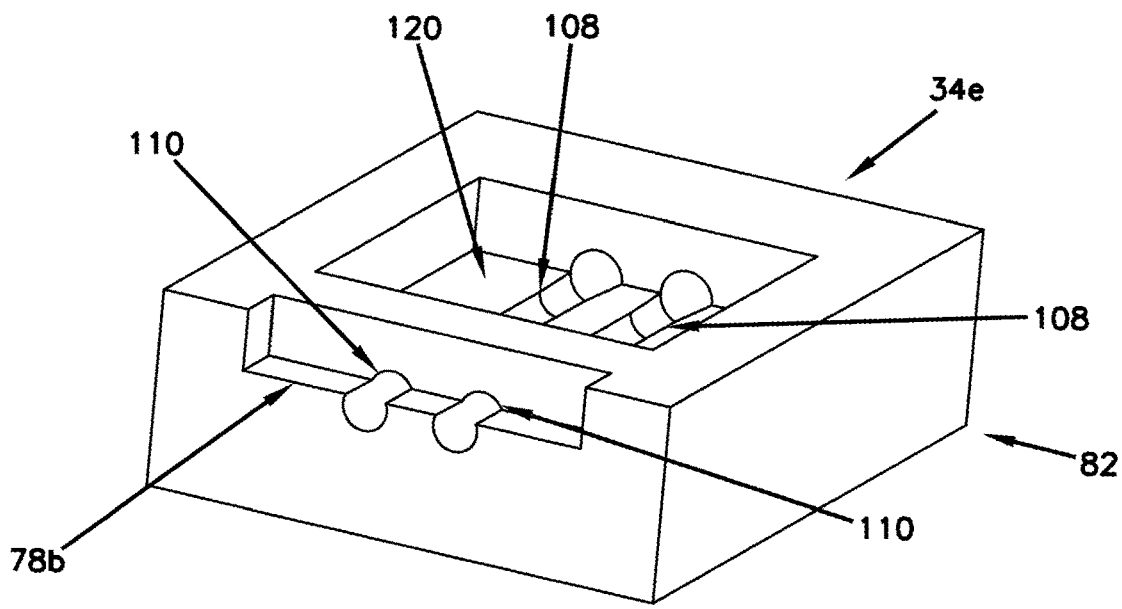
Figure 19:
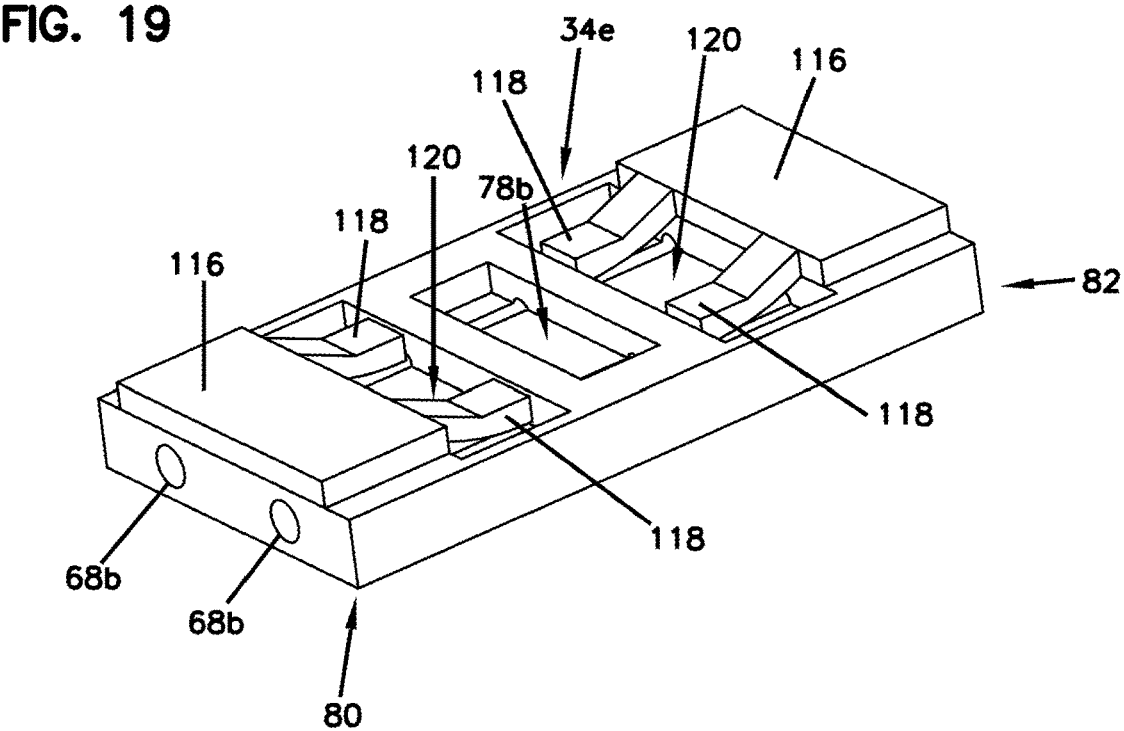

Referring to FIG. 18, the rigid hole alignment regions 110 allows for fine adjustment of the optical fiber if the lever members 116 fails to secure the optical fibers. The rigid hole alignment regions 110 has a shape configured to securely retain the optical fibers therein. The rigid hole alignment regions 110 of the multi-fiber alignment device 34e can be configured as a tight fitting hole to allow for tight tolerances. For example, the rigid hole alignment regions 110 have a much smaller opening compared with the v-groove region 108 to impose very tight alignment tolerances. The rigid hole alignment regions 110 provide fine alignment generally in a center of the multi-fiber alignment device 34e just prior to mating.

The rigid hole alignment regions 110 has a short length to help reduce the collection of debris therein. In certain examples, the rigid hole alignment regions 110 can include grooves or projections to reduce the collection of contamination by providing a location for which debris can collect.

The multi-fiber alignment device 34e also includes a cavity region 78b positioned between the first and second ends 80, 82 of the multi-fiber alignment device 34e. The cavity region 78b includes the same features and advantages as the cavity region 78 illustrated in FIG. 10. The rigid hole alignment regions 110 can be positioned on opposite sides of the cavity region 78b such that the optical fiber exiting the rigid hole alignment region 110 protrudes into the cavity region 78b to be mated with another optical fiber.

Figure 20:
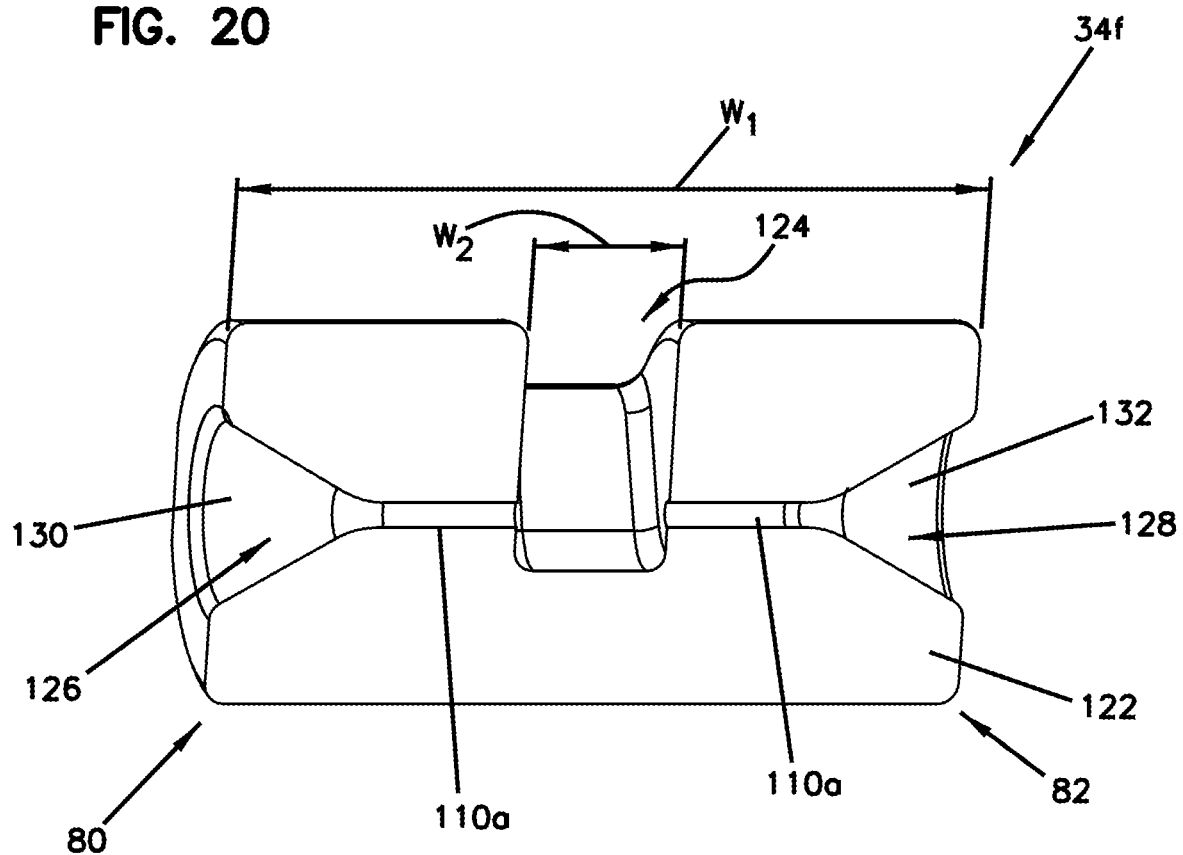
FIGS. 20-21 illustrate an example single-fiber alignment device in accordance with the principles of the present disclosure.
Figure 21:
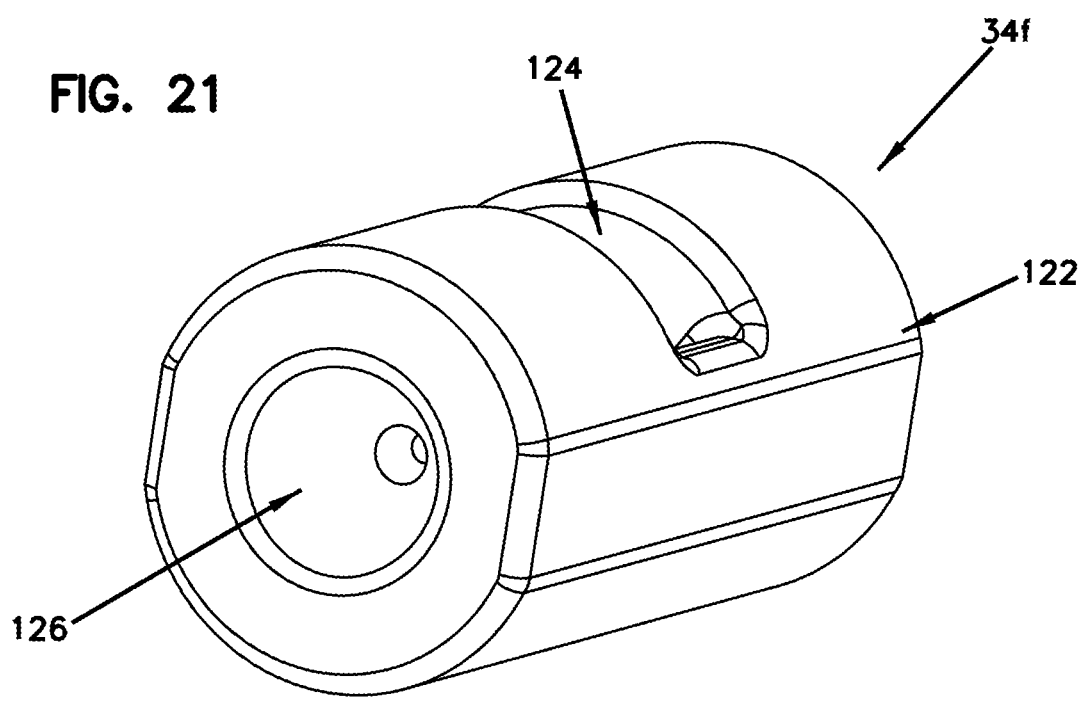

Referring to FIGS. 20-21, another example multi-fiber alignment device 34f is provided in accordance with principles of the present disclosure. The multi-fiber alignment device 34f includes an alignment housing 122, a center slot 124 formed in the alignment housing 122, and first and second bore alignment molds 126, 128 respectively positioned at first and second ends 80, 82. In the depicted example, the first and second bore alignment molds 126, 128 are arranged and constructed with funnels, shown generally at 130, 132 to facilitate guiding of the optical fibers into its respective rigid hole alignment region 110a. The rigid hole alignment regions 110a can provide for tight alignment tolerances in accordance with principles of the present disclosure.

In one example, the center slot 124 is in fluid communication with the rigid hole alignment regions 110a. This feature provides an advantage of being able to align the optical fibers in the center slot 124 if during manufacturing any miss-match of the first and second bore alignment molds 126, 128 is created. The alignment housing 122 is depicted as having a length $W_1$ of about 4 mm, although alternatives are possible. The center slot 124 is depicted as having a width $W_2$ of about 0.8 mm, although alternatives are possible.

Figure 22:
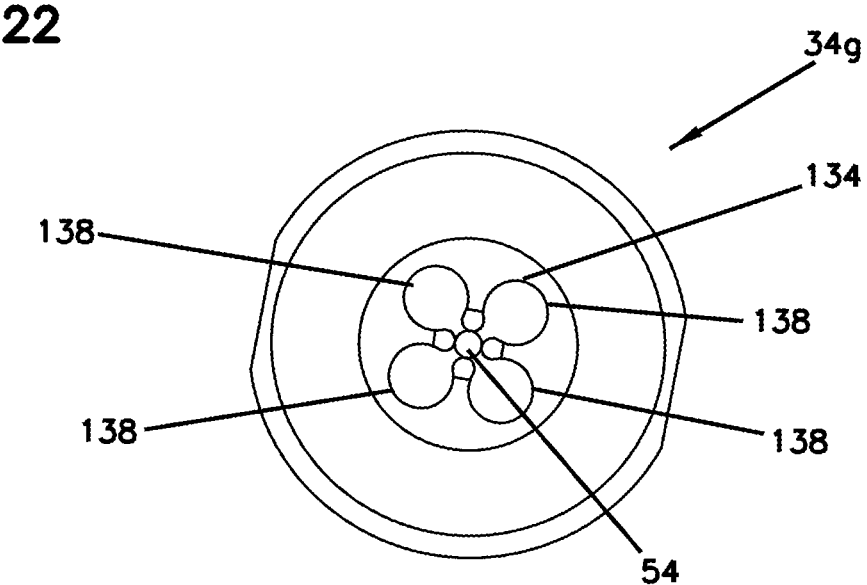
FIGS. 22-23 illustrate an example single-fiber alignment device in accordance with the principles of the present disclosure.
Figure 23:
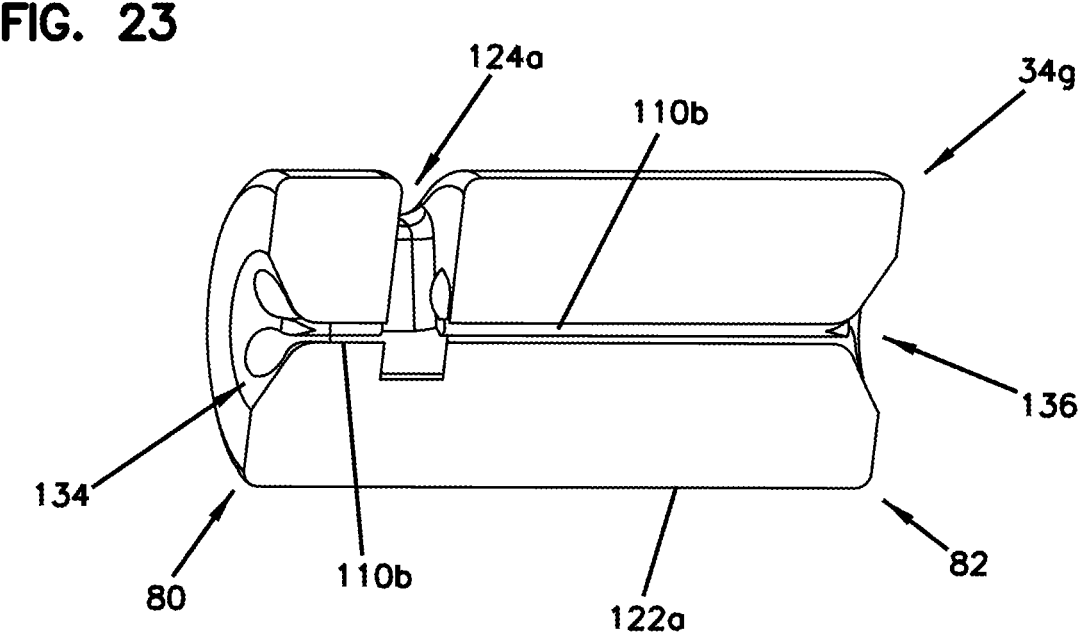
Figure 24:
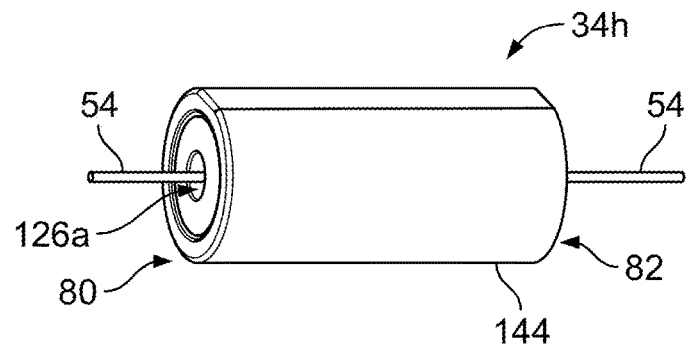
FIGS. 24-29 illustrate another example single-fiber alignment device in accordance with the principles of the present disclosure.
Figure 25:
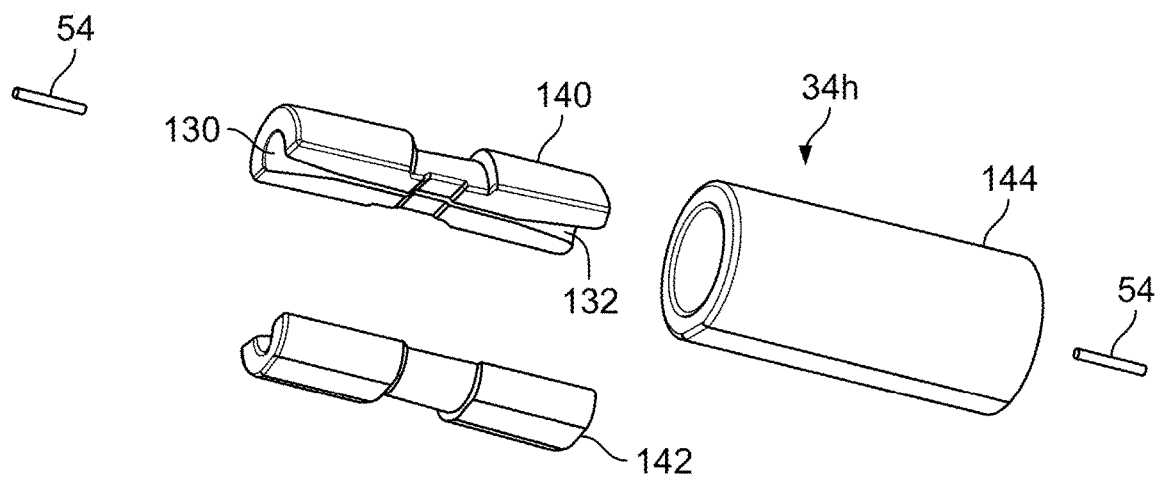
Figure 26:
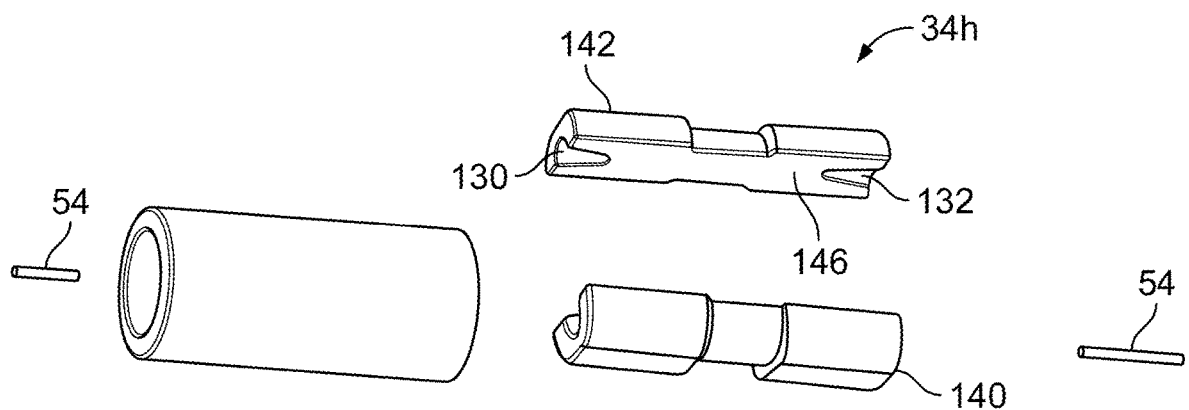
Figure 27:
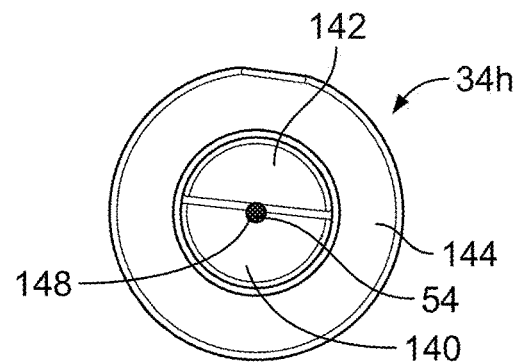
Figure 28:
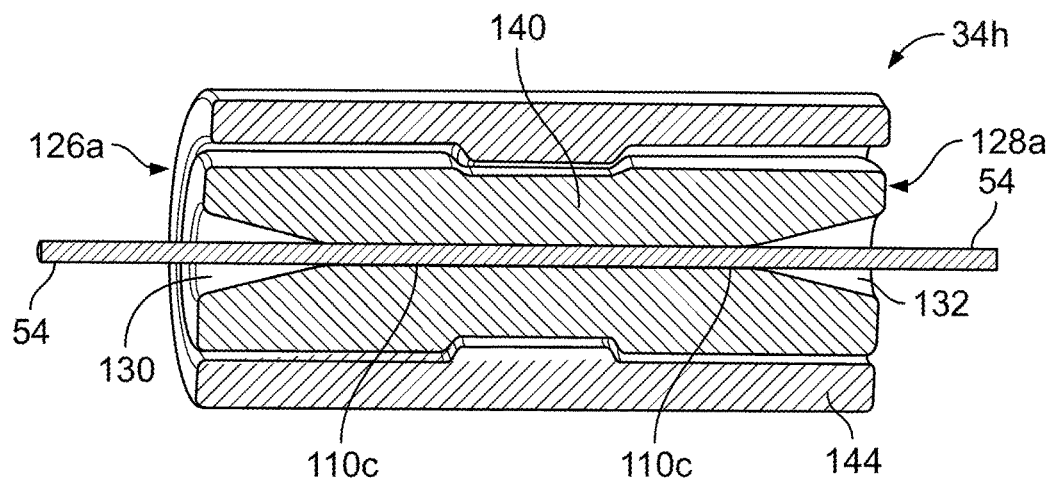
Figure 29:
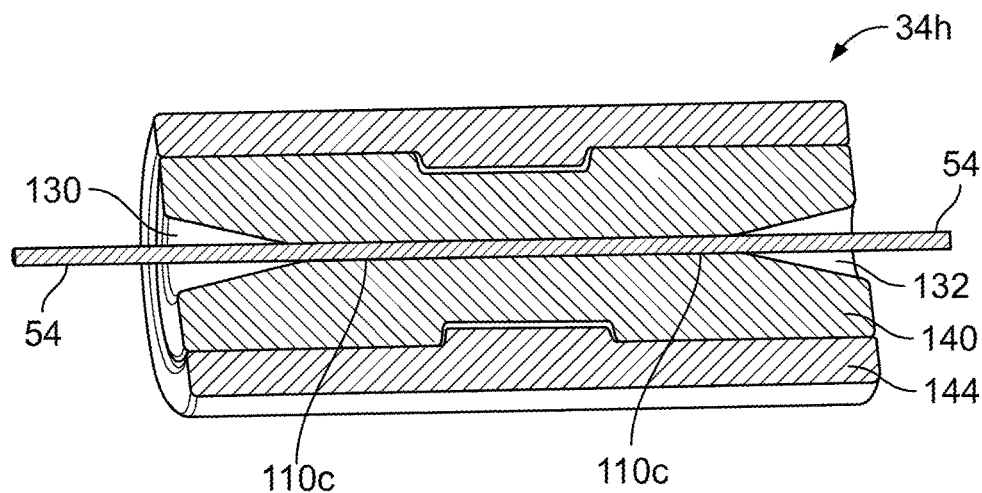
Figure 30:
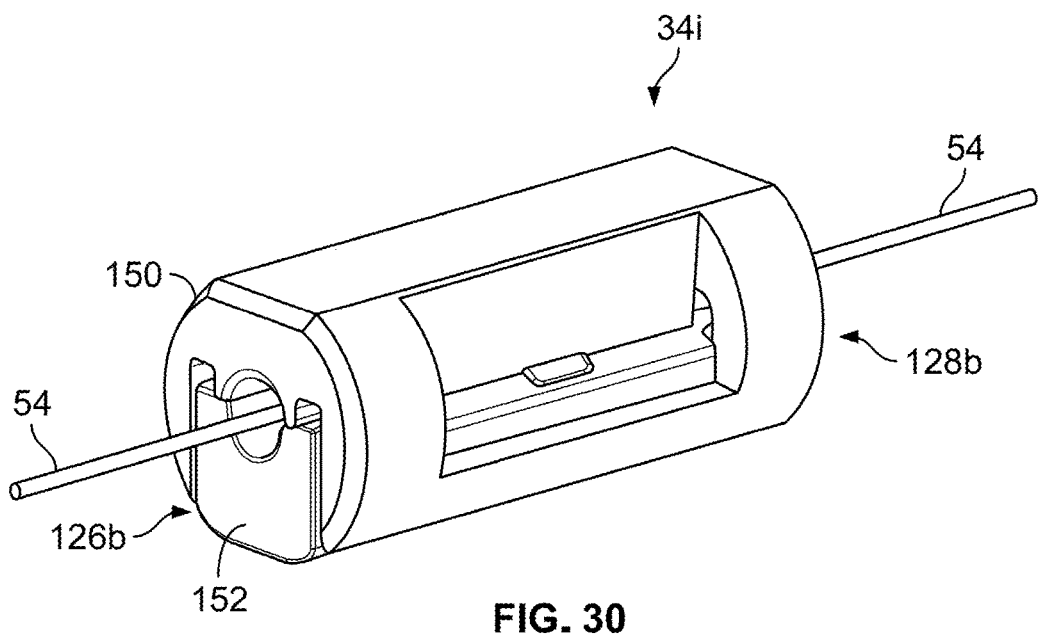
FIGS. 30-33 illustrate another example single-fiber alignment device in accordance with the principles of the present disclosure.
Figure 31:
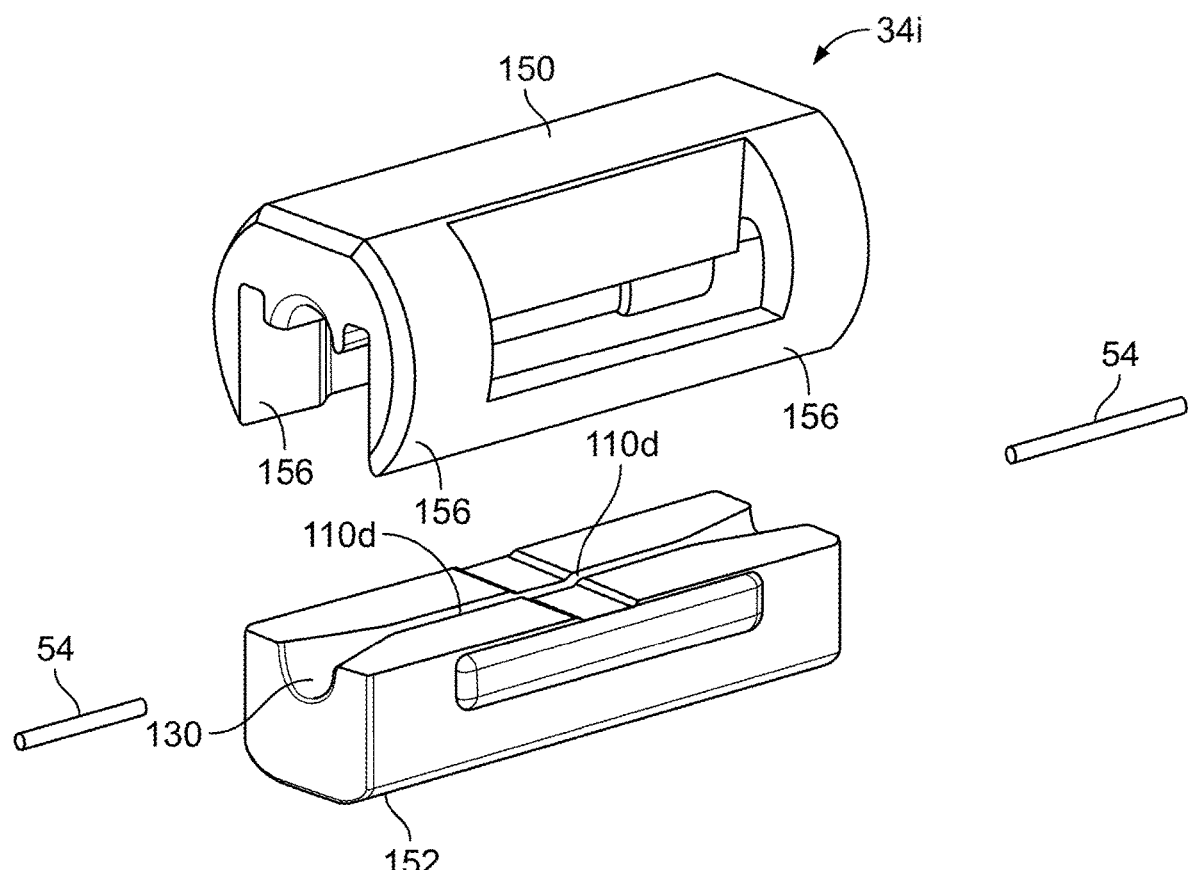

FIGS. 22-23 show another example multi-fiber alignment device 34g that is embodied with some of the same features and advantages as the multi-fiber alignment device 34f described above. For the sake of brevity, only those portions that differ from the multi-fiber alignment device 34f illustrated in FIGS. 20 and 21 discussed above will be described in detail.

In this example, the multi-fiber alignment device 34g is not constructed with a round bore. The multi-fiber alignment device 34g is arranged and constructed with first and second bore alignment molds 134, 136 that each include corners 138 (e.g., pockets) similar to a 4-leaf clover design. In one example, the optical fiber 54 is aligned and secured within its respective rigid hole alignment region 110b between the corners 138 of respective first and second bore alignment molds 134, 136. In other examples, the center slot 124a defined in the alignment housing 122a can be positioned off-center such that the optical fibers can be aligned in the bore. The example multi-fiber alignment device 34g can allow space for a non-gaseous fluid, such as, gel to disperse and move out of the way.

FIGS. 24-29 illustrate another example multi-fiber alignment device 34h that includes first and second bore alignment molds 126a, 128a respectively positioned at first and second ends 80, 82 for aligning two opposing optical fibers. The first and second bore alignment molds 126a, 128a each include a rigid hole alignment region 110c (e.g., fixed sized hole). In the example depicted, the first and second bore alignment molds 126a, 128a of the multi-fiber alignment device 34h are constructed in multiple parts. For example, the multi-fiber alignment device 34h includes a first housing piece 140 (e.g., top piece, upper body, first part etc.), a second housing piece 142 (e.g., bottom piece, lower body, second part, etc.), and a sleeve 144. The first and second housing pieces 140, 142 are adapted to be mated together. The first and second housing pieces 140, 142 cooperate to define the rigid hole alignment regions 110c (e.g., fixed sized holes). The sleeve 144 is arranged and configured to slide over the first and second housing pieces 140, 142 to lock the first and second housing pieces 140, 142 in place.

The first housing piece 140 is arranged and configured with the rigid hole alignment region 110c to align optical fibers 54 while the second housing piece 142 includes a flat surface 146 (see FIG. 26), although alternatives are possible. For example, the first housing piece 140 may include a flat surface and the second housing piece 142 may include a rigid hole alignment region. In certain examples, the first housing piece 140 defines grooves defining first portions of the rigid hole alignment regions 110c, and the second housing piece 142 includes a flat portion that opposes the grooves and defines second portions of the rigid hole alignment regions 110c. In the depicted example, the first and second housing pieces 140, 142 are arranged and constructed with "funnels", shown generally at 130, 132 to facilitate guiding of the optical fibers 54 into its respective rigid hole alignment region 110a. Further gel can be positioned within the rigid hole alignment regions 110c.

In one example, a fixed cross-dimension of the rigid hole alignment regions 110c is no more than 1.5 microns larger than a maximum outer diameter of the optical fiber. In other examples, a fixed cross-dimension of the rigid hole alignment regions 110c is no more than 1.0 microns larger than a maximum outer diameter of the optical fiber. In certain examples, a fixed cross-dimension of the rigid hole alignment regions 110c is no more than 0.5 microns larger than a maximum outer diameter of the optical fiber. The fixed cross-dimension of the rigid hole alignment regions 110c can be in the range of 125.5 to 126.5 microns.

In one example, the rigid hole alignment region 110c of the first housing piece 140 can include a groove 148 (e.g., slot,) (see FIG. 27) that can be a v-groove (e.g., half circle, sphere, etc.) at the bottom to create a two point contact in the groove 148. A third point contact of the groove 148 can be positioned on the second housing piece 142. Thus, the first and second housing pieces 140, 142 create the alignment groove for the multi-fiber alignment device 34h. The features of the multi-fiber alignment device 34h allow for an open close mold which is easier to manufacture. Also, with such a design, a venting feature can be easily implemented into the multi-fiber alignment device 34h.

FIGS. 30-33 illustrate another example multi-fiber alignment device 34i that includes first and second bore alignment molds 126b, 128b respectively positioned at first and second ends 80, 82 for aligning two opposing optical fibers. The first and second bore alignment molds 126b, 128b each include a rigid hole alignment region 110d. The multi-fiber alignment device 34i is embodied with some of the same features and advantages as the multi-fiber alignment device 34h described above. For the sake of brevity, only those portions that differ from the multi-fiber alignment device 34h illustrated in FIGS. 24-29 discussed above will be described in detail.

In the example depicted, the multi-fiber alignment device 34i includes two parts, a first housing piece 150 (e.g., top piece, upper body, etc.) and a second housing piece 152 (e.g., bottom piece, lower body, etc.) adapted to mate together. The first and second housing pieces 150, 152 can be sealed together via lockable sealing clamps 156, although alternatives are possible. For example, a snap fit connection interface may be used to hold the first and second housing pieces 150, 152 together in a closed position. It will be appreciated that some other fastening feature, or any combination thereof, may be used.

Figure 32:
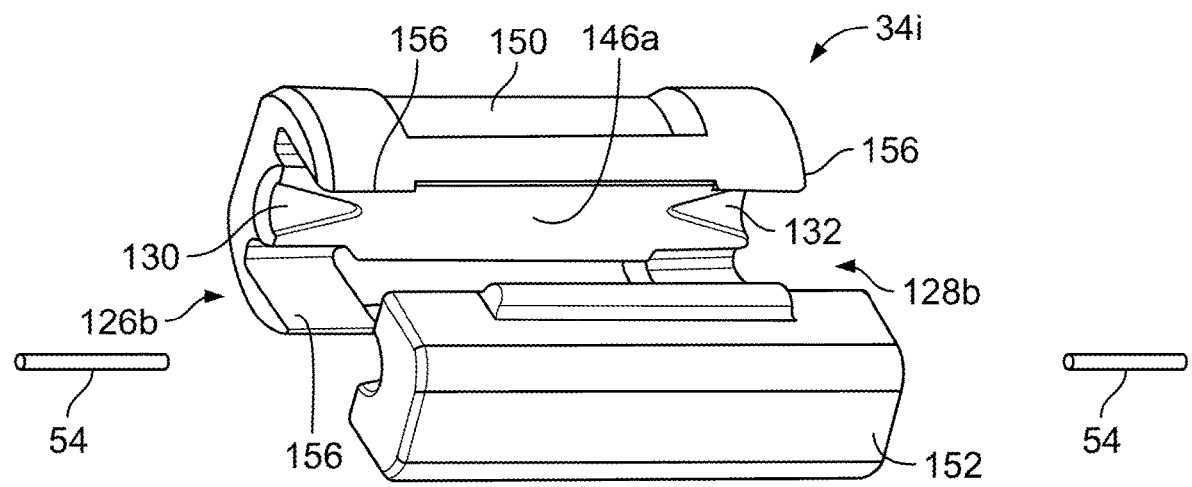
Figure 33:
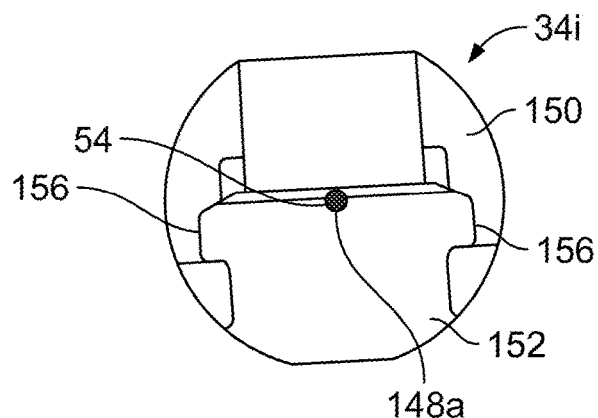
Figure 34:
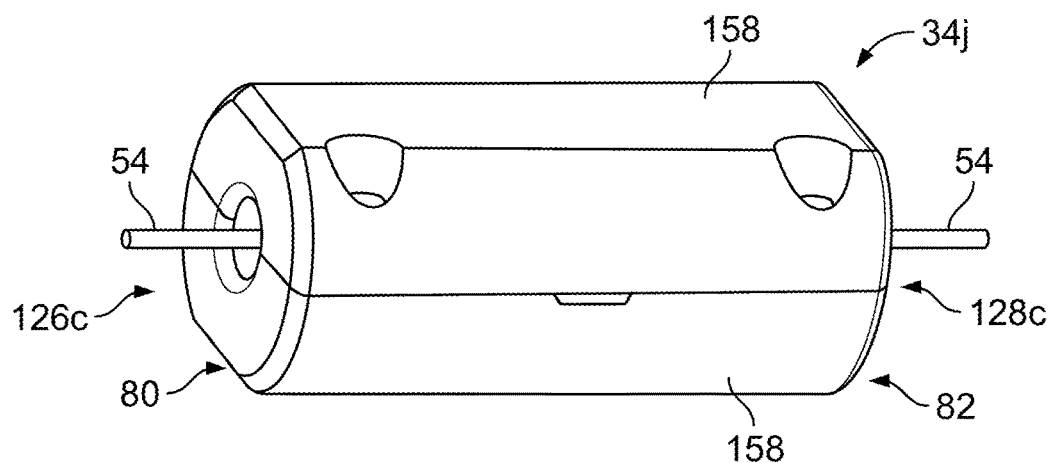
FIGS. 34-37 illustrate another example single-fiber alignment device in accordance with the principles of the present disclosure.
Figure 35:
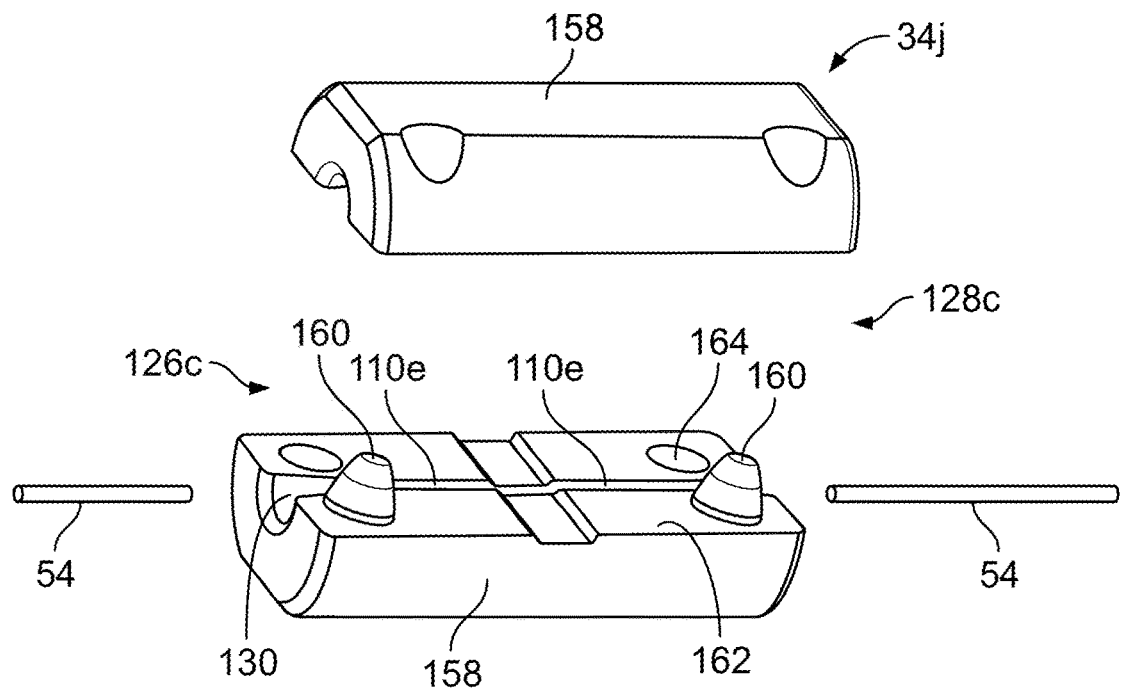
Figure 36:
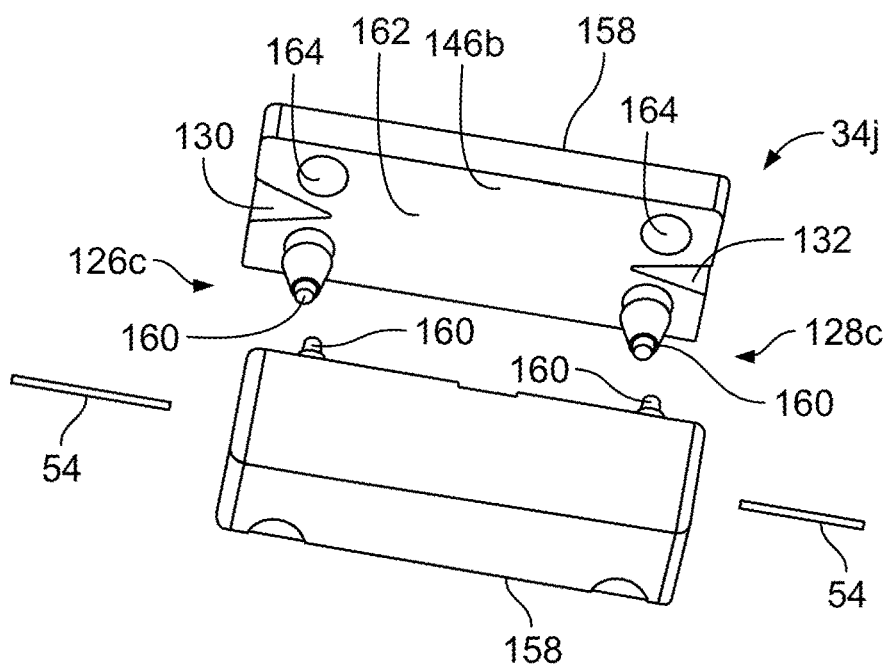
Figure 37:
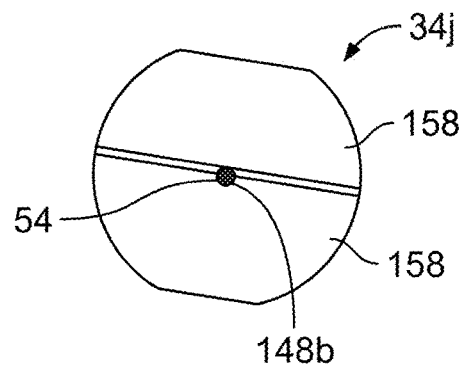
Figure 38:
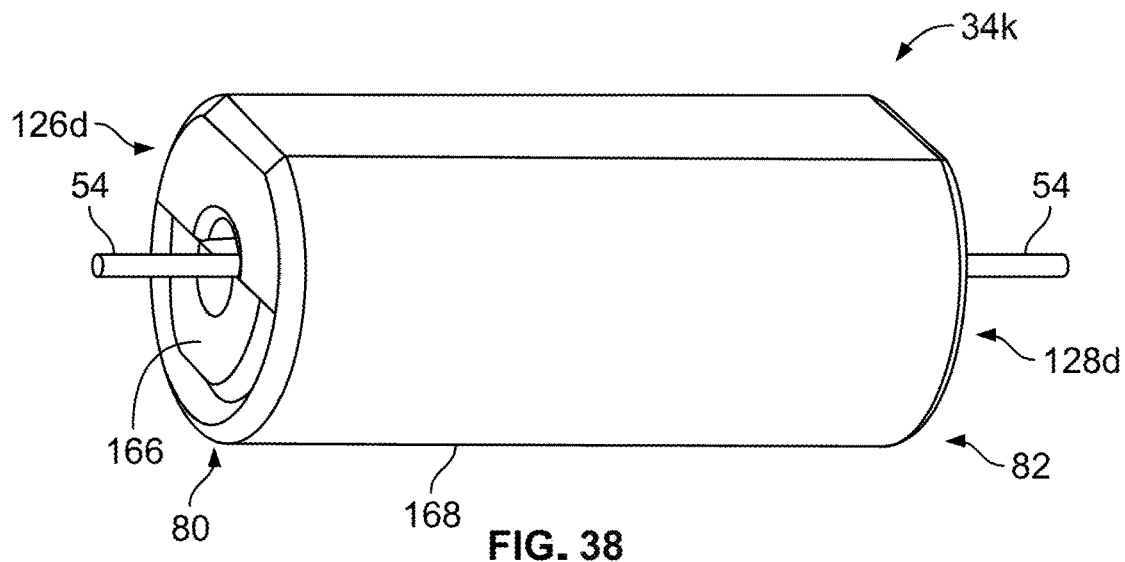
FIGS. 38-41 illustrate another example single-fiber alignment device in accordance with the principles of the present disclosure.
Figure 39:
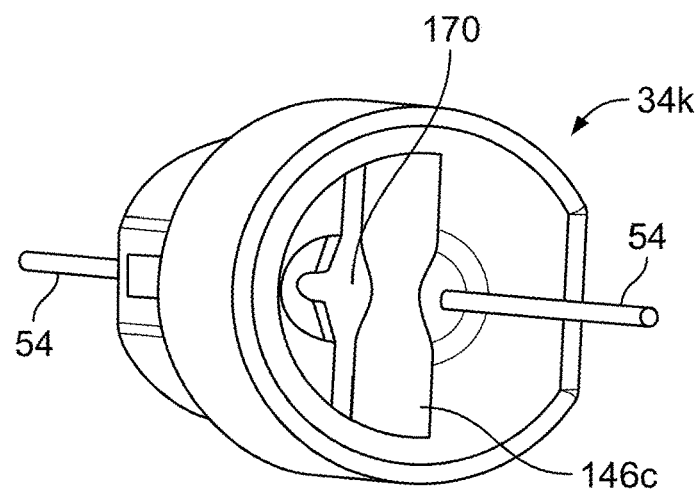
Figure 40:
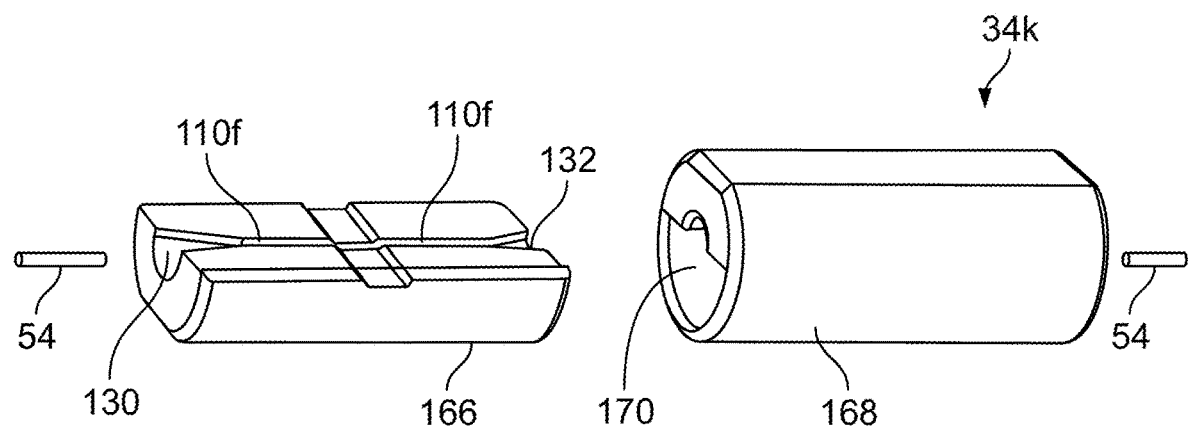
Figure 41:
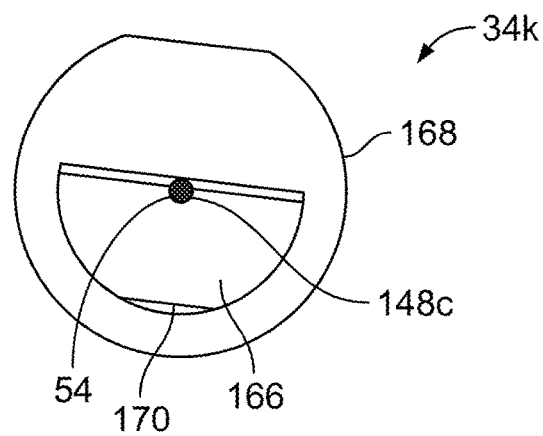

In the example depicted, one of either the first and second housing pieces 150, 152 can contain the rigid hole alignment region 110d, while the other of the first and second housing pieces 150, 152 includes a flat surface 146a (see FIG. 32). In the example shown, the first housing piece includes the flat surface 146a and the second housing pieces includes the rigid hole alignment region 110d.

FIGS. 34-37 illustrate another example multi-fiber alignment device 34j that includes first and second bore alignment molds 126c, 128c respectively positioned at first and second ends 80, 82 for aligning two opposing optical fibers. The first and second bore alignment molds 126c, 128c each include a rigid hole alignment region 110e. The multi-fiber alignment device 34j is embodied with some of the same features and advantages as the multi-fiber alignment devices 34h, 34i described above. For the sake of brevity, only those portions that differ from the multi-fiber alignment devices 34h, 34i illustrated in FIGS. 24-33 discussed above will be described in detail.

In the example depicted, the multi-fiber alignment device 34j includes two identical housing pieces 158 that include a top piece (e.g., upper body, etc.) and a bottom piece (e.g., lower body, etc.) adapted to mate together to create a precision bore with the rigid hole alignment region 110e. In the example depicted, the housing pieces 158 form the rigid hole alignment region 110e which has a groove 148b with a round shape, although alternatives are possible. For example, the groove can include a v-shape (e.g., half circle, sphere, etc.). In certain examples, the housing pieces 158 can be different parts where one of the housing pieces 158 contains a rigid hole alignment region and the other one of the housing pieces includes a flat surface. The housing pieces 158 are arranged and constructed with "funnels", shown generally at 130, 132 to facilitate guiding of the optical fibers 54 into its respective rigid hole alignment region 110e.

The housing pieces 158 can be sealed together via lockable sealing clamps, although alternatives are possible. For example, a snap fit connection interface may be used to hold the housing pieces 158 together in a closed position. In the example depicted, pegs 160 are formed on and extend from an inner face 162 of the housing pieces 158 on opposite sides thereof. A hole 164 is defined in the inner face 162 of the housing pieces 158 to receive the pegs 160 to secure the housing pieces together 158. It will be appreciated that some other fastening feature, or any combination thereof, may be used.

FIGS. 38-41 illustrate another example multi-fiber alignment device 34k that includes first and second bore alignment molds 126d, 128d respectively positioned at first and second ends 80, 82 for aligning two opposing optical fibers. The first and second bore alignment molds 126d, 128d each include a rigid hole alignment region 110f. The multi-fiber alignment device 34k is embodied with some of the same features and advantages as the multi-fiber alignment devices 34h, 34i, 34j described above. For the sake of brevity, only those portions that differ from the multi-fiber alignment devices 34h, 34i, 34j illustrated in FIGS. 24-37 discussed above will be described in detail.

In the example depicted, the multi-fiber alignment device 34k includes two parts, an insert piece 166 and an insert housing 168. The insert housing 168 defines an opening 170 for receiving the insert piece 166 therein. The insert housing 168 is adapted to slide over the insert piece 166. In other examples, the insert housing 168 can be arranged and configured with a slot, opening, or undercut in one of its sides.

In the example depicted, the insert piece 166 is arranged and configured with the rigid hole alignment region 110*f* to align optical fibers 54 while the insert housing 168 includes a flat surface 146*c* (see FIG. 39), although alternatives are possible. For example, the insert piece 166 may include a flat surface and the insert housing 168 may include a rigid hole alignment region. In the depicted example, the insert piece 166 and the insert housing 168 are arranged and constructed with "funnels", shown generally at 130, 132 to facilitate guiding of the optical fibers 54 into its respective rigid hole alignment region 110*f*.

In one example, the rigid hole alignment region 110*f* of the insert piece 166 can include a groove 148*c* (see FIG. 41) that has a v-groove shape (e.g., half circle, sphere, etc.) at the bottom to create a two point contact in the groove 148*c*. A third point contact of the groove 148*c* can be positioned on the insert housing 168.

Figure 42:
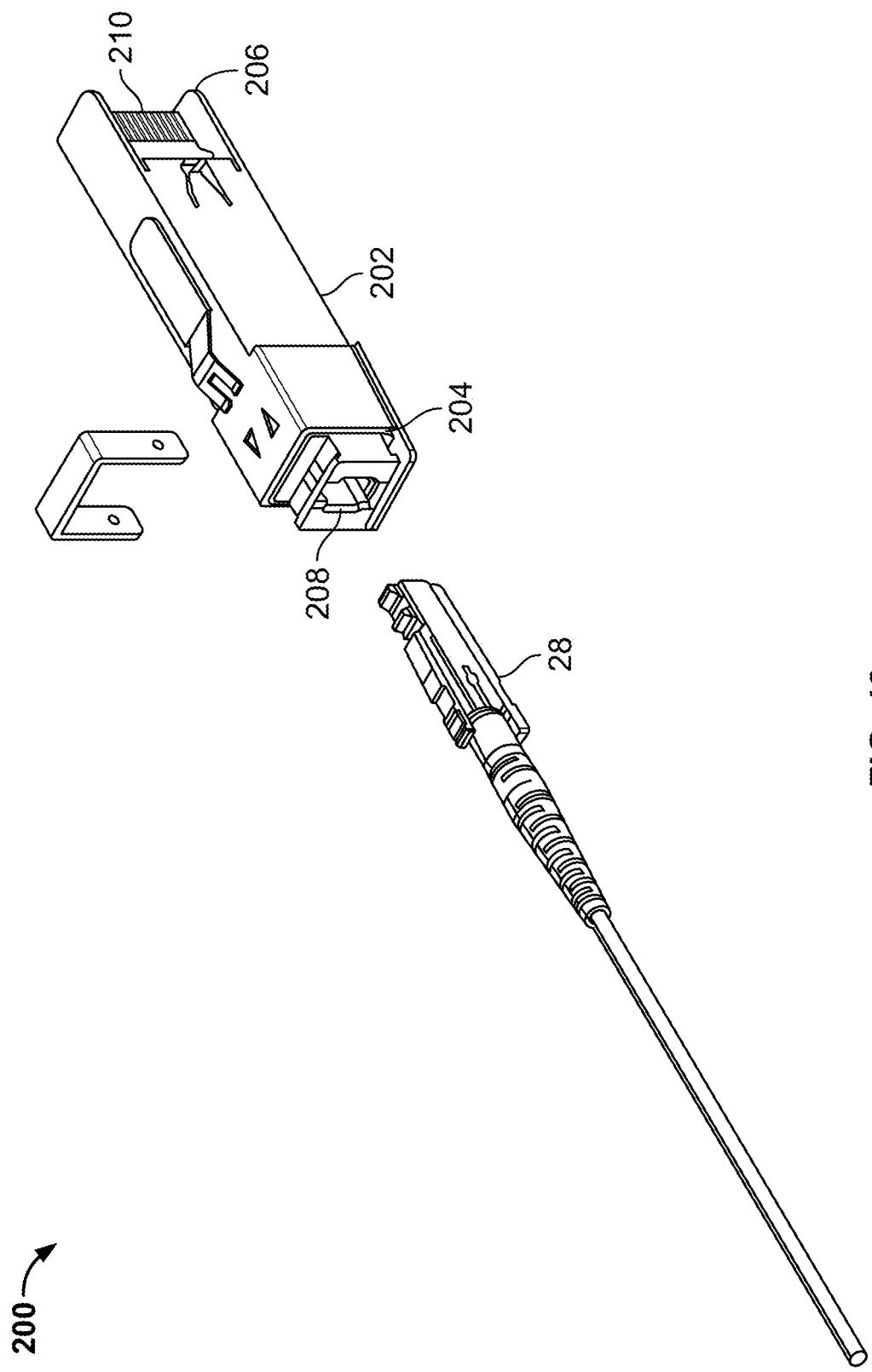
FIG. 42 illustrates a first perspective view of an optical transceiver module adapted to interface with the duplex fiber optic connector of FIG. 3.
Figure 43:
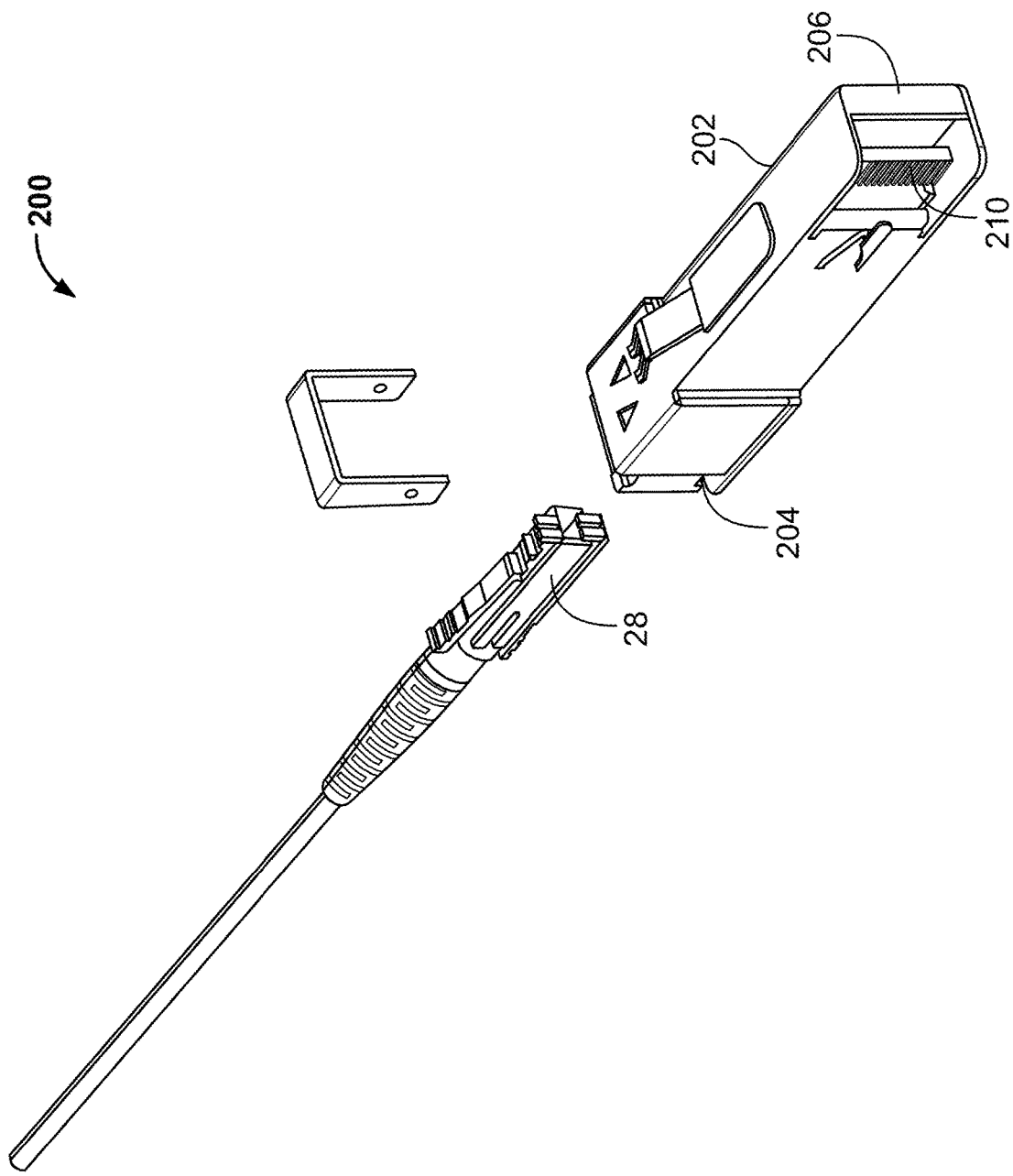
FIG. 43 illustrates a second perspective view of the optical transceiver module of FIG. 42.
Figure 44:
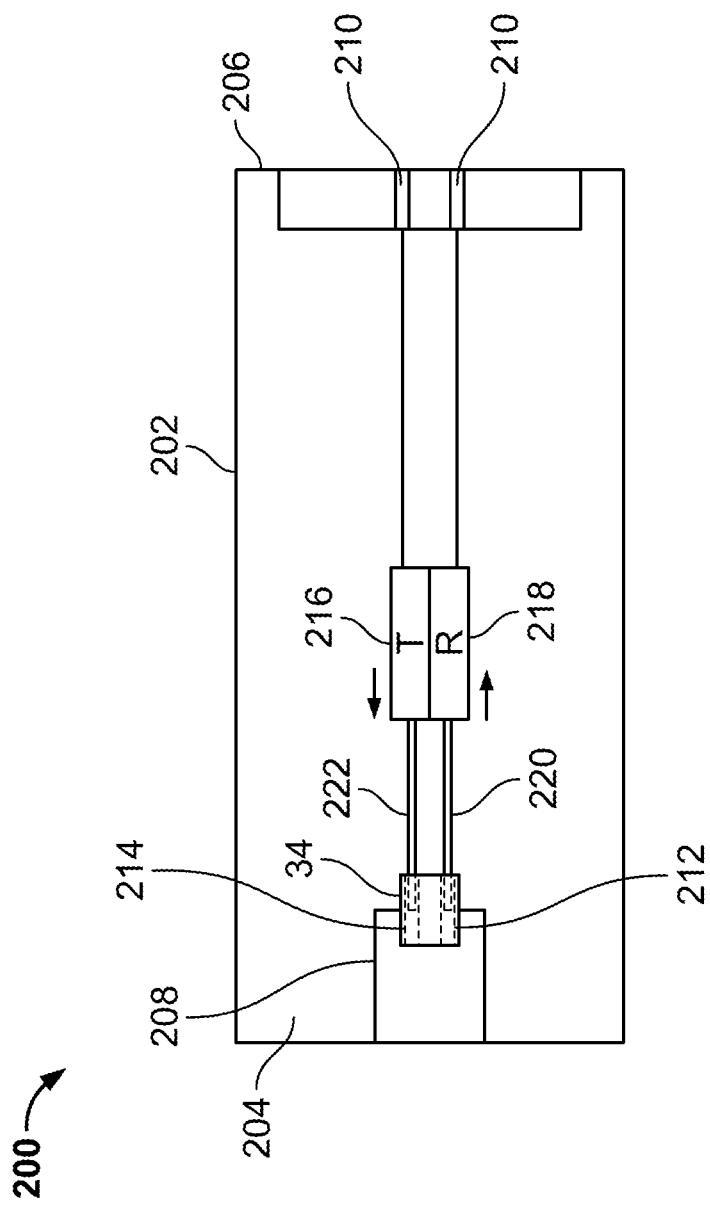
FIG. 44 is a schematic depiction of the optical transceiver module of FIG. 42.

Another aspect of the present disclosure relates to an optical transceiver module 200 depicted in FIGS. 42-44. The optical transceiver module 200 is adapted to interface with one of the duplex fiber optic connectors 28. The optical transceiver module 200 includes a housing 202 having a first end 204 and a second end 206. An optical interface is provided at the first end 204 and an electrical interface is provided at the second end 206. The optical transceiver module 200 can also include contacts for receiving power and can be configured for transmitting electrical power through the electrical interface at the second end 206 and for directing power to active components (optical to electrical converters and electrical to optical converters) within the housing 202. In one example, the optical transceiver module 200 can have an industry standard form factor such as an SFP (Small Form-factor Pluggable) form factor.

The optical interface at the first end 204 of the housing 202 can include a port 208 for receiving one of the duplex fiber optic connectors 28. The port 208 can have the same configuration as the previously described adapter port 32. The electrical interface at the second end 206 of the housing 202 can include electrical contacts 210. The electrical contacts 210 are depicted as electrically conductive pads (e.g., card-edge contacts) supported on a printed circuit board, but could also be conductive springs or other electrically conductive elements. The fiber optic adapter 30 can also include any of the previously described multi-fiber alignment devices 34*a-k* for aligning non-ferrulized optical fibers to provide optical coupling (e.g., detachable/disengageable optical connections) between non-ferrulized optical fibers. As shown at FIG. 44, the multi-fiber alignment devices 34*a-k* can include first and second fiber alignment passages 212, 214 for individually receiving the optical fibers 54 of the duplex fiber optic connectors 28 when the duplex fiber optic connectors 28 is inserted in the port 208.

The optical transceiver module 200 can includes a transmit component 216 (e.g., a light emitting component) and a receive component 218 (e.g., a light receiving component). The transmit component 216 and the receive component 218 are electrically connected to separate electrical contacts 210 at the electrical interface of the optical transceiver module (e.g., via electrical paths such as wires or tracings) and are optically coupled to the optical interface (e.g., via optical fibers). The transmit component can include structure for converting electrical signals to optical signals (an electrical to optical converter) and can include a light emitter. An example structure can include a laser diode such as a Vertical Cavity Surface Emitter Laser (VCSEL) or an edge emitting laser. The receive component can include structure for converting optical signals into electrical signals (e.g., an optical to electrical converter). An example structure can include a photodiode. The optical transceiver module 200 also includes first and second optical fibers 220, 222 having first ends received respectively within the fiber alignment passages 212, 214 of the multi-fiber alignment device 34. When the duplex fiber optic connector 28 is inserted in the port 208, the multi-fiber alignment device 34 causes (e.g., through mechanical co-axial alignment) the optical fibers 220, 222 to be optically coupled to the optical fibers 54 of duplex fiber optic connector 28. A second end of the first optical fiber 220 can be optically coupled to the receive component 218 by a direct optical connection such as an optical surface mount connection. A second end of the second optical fiber 222 can be optically coupled to the transmit component 216 by a direct optical connection such as an optical surface mount connection. Example optical transceiver modules are disclosed in U.S. Provisional Patent Application Ser. No. 62/419,266 which is hereby incorporated by reference in its entirety.

Certain examples of the present disclosure relate to alignment devices that have a plurality of grooves for receiving optical fibers and a structure arranged and configured to hold the optical fibers in a respective one of the plurality of grooves.

As used herein, the term, "groove," is defined generally as an elongate structure that can receive and support an optical fiber. In one example, the elongate structure can have two surfaces that are angled such that when an optical fiber lies within the groove, the optical fiber makes line contact with the two surfaces. The elongate structure can be defined by one component (e.g., a groove in a plate) or multiple components (e.g., a groove defined by two parallel rods).

Generally a groove will have an open side and a closed side in which an optical fiber sits. In one example, the groove may include a v-groove that has angled surfaces. In such an example, the v-groove will have a structure that preferably provides two lines of contact with an optical fiber inserted therein. In this way, the line/point contact with the v-groove assists in providing accurate alignment of the optical fibers. It will be appreciated that the V-shape is not essential, although it is essential that there be a surface or surfaces against which the fiber contacts and is located. For example, a U-shape, or a trough shape, or other similar shape could also be used, or a curved surface with a radius matched to the radius of the optical fiber could be used. A groove may be formed by the sides of parallel rods.

Certain examples of the present disclosure can include a structure that can be used to press optical fibers or hold the optical fibers in grooves. In one example, the structure may be a flat plate used to press the optical fibers in the grooves. The flat plate may provide a rigid bore style alignment, although alternatives are possible. A spring style structure may also be used to bias the optical fibers into the grooves. In a preferred example, the spring style structure can be a plate that has a plurality of elastic members. The plurality of elastic members can include cantilever springs, springs integral with plates or other body, metal springs, plastic springs, coil springs, springs biasing additional contact structures such as balls, etc., although alternatives are possible.

Four example fiber alignment devices are illustrated and described in detail with reference to FIGS. 48-59. It will be appreciated that such examples can also relate to single fiber alignment devices, but aspects are particularly applicable to multi-fiber alignment devices for aligning multiple sets of optical fibers. Each of the alignment devices can include an outer housing. The housing can have a plurality of openings and guide surfaces for guiding optical fibers. The housing can be arranged and configured to hold the alignment device and generally mount the alignment device inside an adapter for receiving ferrule-less fiber optic connectors. For example, the housing can include flanges that are adapted to interface with (e.g., be captured in) the adapter for securing the alignment device therein. It will be appreciated that the housing can hold alignment devices of different styles, as will be described below.

Figure 45:
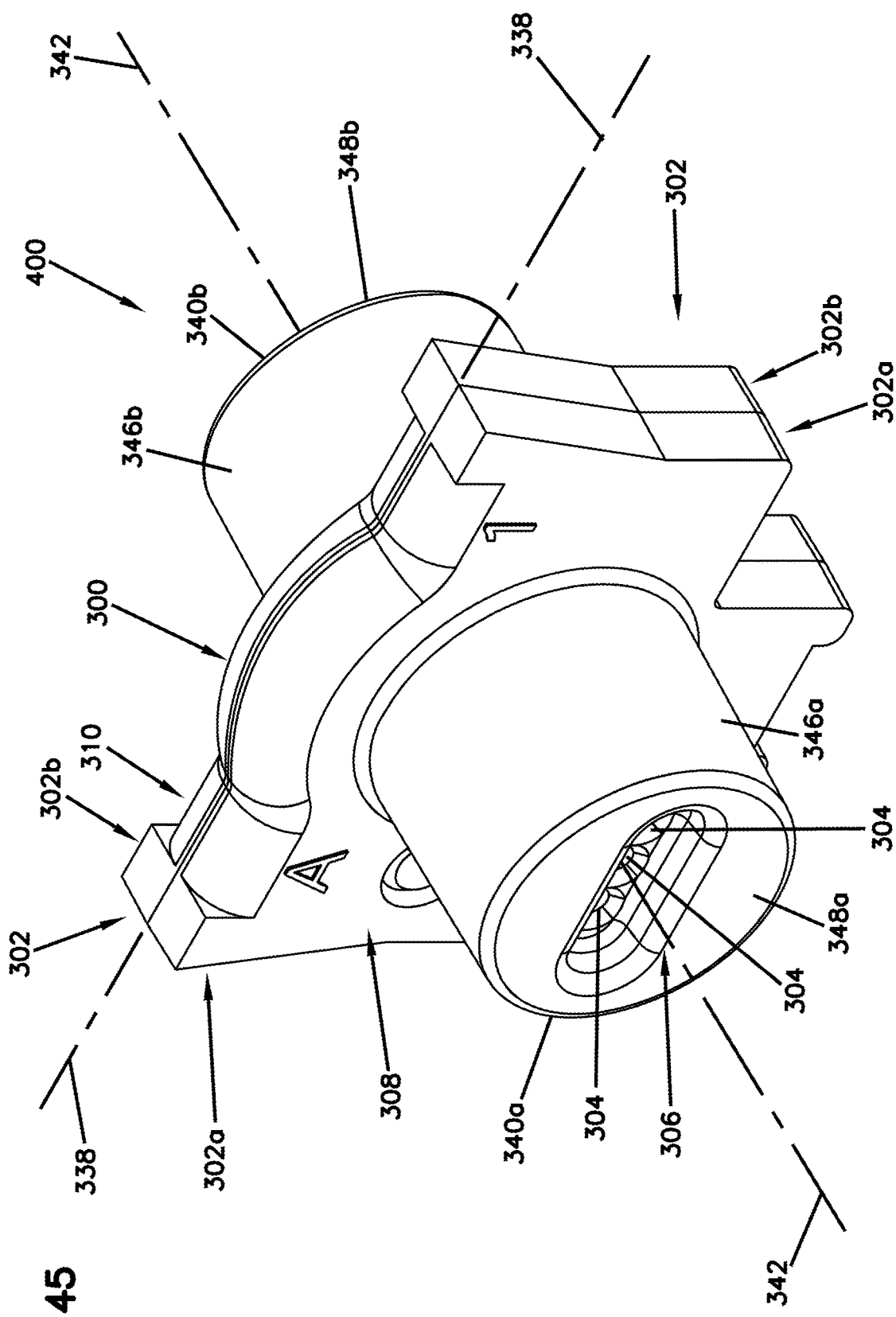
FIGS. 45-47 illustrate an example alignment system in accordance with the principles of the present disclosure.
Figure 46:
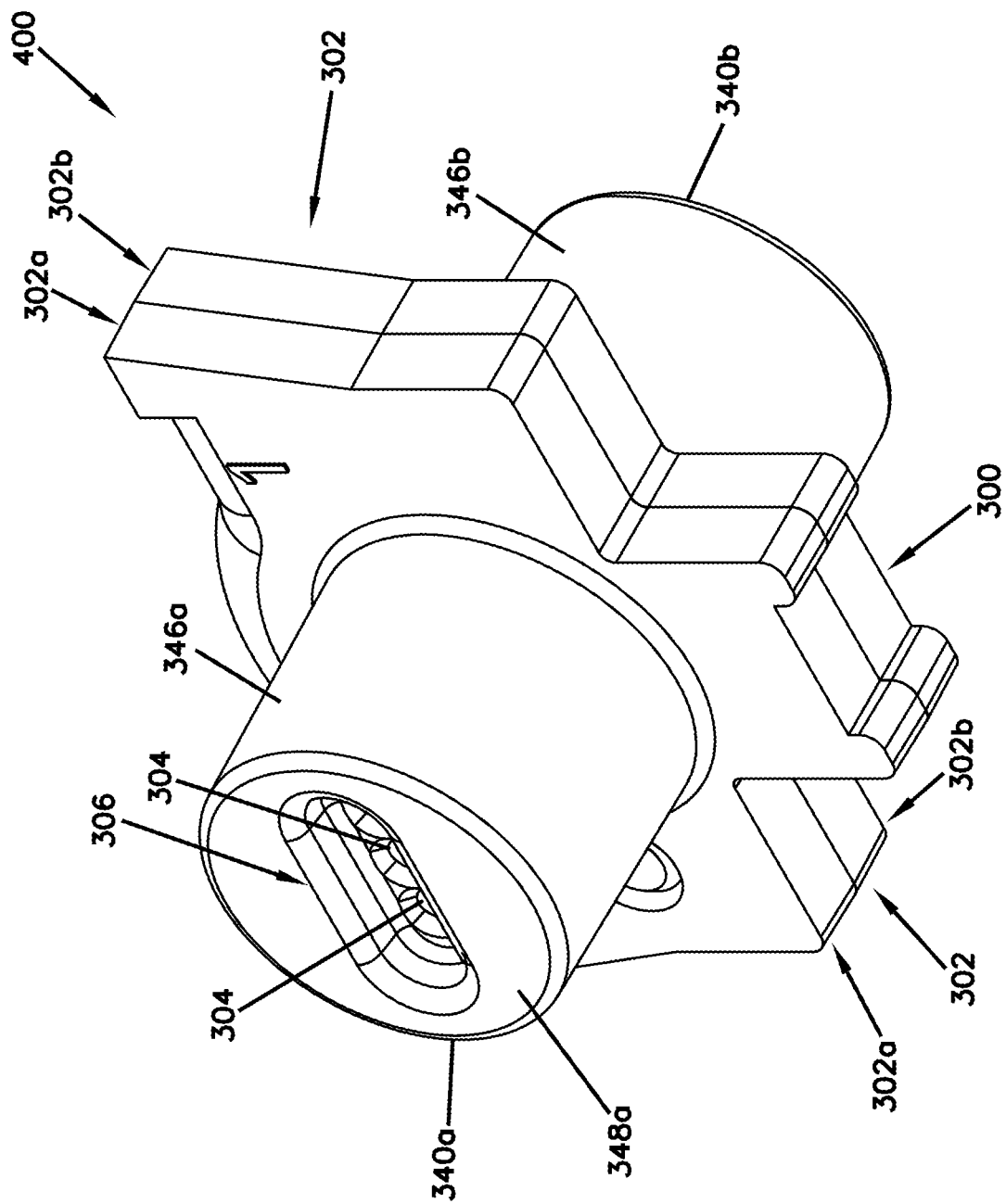
Figure 47:
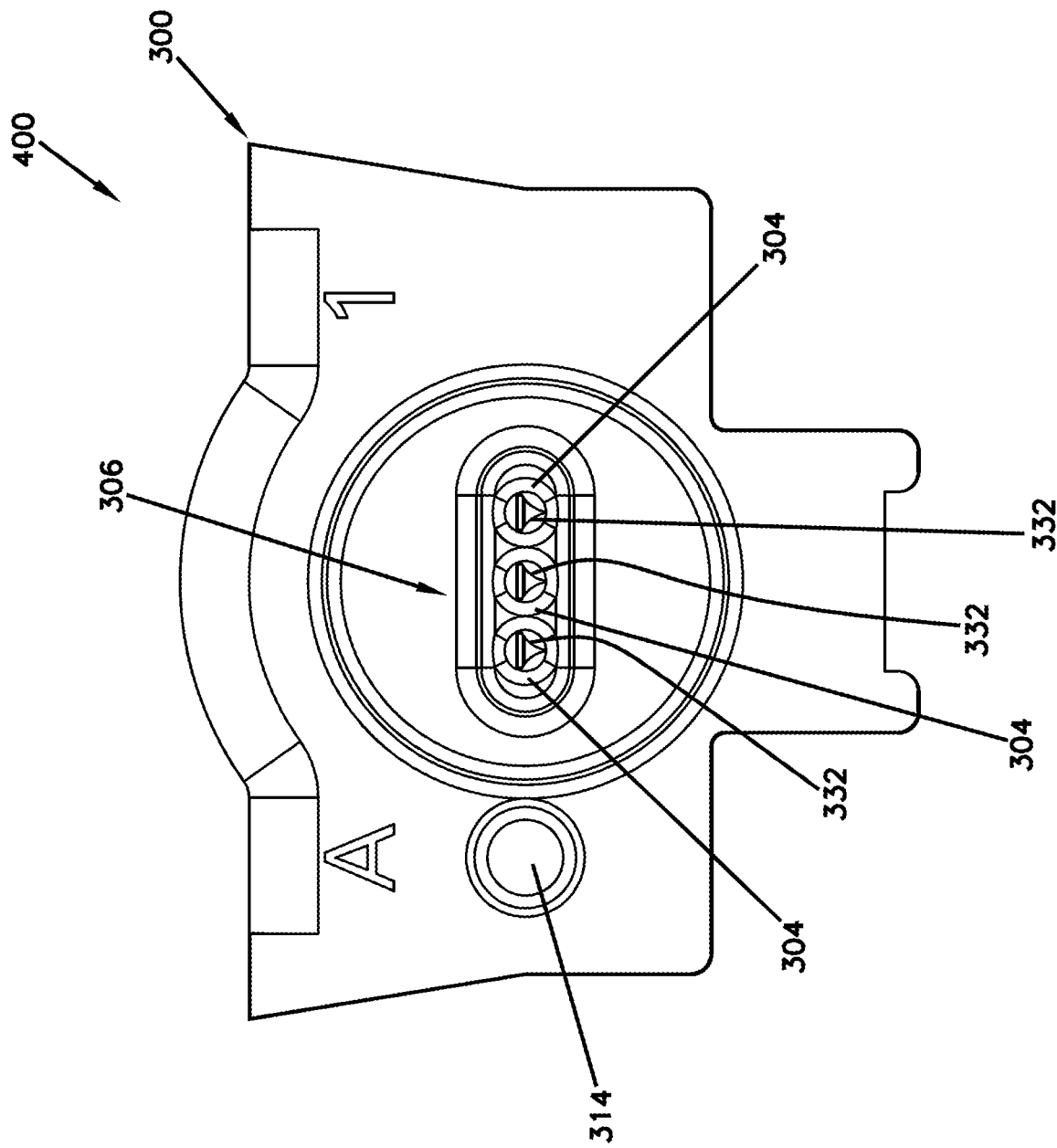

Turning to FIGS. 45-47, an example alignment system 400 is depicted in accordance with the principles of the present disclosure. The alignment system 400 includes a housing and an alignment device. The housing can be configured to hold the alignment device and to guide optical fibers into the alignment device. As such, the actual alignment of the optical fibers occurs inside of the housing. Example adapters for receiving the alignment system 400 are disclosed by U.S. Application Ser. No. 62/454,439, herein incorporated by reference in its entirety.

As depicted, the alignment system 400 can include housing 300. The housing 300 can have structure that can be used to secure the housing 300 inside of a fiber optic adapter. Typically, the housing 300 includes opposing flanges 302a, 302b that may be used to mount the housing 300 inside of the fiber optic adapter. Multiple fiber insertion openings 304 can be provided through the housing 300. While three fiber insertion openings 304 are provided, it will be appreciated that more or fewer than three may be utilized without departing from the present disclosure. For example, one, two, three, four or more fiber openings can be provided at each end of the housing 300. In the depicted example, the two outside fiber insertion openings 304 can be used for compatibility with duplex ferrule-less connectors or the middle fiber insertion opening 304 can be used for compatibility with ferrule-less fiber optic connectors having single fibers. The housing 300 may be provided with a lead-in region 306 to help facilitate guiding of optical fibers into grooves of an alignment device housed therein.

Figure 48:
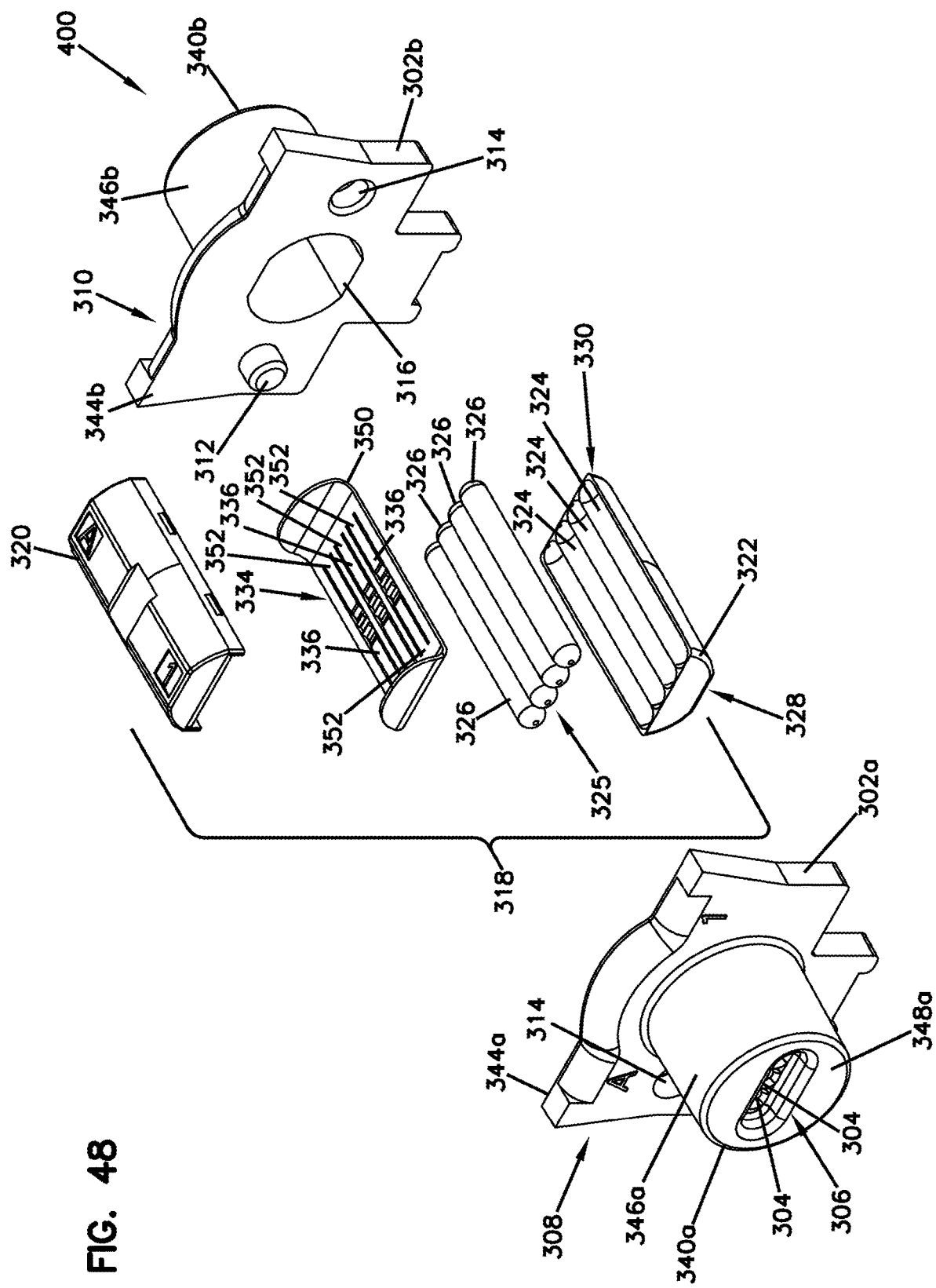
FIGS. 48-49 are exploded views of the alignment system of FIGS. 45-46 to show an example housing with another example multi-fiber alignment device.
Figure 49:
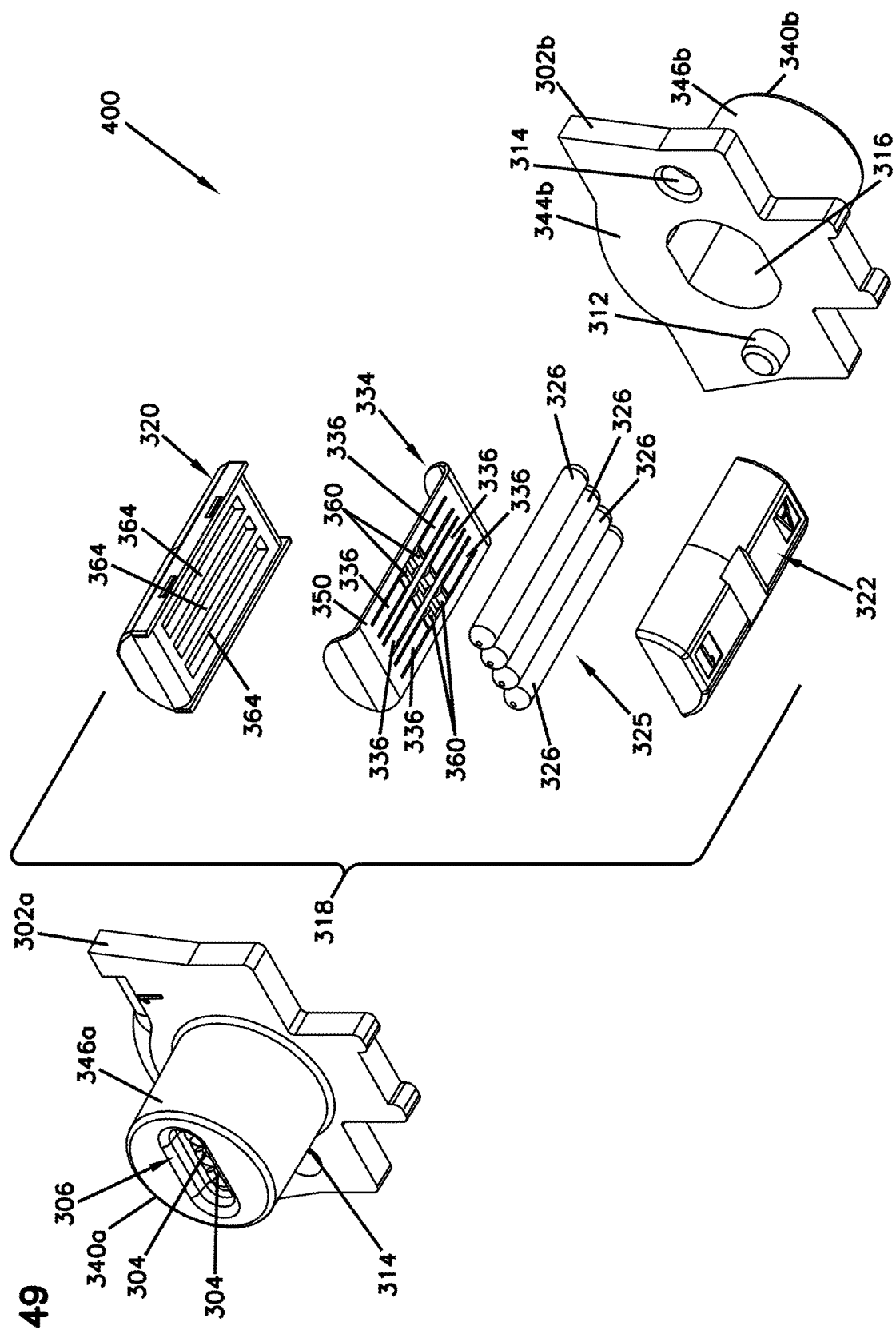

Referring to FIGS. 48-49, the housing 300 is shown having two separate parts, a first housing part 308 and a second housing part 310. The first and second housing parts 308, 310 of the housing 300 can have a male projection 312 that fits within a corresponding female receptacle 314 for connecting the first and second housing parts 308, 310. The first and second housing parts 308, 310 each include a cavity region 316 for receiving portions of an example multi-fiber alignment device 318 to hold the multi-fiber alignment device 318 therein.

The example multi-fiber alignment device 318 includes a first housing piece 320 (e.g., top piece, upper body, first part, etc.) and a second housing piece 322 (e.g., bottom piece, lower body, second part, etc.). The first and second housing pieces 320, 322 are adapted to be mated together. In one example, the second housing piece 322 forms multiple elongate pockets 324. The multi-fiber alignment device 318 includes a groove-type alignment structure 325. In one example, the groove-type alignment structure 325 (see FIG. 48) can include parallel rods 326, which can be supported by the multiple elongate pockets 324 of the second housing piece 322. In certain examples, the parallel rods 326 can be cylindrical. In certain examples, the parallel rods 326 can have rounded ends. In certain examples, rounded ends can be dome or semi-spherically shaped.

The multiple elongate pockets 324 can extend from a front end 328 to a rear end 330, essentially extending from one end to an opposite end of the second housing piece 322, although alternatives are possible. The parallel rods 326 fit within the elongate pockets 324 and cooperate to define fiber alignment grooves 332 (see FIG. 47). As such, the fiber alignment grooves 332 can extend continuously from the front end 328 to the rear end 330 of the second housing piece 322, although alternatives are possible. In certain examples, the rounded ends of the parallel rods 326 can be configured to guide or direct optical fibers into the fiber alignment groove 332.

In other examples, the fiber alignment grooves 332 may not extend all the way from the front end 328 to the rear end 330 of the second housing piece 322. For example, the second housing piece 322 may have a flat, recessed region positioned between the front and rear ends 328, 330 of the second housing piece 322. The flat, recessed region may be a fiber-to-fiber interface where ends of first and second optical fibers meet.

The multi-fiber alignment device 318 can include an intermediate plate 334 that cooperates with the groove type alignment structure 325 for positioning optical fibers in the fiber alignment grooves 332. The intermediate plate 334 includes structure (e.g., a main body of the intermediate plate) that forces, compresses or otherwise retains/holds the rods 326 in the elongate pockets 324 such that the intermediate plate 334 assists in positioning and retaining the rods 326 within the open sided elongate pockets 324. In one example, the intermediate plate 334 also can include a plurality of elastic members 336 (e.g., cantilever springs, spring biased members, integral springs, metal springs, plastic springs, etc.) positioned thereon for holding optical fibers in a respective one of the multiple fiber alignment grooves 332 formed by the rods 326. As such, when the first and second housing pieces 320, 322 are mated together, the plurality of elastic members 336 of the intermediate plate 334 can assist in retaining optical fibers in alignment along the fiber alignment grooves 332.

Turning again to FIG. 45, the first and second housing parts, 308, 310 of the housing 300 meet at a central interface plane 338. In certain examples, the first and second housing parts 308, 310 can be half-pieces. The first and second housing parts 308, 310 respectively define opposite first and second ends 340a, 340b of the housing 300. The opposite first and second ends 340a, 340b define the co-axially aligned openings 304 that are aligned along a fiber insertion axis 342 that is oriented generally perpendicular relative to the central interface plane 338. In certain examples, the fiber insertion axis 342 may not be oriented generally at an angle such that an optical fiber can be pointed downwardly into a fiber alignment groove. Opposing axial end faces 344a, 344b of the flanges 302a, 302b mate at the central interface plane 338. The flanges 302a, 302b cooperate to define a central flange 302 of the housing 300. The axial end faces 344a, 344b of the flanges 302a, 302b can include the male projections 312 and female receptacles 314.

The first and second housing parts 308, 310 also include barrel-portions 346a, 346b that project axially outwardly from the flanges 302a, 302b along the fiber insertion axis 342. The barrel-portions 346a, 346b include axial end faces 348a, 348b. The fiber insertion openings 304 are defined through the axial end faces 348a, 348b. The axial end faces 348a, 348b also include the lead-in region 306 (e.g., transition portion) that surround the fiber insertion openings 304. The lead-in region 306 can be configured for guiding or directing optical fibers into the fiber insertion openings 304.

In certain examples, the lead-in region 306 can be tapered or angled relative to the fiber insertion axis 342. In certain examples, the lead-in region 306 can be funnel-shaped.

When the housing 300 is assembled, each fiber alignment groove 332 preferably generally aligns with a corresponding fiber insertion axis 342 in a coaxial orientation. In certain examples, the fiber alignment groove 332 may not be aligned with the fiber insertion axis 342 when the fiber insertion axis 342 is generally oriented at an angle. Additionally, the plurality of elastic members 336 of the intermediate plate 334 have lengths that extend along (e.g., parallel to and above) the fiber alignment groove 332 as well as the fiber insertion axis 342. The plurality of elastic members 336 can be positioned close enough to the fiber alignment groove 332 to apply sufficient pressure to the optical fibers received within the fiber alignment groove 332 such that the optical fibers are held and retained within the fiber alignment groove 332 in coaxial alignment with one another.

Figure 50:
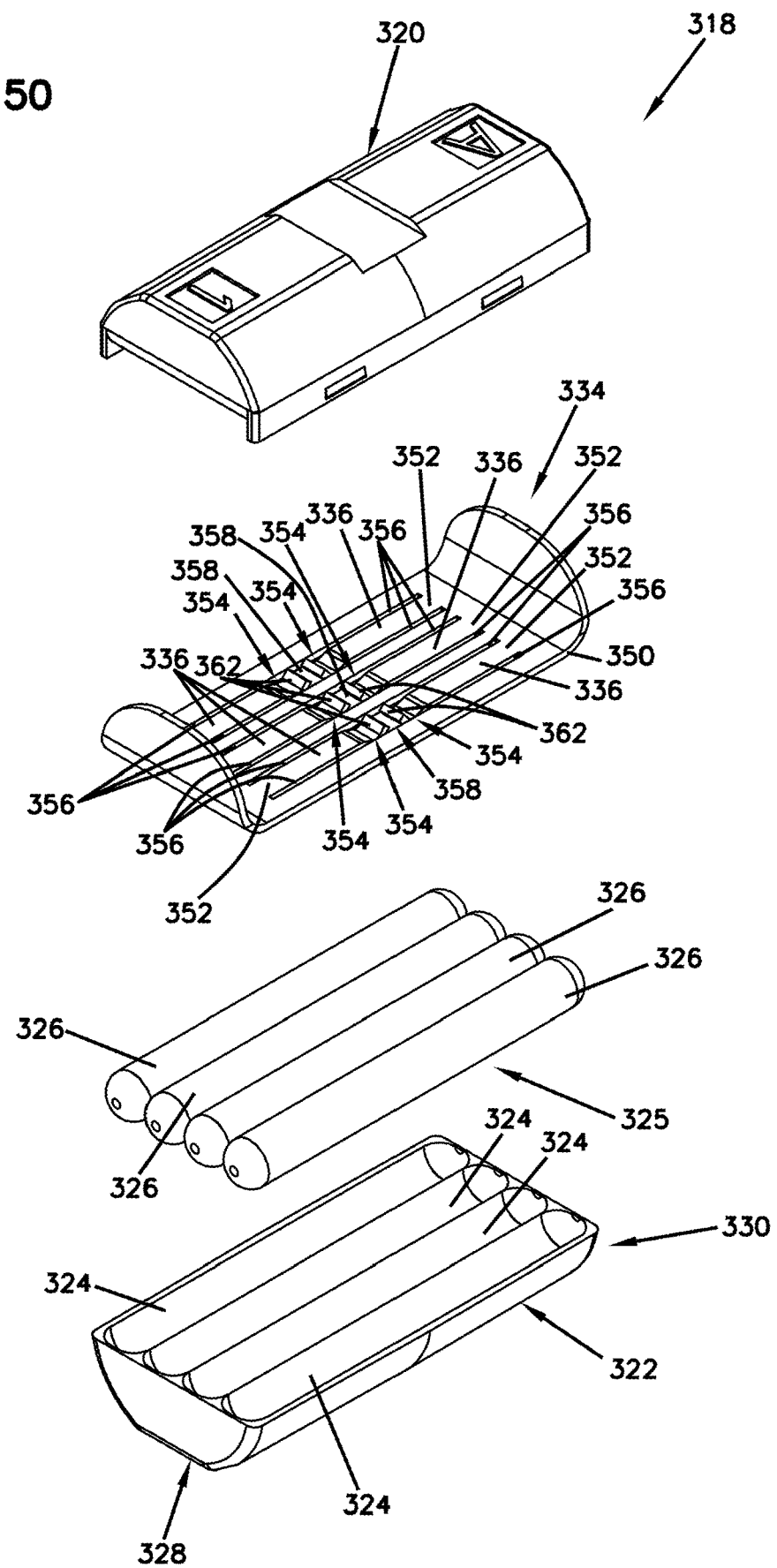
FIG. 50 is an exploded view of the multi-fiber alignment device shown in FIGS. 48-49.

Referring to FIG. 50, the first housing piece 320 can be arranged and configured to hold the plurality of elastic members 336 of the intermediate plate 334 in position over the fiber alignment groove 332. The plurality of elastic members 336 can help to press optical fibers into the fiber alignment grooves 332. The intermediate plate 334 can include a plastic or polymeric structure (e.g., a molded plastic part) which can include a main body 350. In other examples, the intermediate plate 334 could be metal or include metal or metal/plastic composite.

In one example, the plurality of elastic members 336 is unitarily formed as one piece with the main body 350 of the intermediate plate 334. For example, the plurality of elastic members 336 can include base ends 352 that are monolithically connected with the main body 350. The plurality of elastic members 336 can extend from opposite ends of the main body 350 such that free ends 354 of the plurality of elastic members 336 are opposing one another. The plurality elastic members 336 can be separated by recesses 356 defined through the main body 350 of the intermediate plate 334.

In certain examples, opposing free ends 354 of the plurality of elastic members 336 can be separated by an intermediate gap 358 centrally located between opposite ends of the main body 350 of the intermediate plate 334. The free ends 354 of the plurality of elastic members 336 can be disposed adjacent the intermediate gap 358.

Turning again to FIG. 49, the free ends 354 (see FIG. 50) can each include a tab portion 360 (e.g., a projection) (see FIG. 49) that projects from the main body 350 of the intermediate plate 334 so as to project closer to the fiber alignment groove 332 to help retain optical fibers within the fiber alignment grooves 332. In certain examples, the tab portions 360 are the only portions of the plurality of elastic members 336 that contact the optical fiber when the optical fiber is within the fiber alignment groove 332.

The free ends 354 of the plurality of elastic members 336 can also include extensions 362 (see FIG. 50) that extend upwardly from opposite sides of the tab portions 360 in a direction toward the first housing piece 320. The extensions 362 can be elevated or otherwise offset from the tab portions 360 so that the extensions 362 are not adapted to contact the optical fibers within the fiber alignment grooves 332. Instead, the extensions 362 can be received in recesses 364 (see FIG. 49) defined in the first housing piece 320 when the first and second housing pieces 320, 322 are mated together. The second housing piece 322 can cause the plurality of elastic members 336 to flex relative to the main body 350 of the intermediate plate 334 to a position where the tab portions 360 are spaced a predetermined and precisely controlled amount from the fiber alignment groove 332 when the rods are pressed in the pocket of the main body 350.

Figure 51:
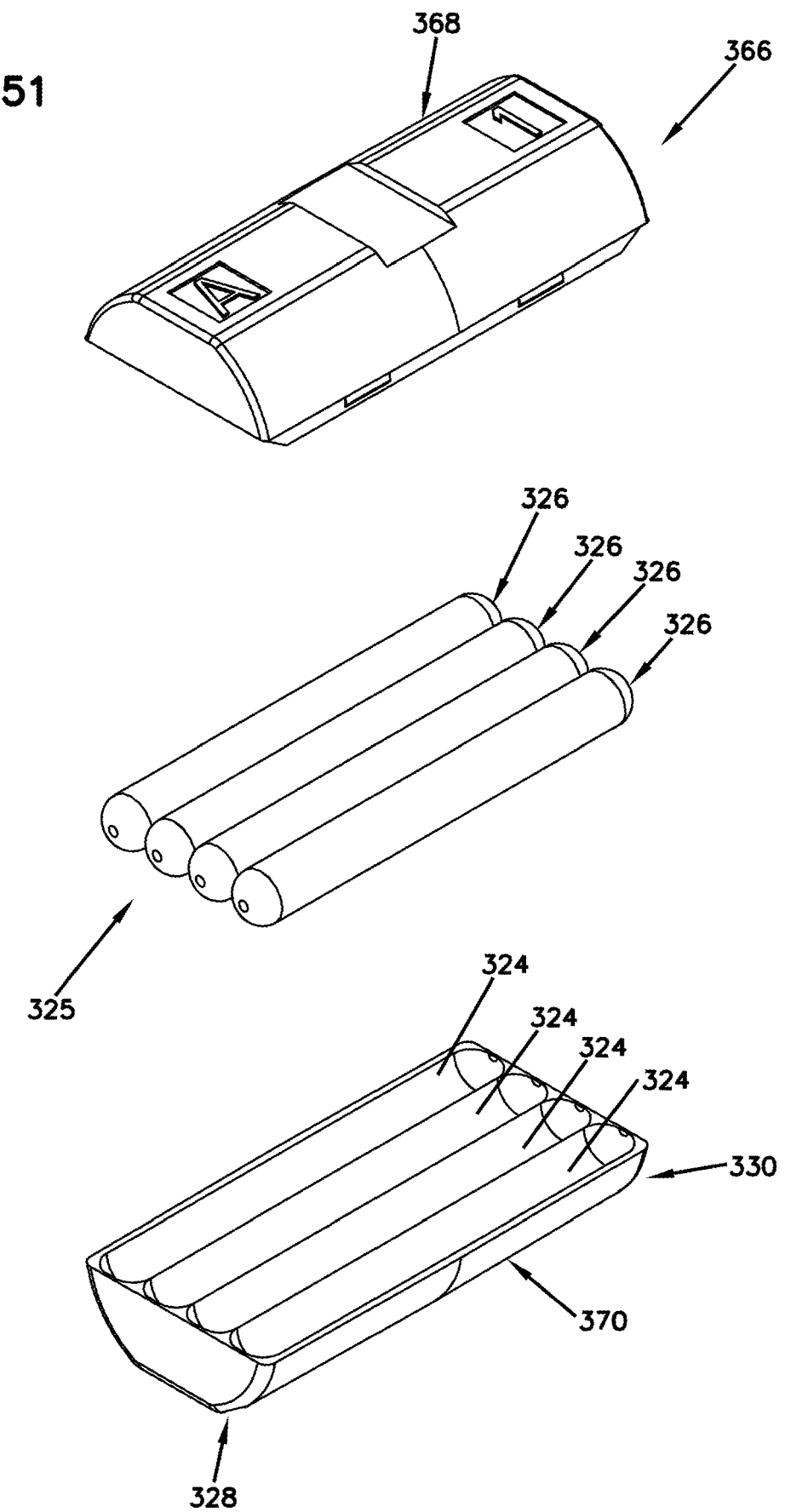
FIGS. 51-52 illustrate another example multi-fiber alignment device in accordance with the principles of the present disclosure.
Figure 52:
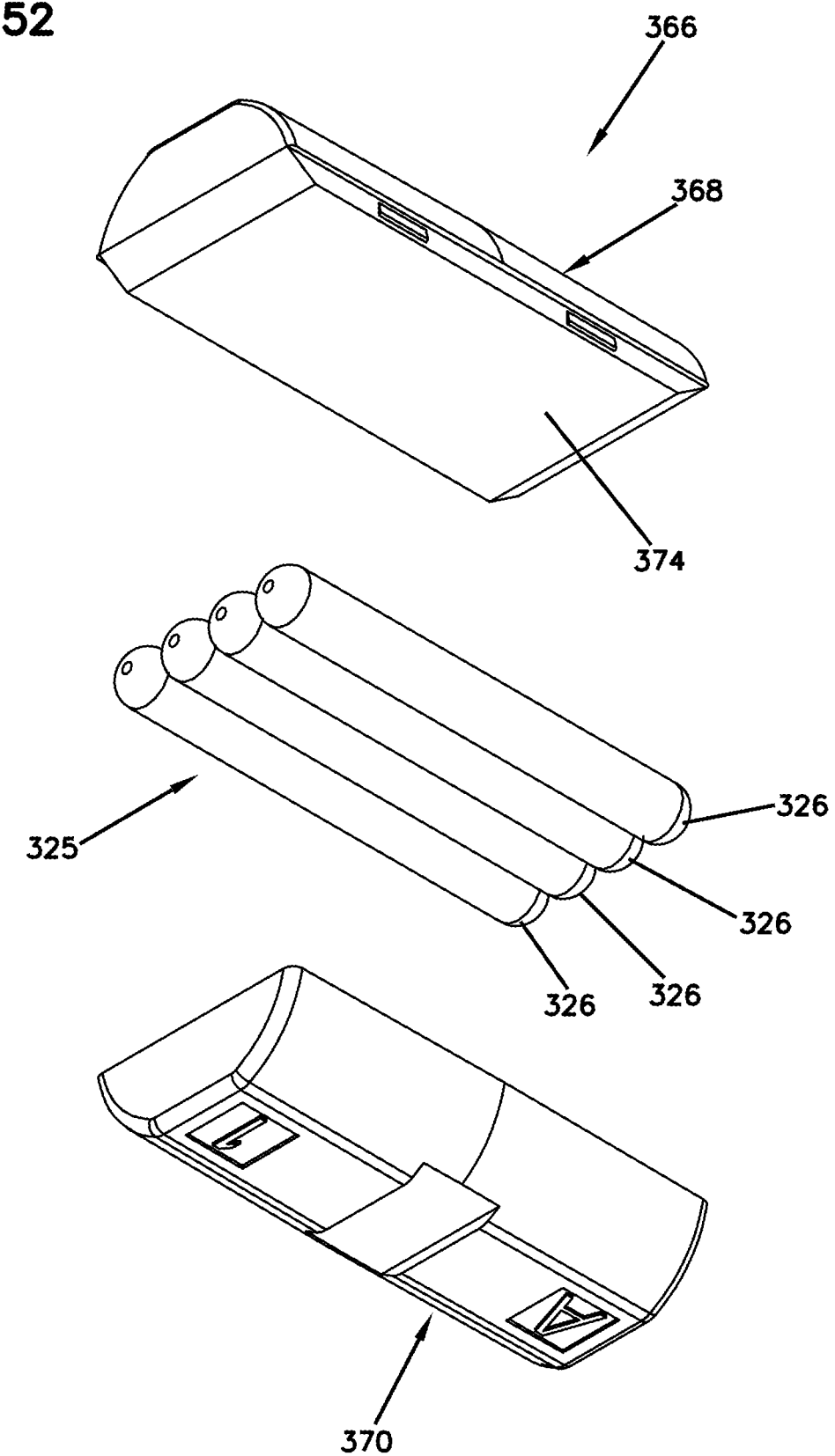
Figure 53:
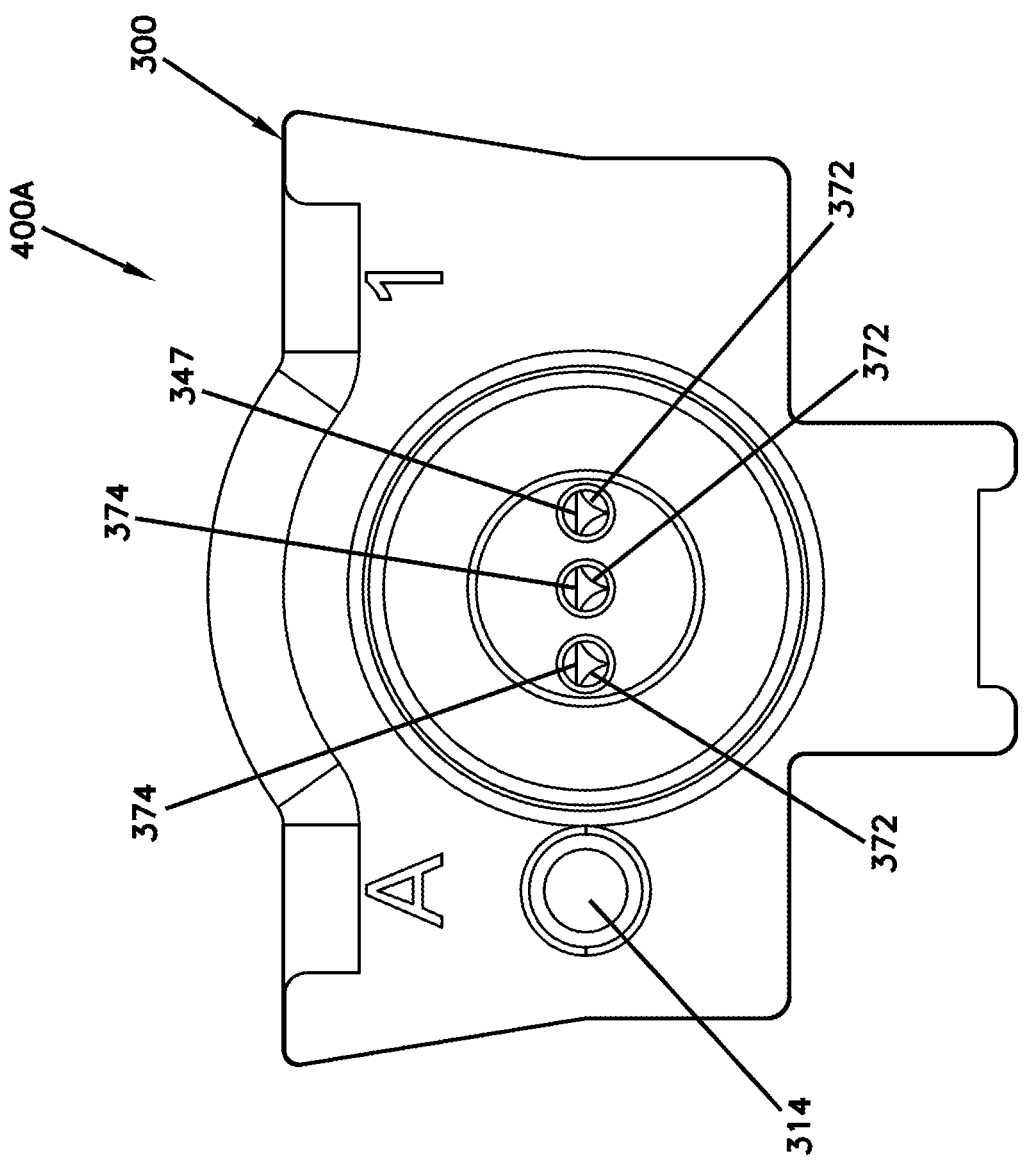
FIG. 53 illustrates an end view of the multi-fiber alignment device of FIGS. 51-52 mounted inside of the housing of FIGS. 48-49.

FIGS. 51-52 depict another multi-fiber alignment device 366 in accordance with the principles of the present disclosure. The multi-fiber alignment device 366 is configured to mount in a housing such as the housing 300 to form another alignment system 400A in accord with the principles of the present disclosure. The multi-fiber alignment device 366 includes a first housing piece 368 (e.g., top piece, upper body, first part, etc.) and a second housing piece 370 (e.g., bottom piece, lower body, second part, etc.) The first and second housing pieces 368, 370 are adapted to be mated together. The second housing piece 370 of the multi-fiber alignment device 366 is embodied with some of the same features and advantages as the second housing piece 322 of the multi-fiber alignment device 318 described above. For the sake of brevity, only those portions that differ from the multi-fiber alignment device 318 illustrated in FIGS. 48-50 discussed above will be described in detail.

The multi-fiber alignment device 366 includes the groove-type alignment structure 325. In one example, the groove-type alignment structure 325 can include parallel rods 326, which can be supported by the multiple elongate pockets 324 of the second housing piece 370. In certain examples, the parallel rods 326 can be cylindrical. In certain examples, the parallel rods 326 can have rounded ends. In certain examples, rounded ends can be dome or semi-spherically shaped. The multiple elongate pockets 324 can extend from a front end 328 to a rear end 330, essentially extending from one edge to an opposite edge of the second housing piece 370, although alternatives are possible. The parallel rods 326 fit within the elongate pockets 324 and cooperate to define fiber alignment grooves 372 (see FIG. 53). The rounded ends of the parallel rods 326 can be configured to guide or direct optical fibers into the fiber alignment grooves 372. In other examples, the groove-type alignment structure 325 can also be integral with the second housing piece 370.

The multi-fiber alignment device 366 does not include an intermediate plate with a plurality of elastic members or any other structures that deflect or elastically deform when an optical fiber is inserted in the multi-fiber alignment device 366. The first housing piece 368 may include a flat surface 374 (e.g., holding surface) such that when optical fibers are respectively positioned in the fiber alignment grooves 372, the flat surface 374 creates a block over the optical fibers, although alternatives are possible. The flat surface 374 is preferably a fixed, relatively rigid, fiber-holding surface that is not intended to flex when a fiber is inserted in a corresponding one of the fiber alignment grooves 372. The surface is flat, but in some examples may be curved. The flat surface 374 of the first housing piece 368 cooperates with the fiber alignment grooves 372 to form rigid bore style alignment openings when the first and second housing pieces 368, 370 are mated together. The multi-fiber alignment device 366 can be held together in the housing in the same manner described herein with respect to the earlier described example.

Figure 54:
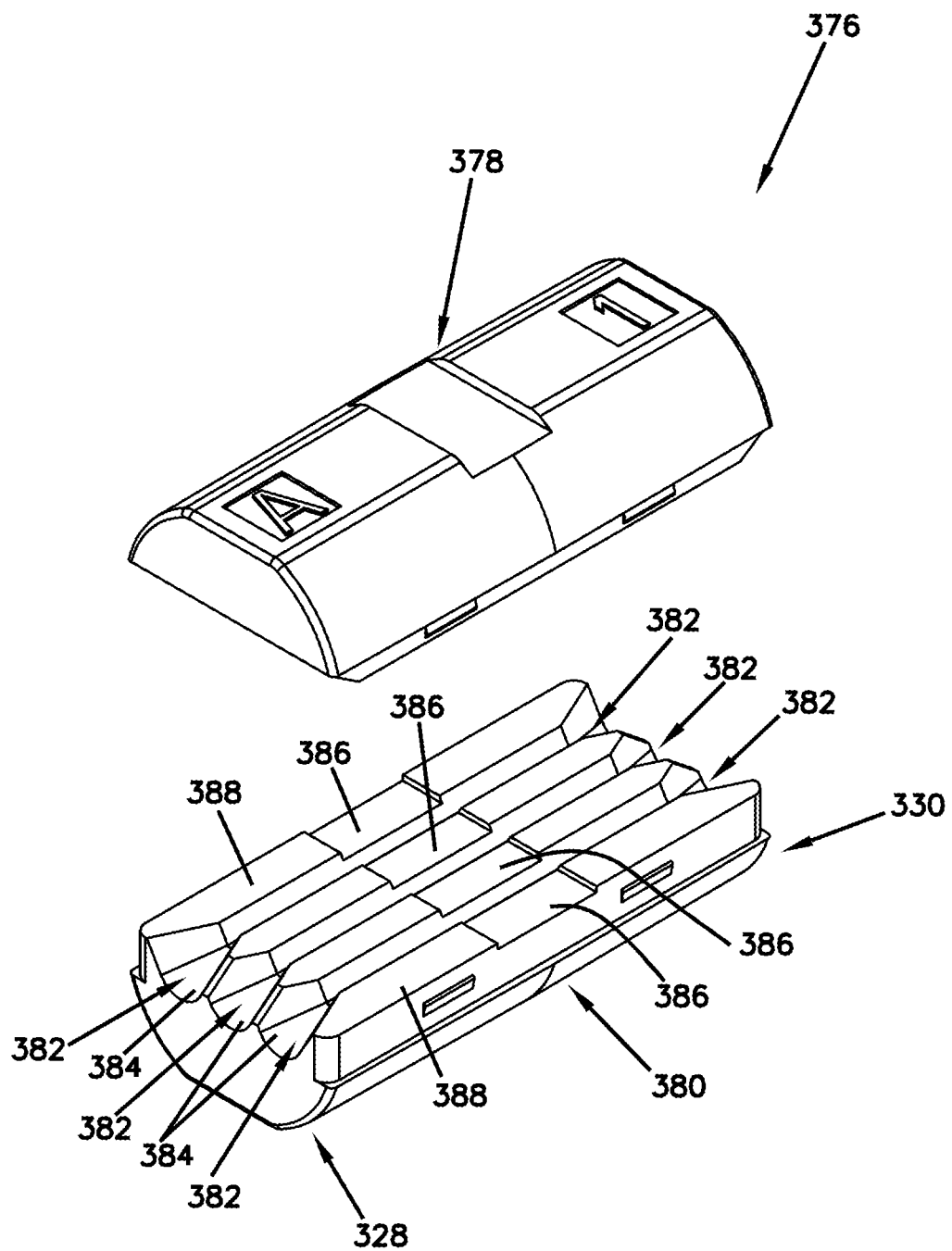
FIGS. 54-55 illustrate another example multi-fiber alignment device in accordance with the principles of the present disclosure.
Figure 55:
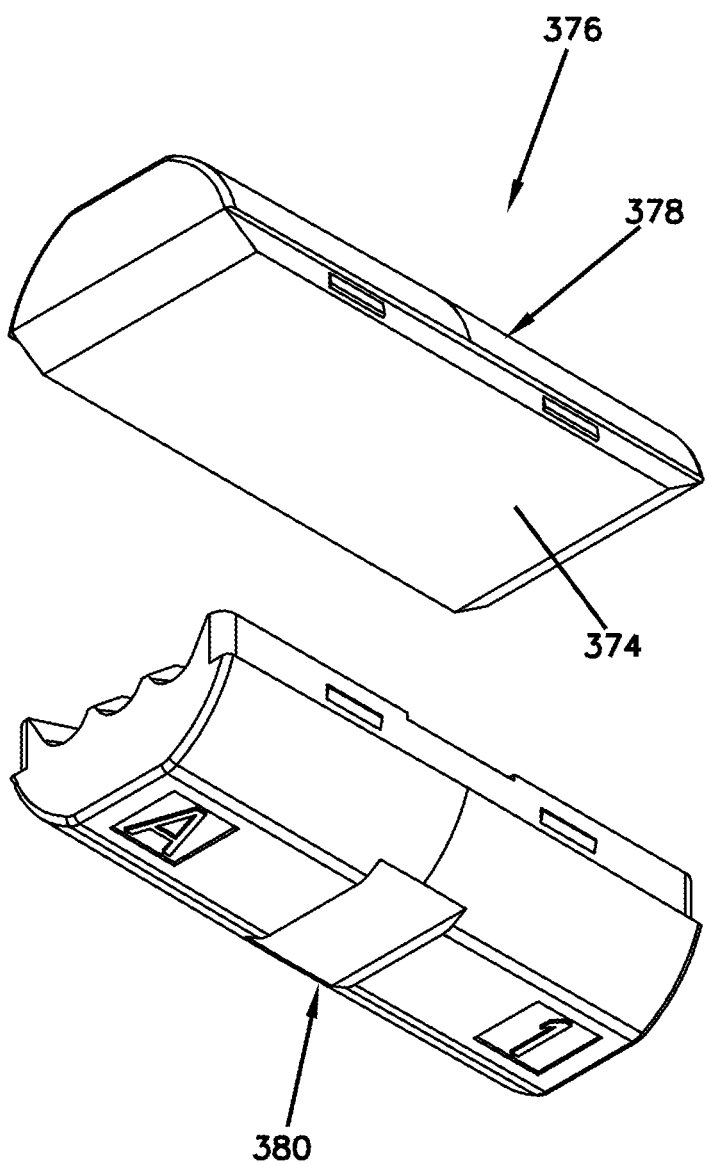

FIGS. 54-55 depict another multi-fiber alignment device 376 in accordance with the principles of the present disclosure. The multi-fiber alignment device 376 is configured to mount in a housing such as the housing 300 to form another alignment system 400B (see FIG. 56) in accord with the principles of the present disclosure. The multi-fiber alignment device 376 includes a first housing piece 378 (e.g., top piece, upper body, first part, etc.) and a second housing piece 380 (e.g., bottom piece, lower body, second part, etc.). The first and second housing pieces 378, 380 are adapted to be mated together. The first housing piece 378 of the multi-fiber alignment device 376 is embodied with some of the same features and advantages as the first housing piece 368 of the multi-fiber alignment device 366 described above. For the sake of brevity, only those portions that differ from the multi-fiber alignment device 366 illustrated in FIGS. 51-52 discussed above will be described in detail.

The multi-fiber alignment device 376 can include a groove-type alignment structure that is integral with the second housing piece 380. For example, the second housing piece 380 of the multi-fiber alignment device 376 has multiple fiber alignment grooves 382 that are formed in the second housing piece 380 as v-grooves or other groove shapes, such as, but not limited to, semi-circular shapes or trough shapes. The fiber alignment grooves 382 can be patterned or made with great precision by molding techniques, etching techniques, or laser techniques, although alternatives are possible.

The second housing piece 380 can be arranged and configured with "funnels", shown generally at 384 to facilitate guiding optical fibers into the fiber alignment grooves 382. In certain examples, flat intermediate portions 386 (e.g., recesses) can be formed in a top surface 388 of the second housing piece 380. The flat intermediate portions 386 can be centrally positioned between the front and rear ends 328, 330 of the second housing piece 380.

The fiber alignment grooves 382 can extend through the flat intermediate portions 386. The flat intermediate portions 386 can be recessed relative to the top surface 388 of the second housing piece 380. The fiber alignment grooves 382 can have reduced depths as the fiber alignment grooves 382 extend through the flat intermediate portions 386. The flat intermediate portions 386 correspond to recessed regions relative to the top surface 388 and provide open space for allowing excess gel to be collected. In other examples, the flat intermediate portions 386 may have shapes other than flat and can be referred to as recessed regions or open regions.

Referring to FIG. 56A, the fiber alignment grooves 382 can each provide two lines of contact with an optical fiber 331 inserted therein. When viewed in cross-section or end view, the fiber alignment grooves 382 can each create a two-point contact 327 with the optical fiber 331 inserted therein. In certain examples, the flat surface 374 of the first housing piece 378 can create a third point contact 329 with the optical fiber 331 when inserted in the fiber alignment grooves 382. The flat surface 374 of the first housing piece 378 blocks the optical fiber 331 in the fiber alignment grooves 382 and can make line contact with the optical fiber 331 within the fiber alignment groove 382, although alternatives are possible. The flat surface 374 of the first housing piece 378 cooperates with the fiber alignment grooves 382 to form rigid bore style alignment openings when the first and second housing pieces 378, 380 are mated together. The multi-fiber alignment device 376 can be held together in the housing 300 in the same manner described herein with respect to the earlier described example.

Figure 58:
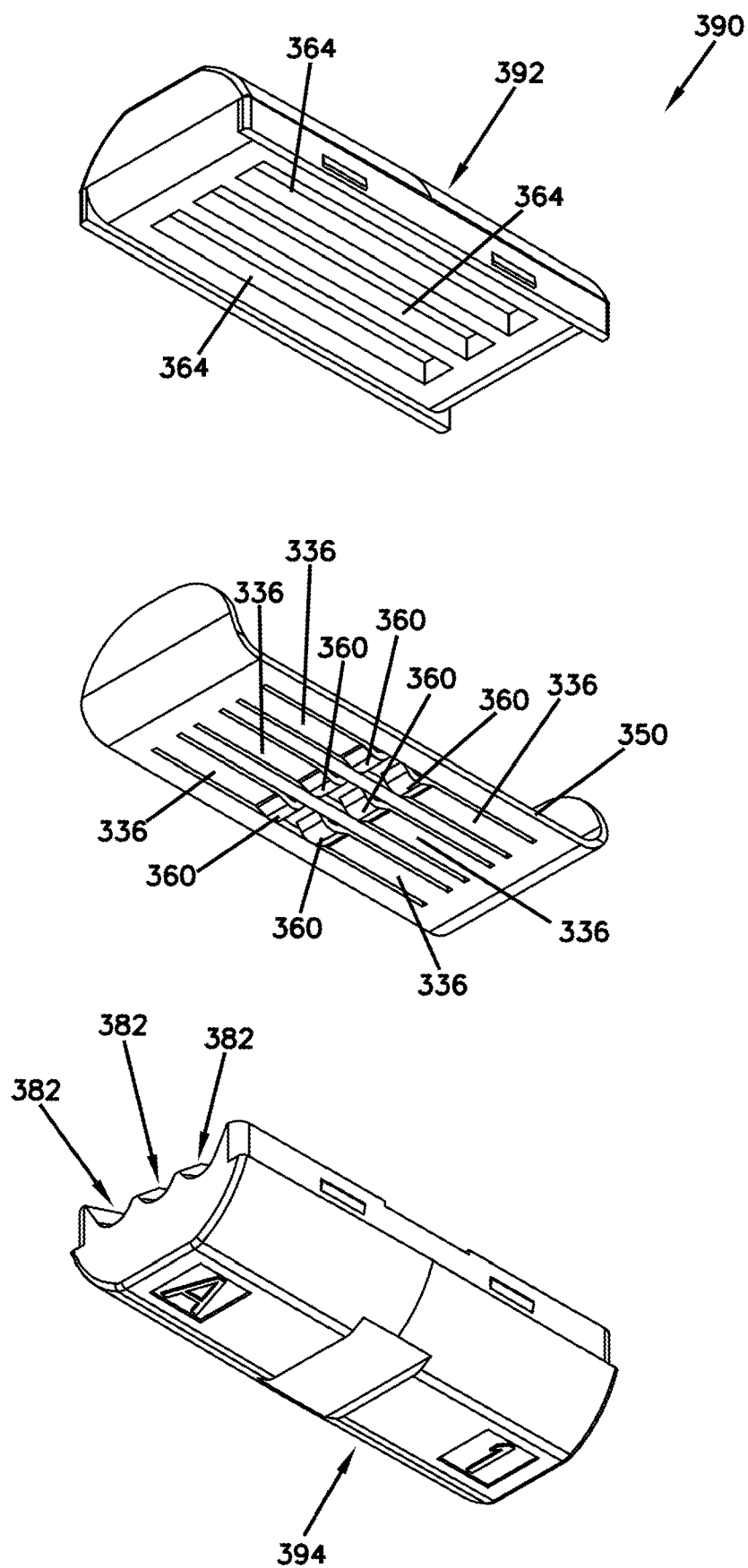
Figure 59:
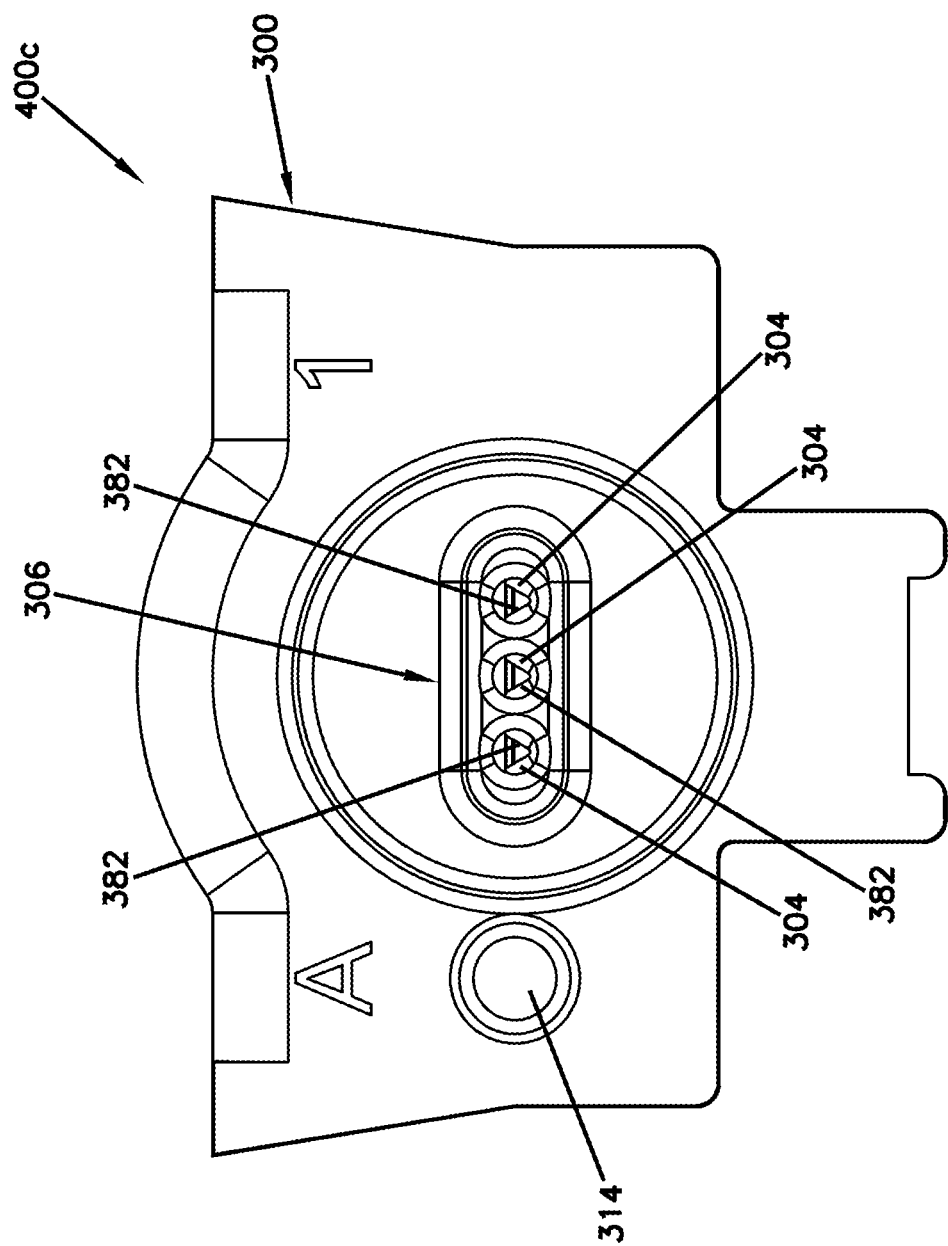
FIG. 59 illustrates an end view of the multi-fiber alignment device of FIGS. 57-58 mounted inside of the housing of FIGS. 48-49.
Figure 60:
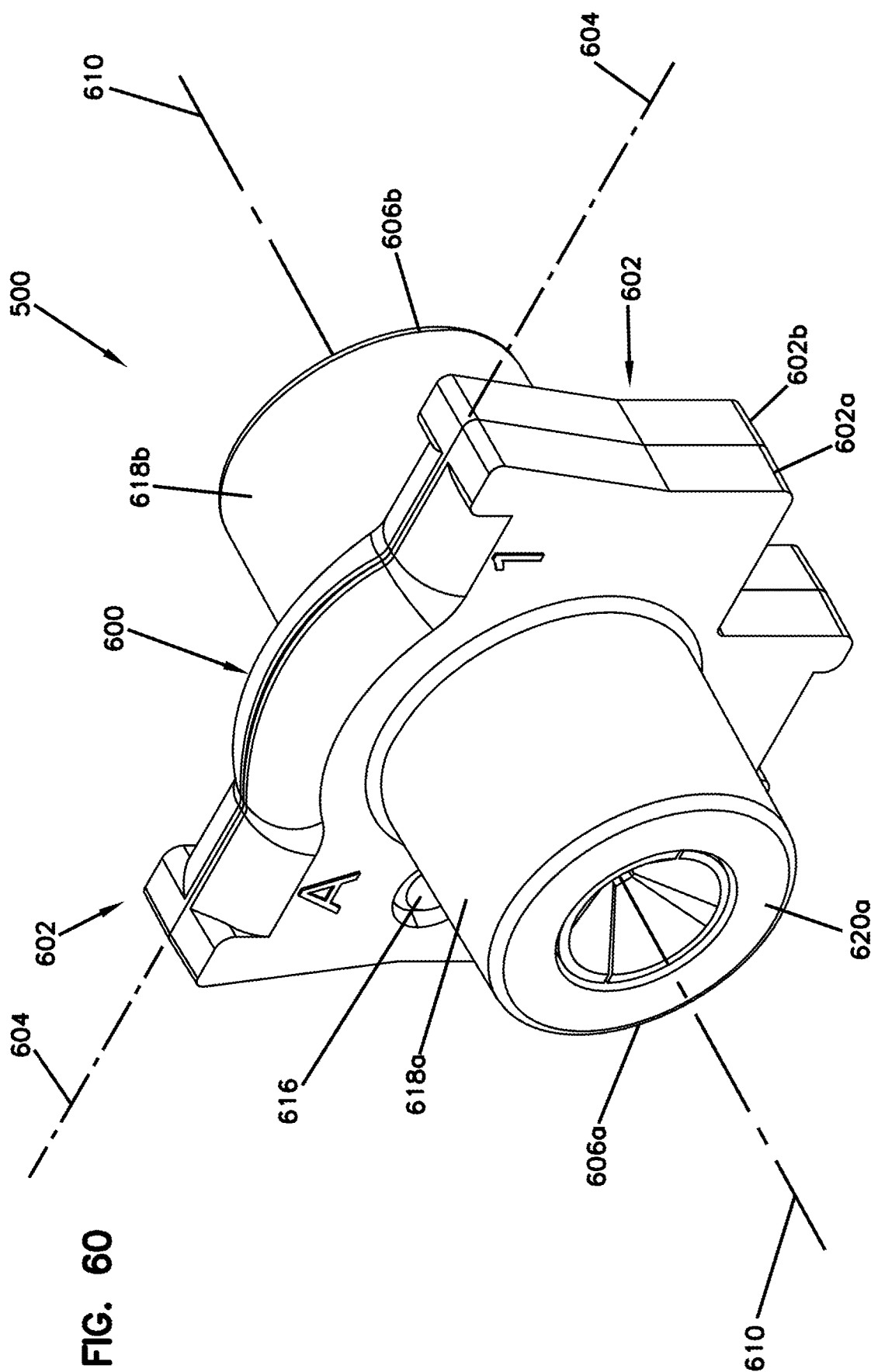
FIG. 60 illustrates another example alignment system in accordance with the principles of the present disclosure.
Figure 61:
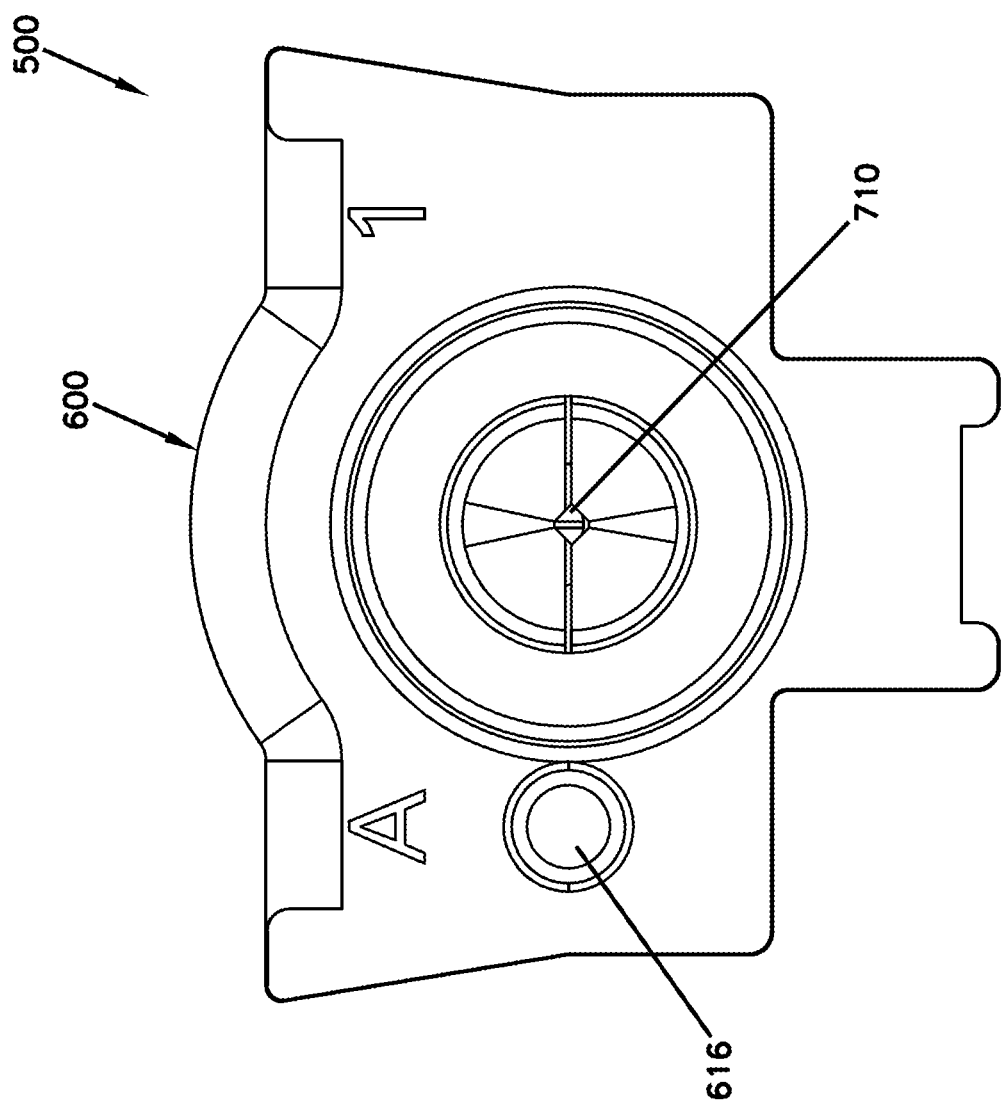
FIG. 61 illustrates an end view of the alignment system of FIG. 60.
Figure 62:
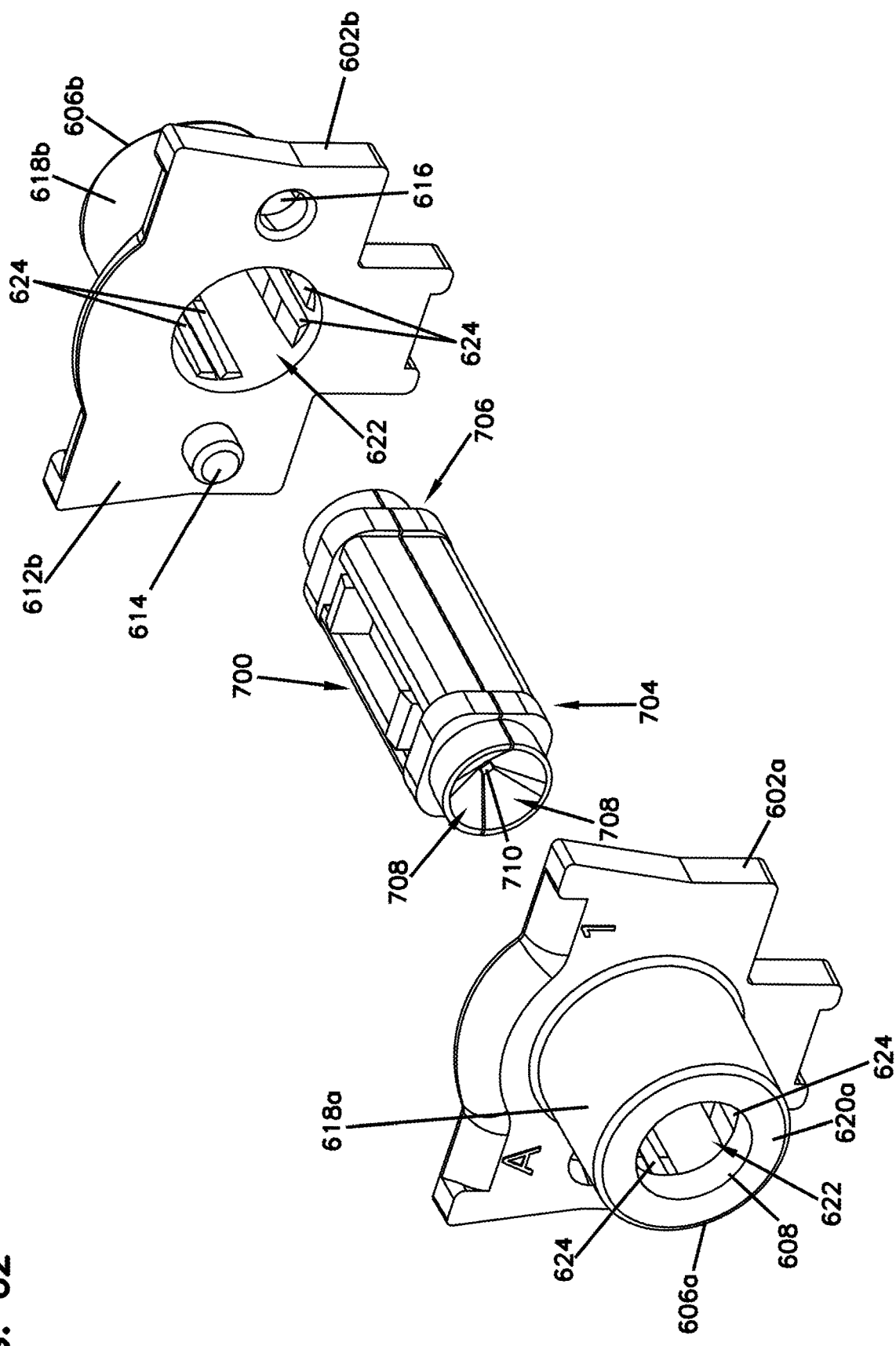
FIGS. 62-63 are partial exploded views of the alignment system of FIGS. 60-61 showing an example housing and another example multi-fiber alignment device in accordance with the principles of the present disclosure.
Figure 63:
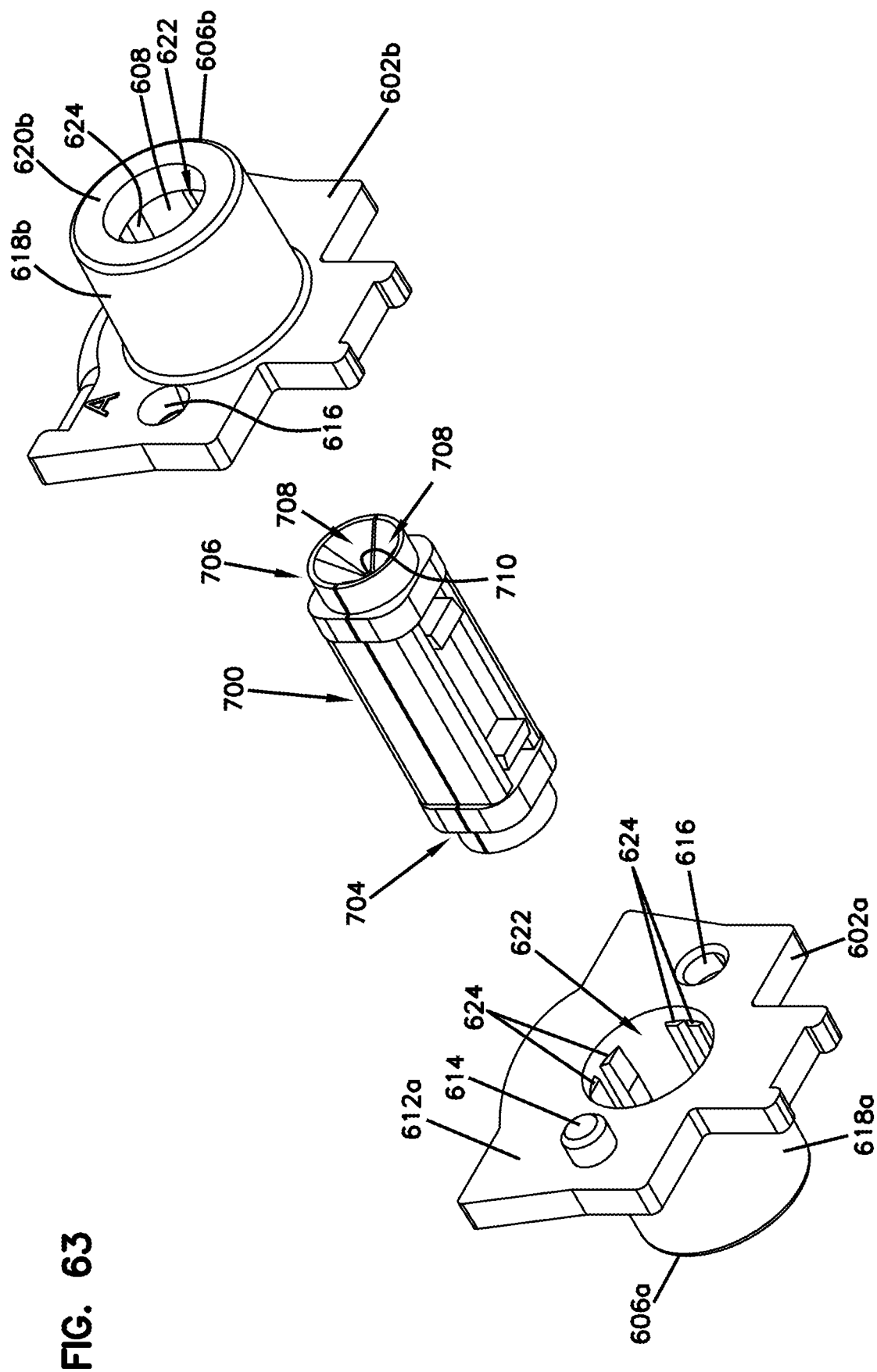

FIGS. 57-58 depict another multi-fiber alignment device 390 in accordance with the principles of the present disclosure. The multi-fiber alignment device 390 is configured to mount in a housing such as the housing 300 to form another alignment system 400C (see FIG. 59) in accord with the principles of the present disclosure. The multi-fiber alignment device 390 includes a first housing piece 392 (e.g., top piece, upper body, first part, etc.) and a second housing piece 394 (e.g., bottom piece, lower body, second part, etc.). The first and second housing pieces 392, 394 are adapted to be mated together. The second housing piece 394 of the multi-fiber alignment device 390 is embodied with some of the same features and advantages as the second housing piece 380 of the multi-fiber alignment device 376 described above. The first housing piece 392 of the multi-fiber alignment device 390 is embodied with some of the same features and advantages as the first housing piece 320 of the multi-fiber alignment device 318 described above. The multi-fiber alignment device 390 can be held together in the housing 300 (see FIG. 59) in the same manner described herein with respect to the earlier described example. For the sake of brevity, only those portions that differ from the multi-fiber alignment devices 376, 318 illustrated in FIGS. 48-50 and 54-55 discussed above will be described in detail.

The multi-fiber alignment device 390 includes the intermediate plate 334 as described above with reference to FIGS. 48-50. The first housing piece 392 holds the plurality of elastic members 336 of the intermediate plate 334 in place when mated with the second housing piece 394. The tab portions 360 project from the main body 350 of the intermediate plate 334 so as to project closer to the v-groove shaped fiber alignment groove 382 to help retain optical fibers within the fiber alignment grooves 382.

The extensions 362 can be received in recesses 364 defined in the first housing piece 392 when the first and second housing pieces 392, 394 are mated together. The first housing piece 392 can cause the plurality of elastic members 336 to flex relative to the main body 350 of the intermediate plate 334 to a position where the tab portions 360 are spaced a predetermined and precisely controlled amount from the fiber alignment groove 382. In some examples, the plurality of elastic members 336 can flex up when optical fibers are inserted in the fiber alignment grooves 382. In other examples, the plurality of elastic members 336 can be held at fixed flexed positions by the second housing piece 394.

In some examples, the flat intermediate portions 386 provide clearance for the tab portions 360 to project to a lower depth relative to the fiber alignment grooves 382 (e.g., closer to the bottom of the fiber alignment grooves). In some examples, the plurality of elastic members 336 can flex up relative to the fiber alignment groove 382 to accommodate fibers inserted into the fiber alignment grooves 382. In some examples, the plurality of elastic members 336 flex up until they engage a positive stop structure of the housing 300 and therefore can function similar to a rigid bore style alignment. In other examples, the plurality of elastic members 336 can flex up away from the fiber alignment grooves 382 and not engage a positive stop of the housing 300 such that the inherent elasticity of the plurality of elastic members 336 provide the pressing force for holding the optical fibers in the fiber alignment grooves 386.

FIGS. 60-63 depict another alignment system 500 in accordance with the principles of the present disclosure. The alignment system 500 includes a housing 600 and a fiber alignment device 700. The housing 600 includes first and second housing parts, 602a, 602b that meet at a central interface plane 604. In certain examples, the first and second housing parts 602a, 602b can be half-pieces. The first and second housing parts 308, 310 respectively define opposite first and second ends 606a, 606b of the housing 600. The opposite first and second ends 606a, 606b define co-axially aligned openings 608 that are aligned along a fiber insertion axis 610 that is oriented generally perpendicular relative to the central interface plane 604. Opposing axial end faces 612a, 612b of the flanges 602a, 602b mate at the central interface plane 604. The flanges 602a, 602b cooperate to define a central flange 602 of the housing 600. The axial end faces 612a, 612b of the flanges 602a, 602b can include male projections 614 that fit within female receptacles 616 for mating the first and second housing parts 602a, 602b together.

The first and second housing parts 602a, 602b also include barrel-portions 618a, 618b that project axially outwardly from the flanges 602a, 602b along the fiber insertion axis 610. The barrel-portions 618a, 618b include axial end faces 620a, 620b. The fiber insertion openings 608 are defined through the axial end faces 620a, 620b.

Figure 66:
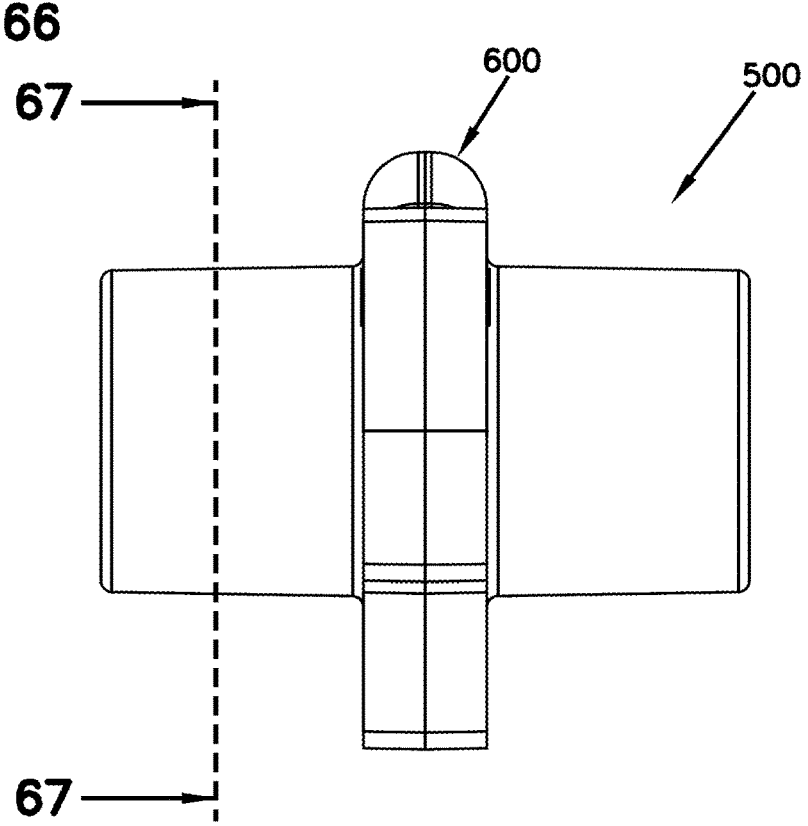
FIG. 66 is a side view of the alignment system of FIG. 60.
Figure 67:
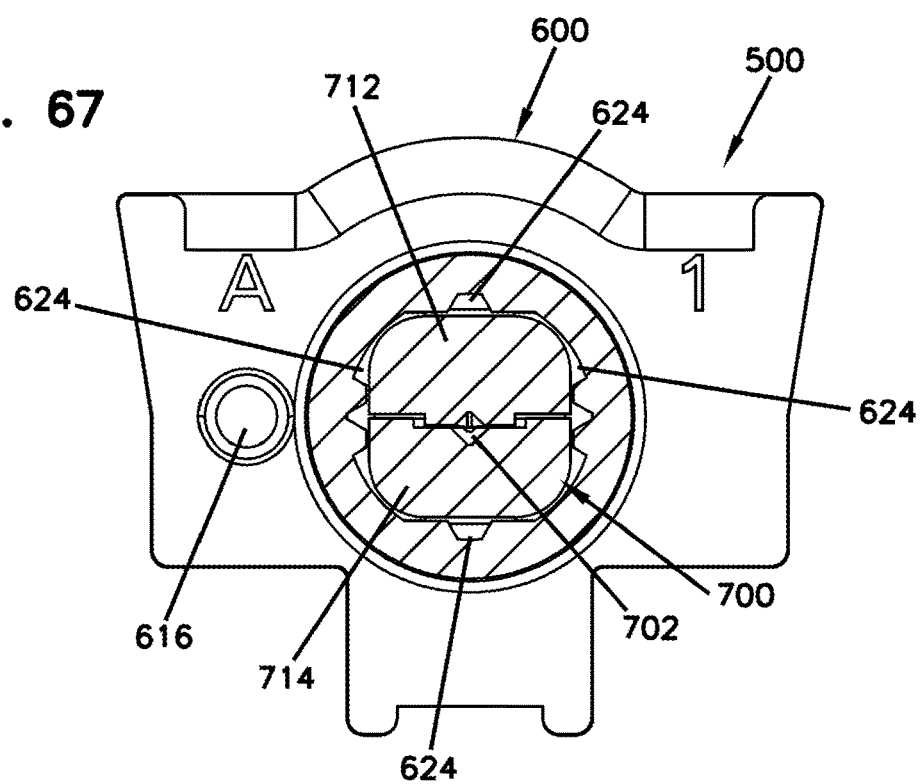
FIG. 67 is a cross-sectional view taken generally along line 67-67, FIG. 66.

It will be appreciated that the housing 600 defines an internal chamber 622 or cavity for receiving a fiber alignment device 700. Additionally, the housing 600 includes internal structures 624 adapted to engage the fiber alignment device 700 to effectively position or center the fiber alignment device 700 within the housing 600 (see FIGS. 66-67). Preferably, the fiber alignment device 700 is located within the housing 600 such that an alignment groove structure 702 (e.g., fiber alignment groove) (see FIG. 64) of the fiber alignment device 700 drops beneath the fiber insertion axis 610 and is not coaxially aligned with the fiber insertion axis 610. The internal structures 624 of the housing 600 can engage opposite sides of the fiber alignment device 700 to secure and center the fiber alignment device 700.

The alignment groove structure 702 of the fiber alignment device 700 extends from a front end 704 to a rear end 706 of the fiber alignment device 700, essentially extending from one end to an opposite end of the fiber alignment device 700, although alternatives are possible. The front and rear ends 704, 706 include transition portions 708 that surround a fiber insertion opening 710 that defines a fiber path 707 for receiving the optical fiber. The fiber path 707 can be defined between the first hand second housing pieces 712, 714. The transition portions 708 can be configured for guiding or directing optical fibers into the fiber insertion opening 710. In certain examples, the transition portions 708 can be tapered or angled relative to the fiber insertion axis 610. In certain examples, the transition portions 708 can be funnel-shaped.

Figure 64:
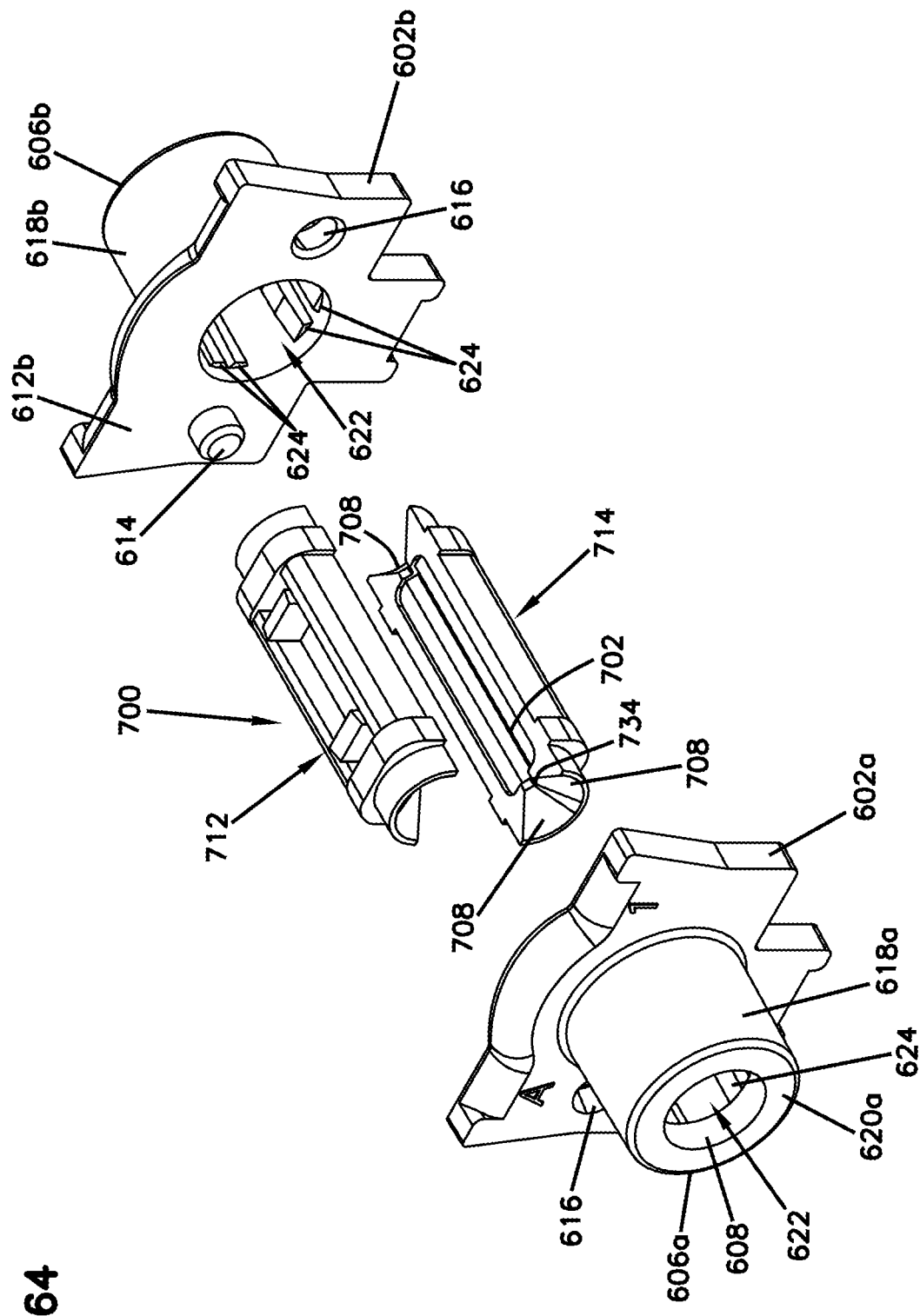
FIG. 64 is an exploded view of the alignment system of FIG. 60.

Referring to FIG. 64, the fiber alignment device 700 includes a first housing piece 712 (e.g., top piece, upper body, first part, etc.) and a second housing piece 714 (e.g., bottom piece, lower body, second part, etc.). The first and second housing pieces 712, 714 are adapted to be mated together. The fiber alignment device 700 is configured to mount in the housing 600 to form the alignment system 500 in accord with the principles of the present disclosure.

Figure 64A:
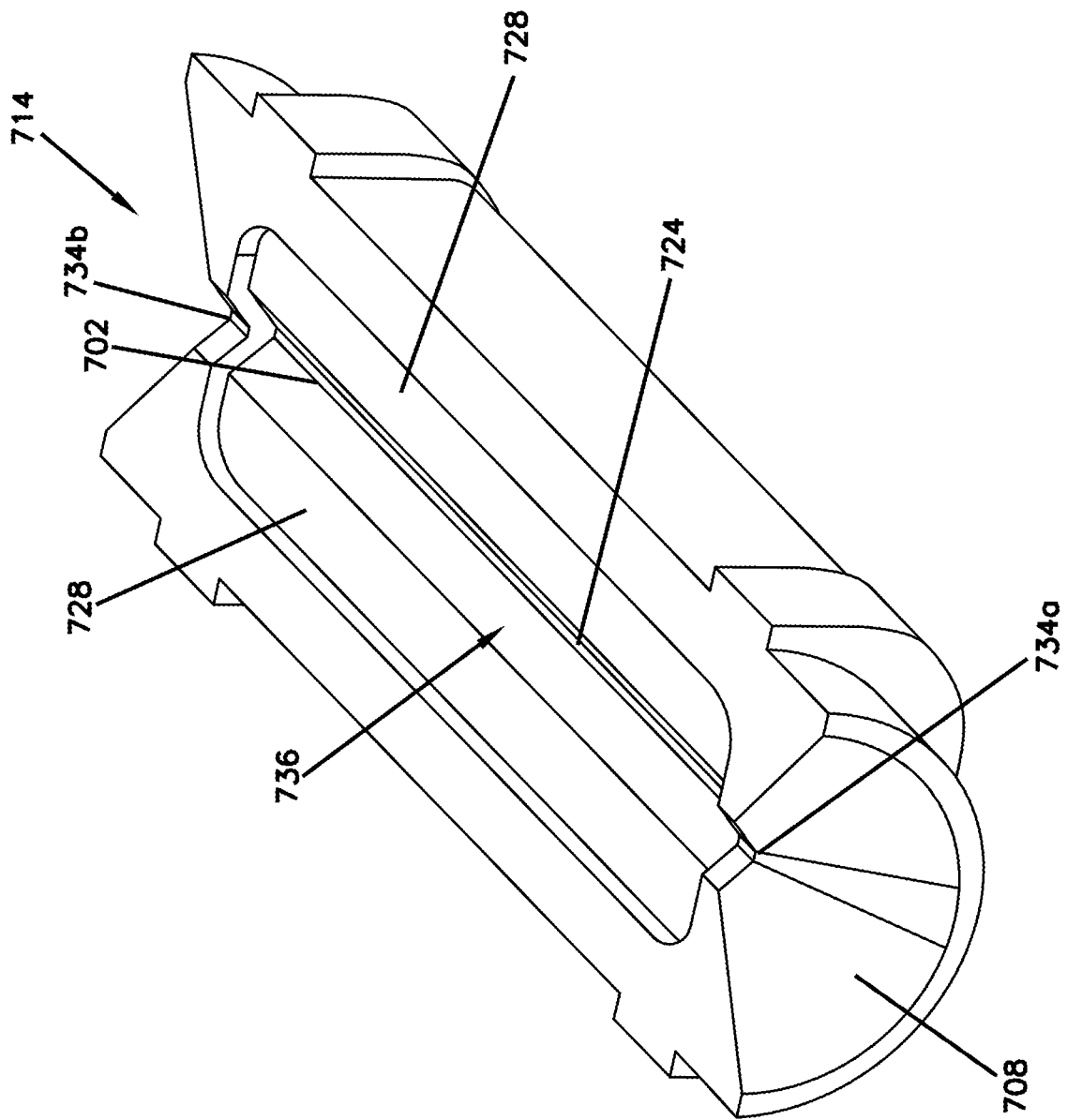
FIG. 64A is a perspective view of a housing piece shown in FIG. 64.

Turning to FIG. 64A, the second housing piece 714 defines the alignment groove structure 702 (e.g., groove-type fiber alignment structure). The alignment groove structure 702 may include a v-groove that has angled surfaces and a constant cross-section along its length. In such an example, the v-groove will have a structure that preferably provides two lines of contact with an optical fiber inserted therein. In this way, the line/point contact with the v-groove assists in providing accurate alignment of the optical fibers. It will be appreciated that the V-shape is not essential, although it is essential that there be a surface or surfaces against which the fiber contacts and is located. For example, a U-shape, or a trough shape, or other similar shape could also be used, or a radius matched to the radius of the optical fiber could be used. In other examples, rods could also be used. In other examples, a groove with straight walls (e.g., v-groove) could be used. In still other examples, a groove with convex walls could also be used.

Figure 64B:
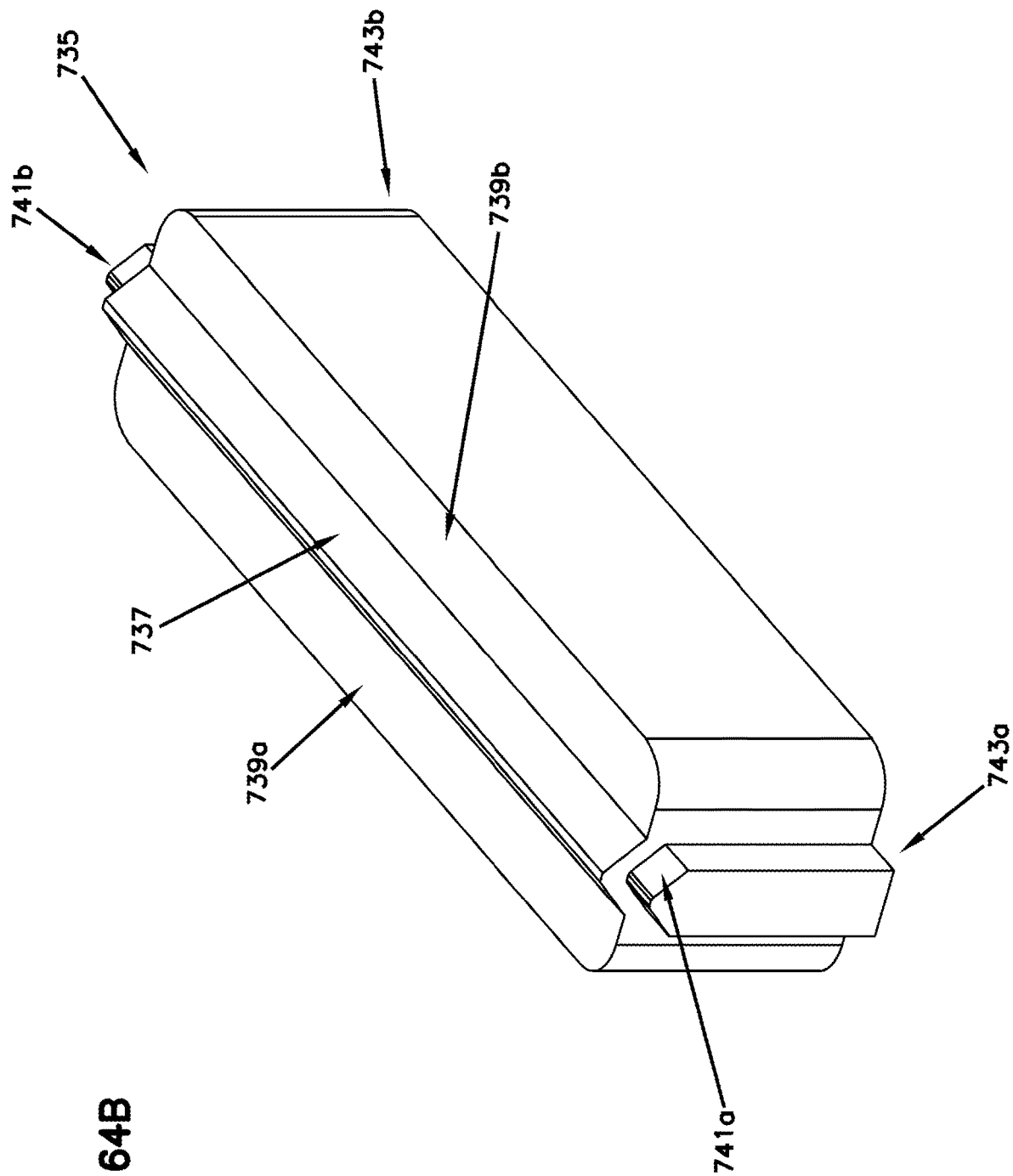
FIG. 64B is an example mold insert in accordance with the principles of the present disclosure.

The second housing piece 714 includes top surfaces 728 on opposing sides of the alignment groove structure 702. The alignment groove structure 702 and adjacent top surfaces 728 can be created using a mold such as an insert mold 735 as shown in FIG. 64B. The surfaces of the insert mold 735 can be shaped to correspond with the desired shape of the second housing piece 714. For example, the insert mold 735 can include a projection structure 737, flat molding surfaces 739a, 739b on opposite sides of the projection structure 737, and structural steps 741a, 741b respectively located at opposite ends 743a, 743b of the insert mold 735. In certain examples, the projection structure 737 can be arranged and configured to create an open top side 736 (see FIG. 64A) of the alignment groove structure 702. In certain examples, the flat molding surfaces 739a, 739b can be arranged and configured to create the top surfaces of the alignment groove structure 702, respectively. In certain examples, the structural steps 741a, 741b can be arranged and configured to create the stabilization structures 734a, 734b, respectively. This allows the depth of the alignment groove structure 702 compared to the top surfaces 728 to be accurately controlled. The alignment groove structure 702 can be easier to manufacture because there are no transitions, tapers, lead-ins or other features at the end of the alignment groove structure 702. As such, the alignment groove structure 702 can easily be surface ground or lapped to ensure a flat and smooth mold surface.

Figure 65:
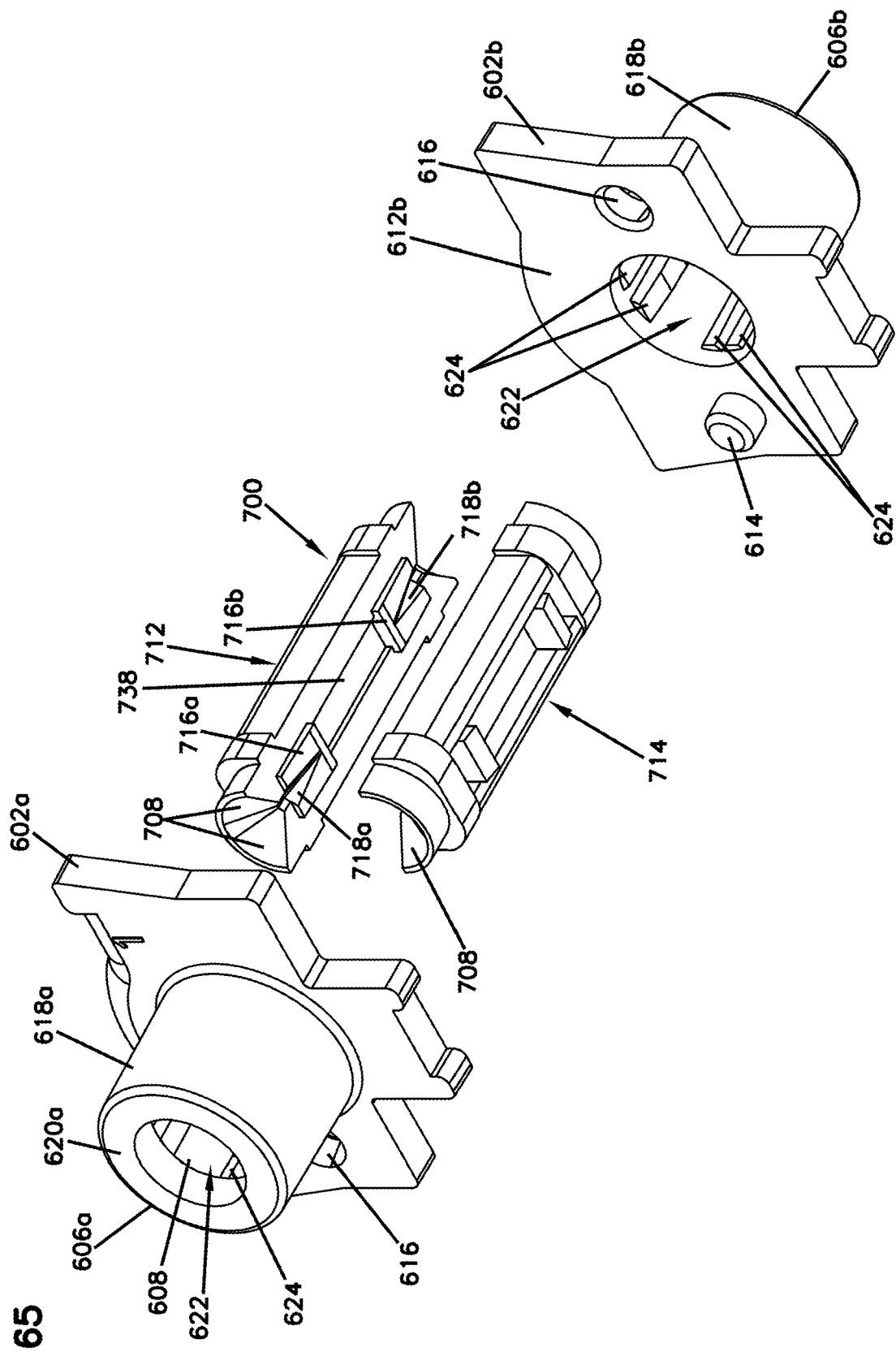
FIG. 65 is an exploded bottom view of the alignment system of FIG. 60.

Referring to FIG. 65, the first housing piece 712 includes first and second projections 716a 716b respectively positioned at the front and rear ends 704, 706 of the fiber alignment device 700. The first housing piece 712 also includes a cavity 738 between the first and second projections 716a, 716b for allowing excess gel to be collected therein. The first and second projections 716a, 716b can be arranged and configured to respectively guide first and second optical fibers 720, 722 into the alignment groove structure 702 of the fiber alignment device 700.

Figure 68:
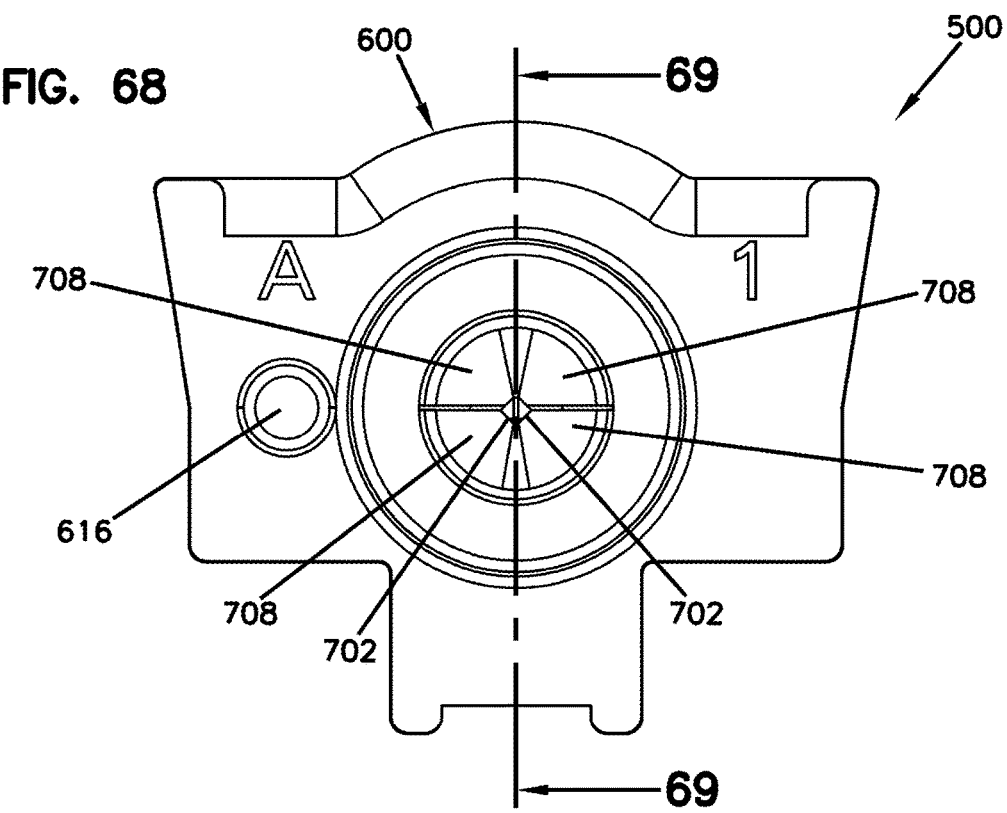
FIG. 68 is another end view of the alignment system of FIG. 60.

Referring to FIG. 68, an end view of the alignment system 500 is depicted.

Figure 69:
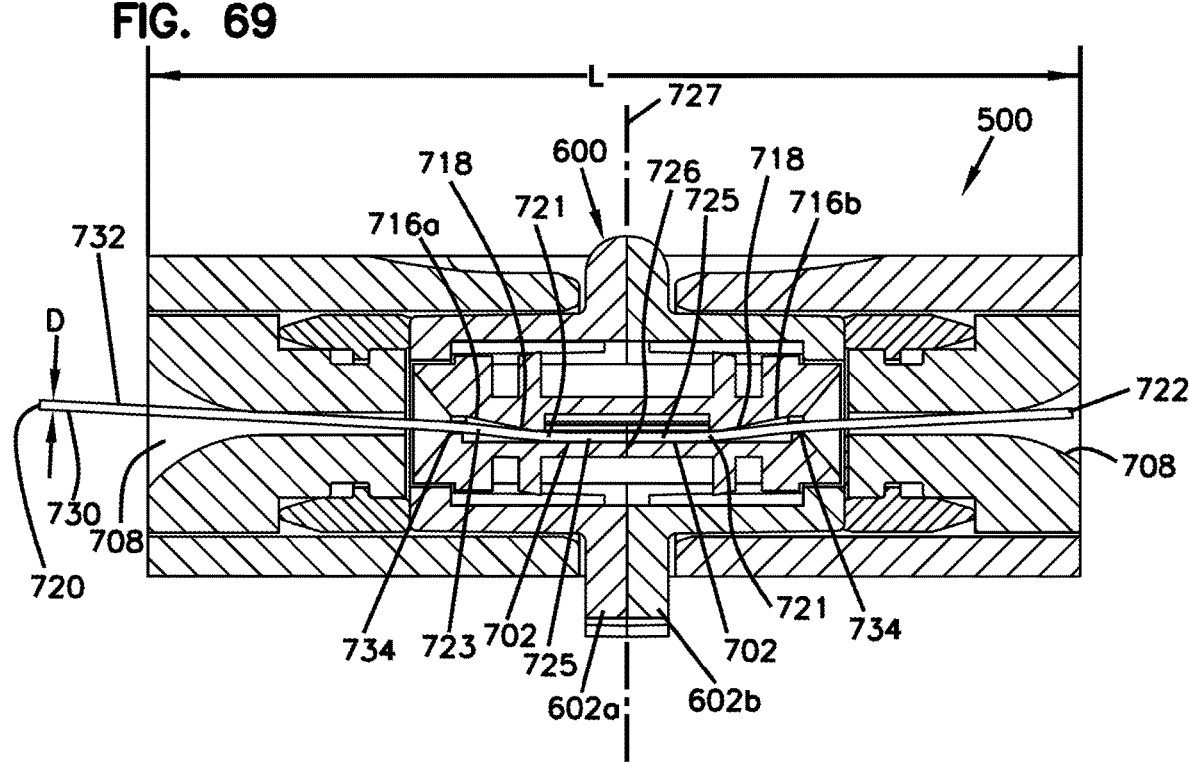
FIG. 69 is a cross-sectional view taken generally along line 69-69, FIG. 68.

FIG. 69 is a cross-sectional view of the alignment system 500 taken along line 69-69 of FIG. 68. The alignment system 500 shows the first and second optical fibers 720, 722 inserted within the fiber alignment device 700 to be optically coupled at an intended coupling location 726 (e.g., fiber to fiber interface location). The intended coupling location 726 can be positioned along a mid-plane 727 located between the front and rear ends 704 706 of the fiber alignment device 700.

Figure 70:
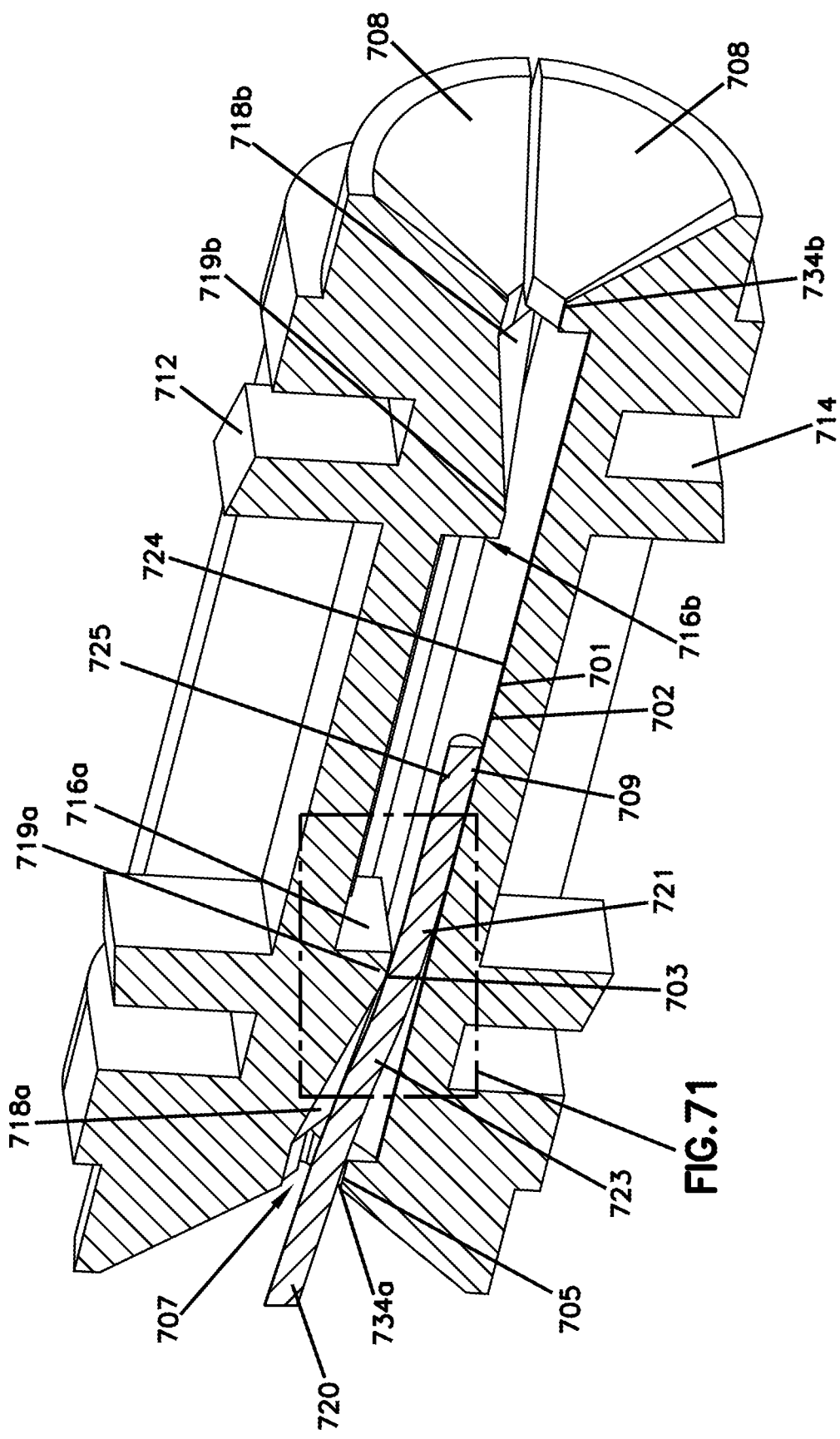
FIG. 70 is a cross-sectional view of the multi-fiber alignment device shown in FIG. 62.
Figure 71:
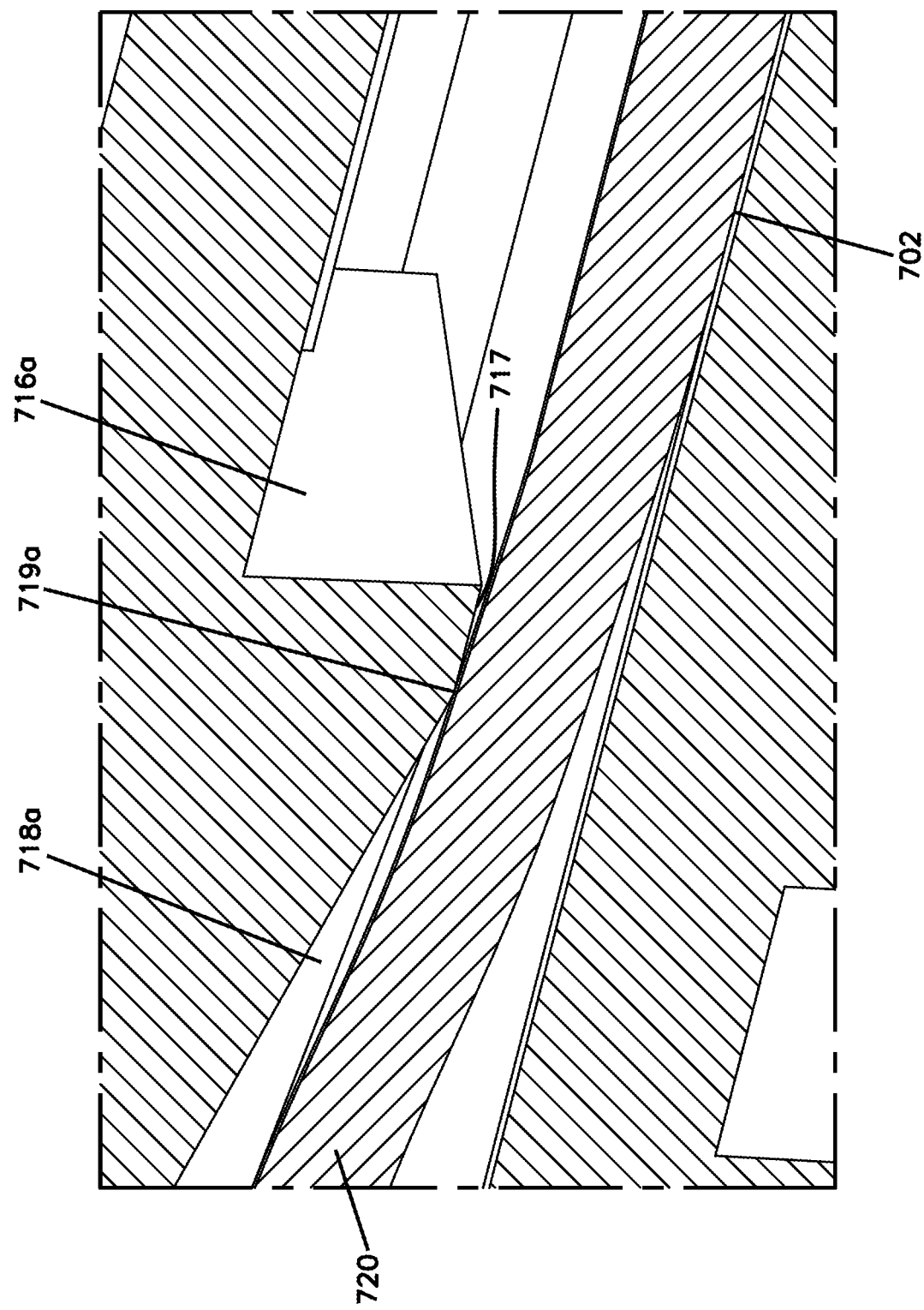
FIG. 71 is an enlarged view of a portion of FIG. 70.

Turning to FIG. 70, a cross-sectional view of the fiber alignment device 700 is depicted with the first optical fiber 720 inserted within the alignment groove structure 702. FIG. 71 is an enlarged view of a portion of FIG. 70 depicting the first angled transition surface 718a.

The fiber alignment device 700 includes first and second angled transition surfaces 718a, 718b (e.g., tapered surfaces) that are formed as part of the projections 716a, 716b. The first and second angled transition surfaces 718a, 718b are positioned between the front and rear ends 704, 706 of the fiber alignment device 700. The first and second angled transition surfaces 718a, 718b are each configured to face downward toward the alignment groove structure 702. In certain examples, the angled transition surfaces 718a, 718b can be angled relative to the fiber insertion axis 610. One advantage to having the angled transition surfaces 718a, 718b is that the first and second angled transition surfaces 718a, 718b can eliminate the need for any transitions, tapers, or lead-ins at the end of the alignment groove structure 702. It will be appreciated that the first and second angled transition surfaces 718a, 718b are arranged and configured with the same construction and features. For the sake of brevity, only the first angled transition surface 718a will be described herein with reference to FIGS. 72-85. It will be appreciated that the same description could also apply to the second angled transition surface 718b.

The fiber alignment device 700 also includes first and second stabilization structures 734a, 734b (e.g., fiber stabilization structure) positioned at the front and rear ends 704, 706 of the fiber alignment device 700. The second housing piece 714 includes the stabilization structures 734a, 734b. The alignment groove structure 702 and the first and second stabilization structures 734a, 734b each face in an opposing direction as compared to the first and second projections 716a 716b. The stabilization structures 734a, 734b are elevated above the alignment groove structure 702. The stabilization structures 734a, 734b face upward away from the alignment groove structure 702. The first angled transition surface 718a is positioned between the first stabilization structure 734a and the mid-plane 727 of the fiber alignment device 700 and the second angled transition surface 718b is positioned between the second stabilization structure 734b and the mid-plane 727 of the fiber alignment device 700. The first angled transition surface 718a can be positioned between contact locations 733 of the stabilization structure 734 and the alignment groove structure 702. The fiber insertion axis 610 intersects the first and second angled transition surfaces 718a, 718b and is above the stabilization structures 734a, 734b.

In certain examples, the first and second angled transition surfaces 718a, 718b are respectively axially positioned between the stabilization structures 734a, 734b and the alignment groove structure 702. It will be appreciated that the first and second stabilization structures 734a, 734b are arranged and configured with the same construction and features. For the sake of brevity, only the first stabilization structure 734a will be described herein with reference to FIGS. 72-85. It will be appreciated that the same description could also apply to the second stabilization structure 734b.

The fiber alignment device 700 includes a fiber path for receiving an optical fiber. The fiber path can be defined between the first and second housing pieces 712, 714. The fiber path includes a first fiber contact location 701 (see FIG. 70) provided by the alignment groove structure 702, a second fiber contact location 703 (see FIG. 70) provided by a deflection structure 719a (see FIG. 70) of the projection 716a, and a third fiber contact location 705 (see FIG. 70) provided by the first stabilization structure 734a. The first fiber contact location 701 can be spaced from the third fiber contact location 705 in an orientation along the fiber path 707. The second fiber contact location 703 can be positioned between the first and third fiber contact locations 701, 705 in the orientation along the fiber path 707.

Figure 78:
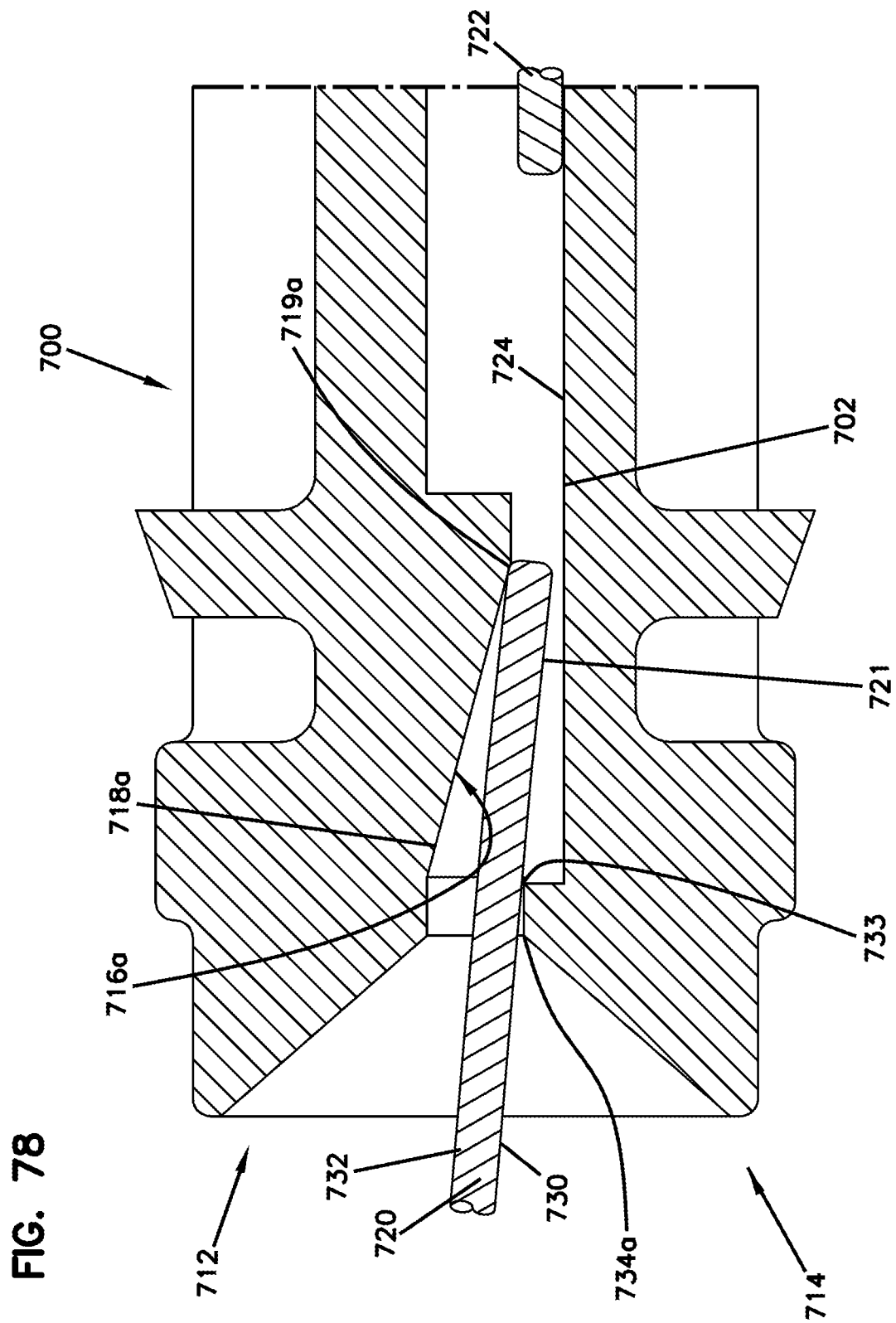

The first optical fiber 720 includes a first side 730 (see FIG. 78) and an opposite second side 732 (see FIG. 78). When the first optical fiber 720 has been fully inserted along the fiber path 707: a) the first side 730 of the optical fiber 720 contacts the second fiber contact location 703 causing the first optical fiber 720 to be deflected such that the second side 732 of the first optical fiber 720 comes into contact with the first fiber contact location 701 and the third fiber contact location 705; and b) the first optical fiber 720 can be flexed between the first and third fiber contact locations 701, 705 by engagement with the second fiber contact location 703. The inherent elasticity of the flexed optical fiber 720 causes an end portion 709 of the first optical fiber 720 to be biased within the alignment groove structure 702 at the first fiber contact location 701.

Figure 72:
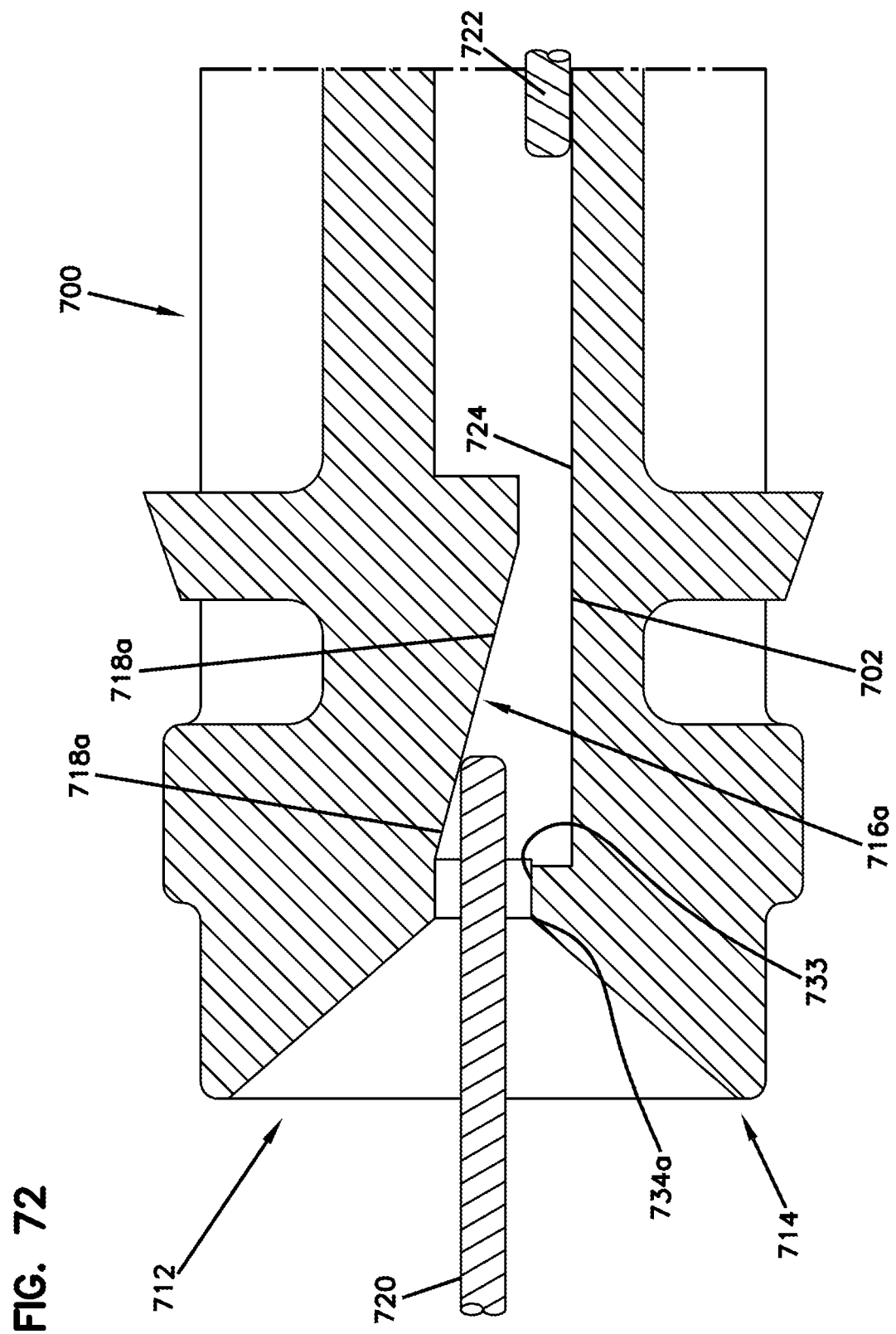
FIGS. 72-82 are schematic views illustrating step-by-step movements of an optical fiber being inserted within the multi-fiber alignment device of FIG. 62.
Figure 73:
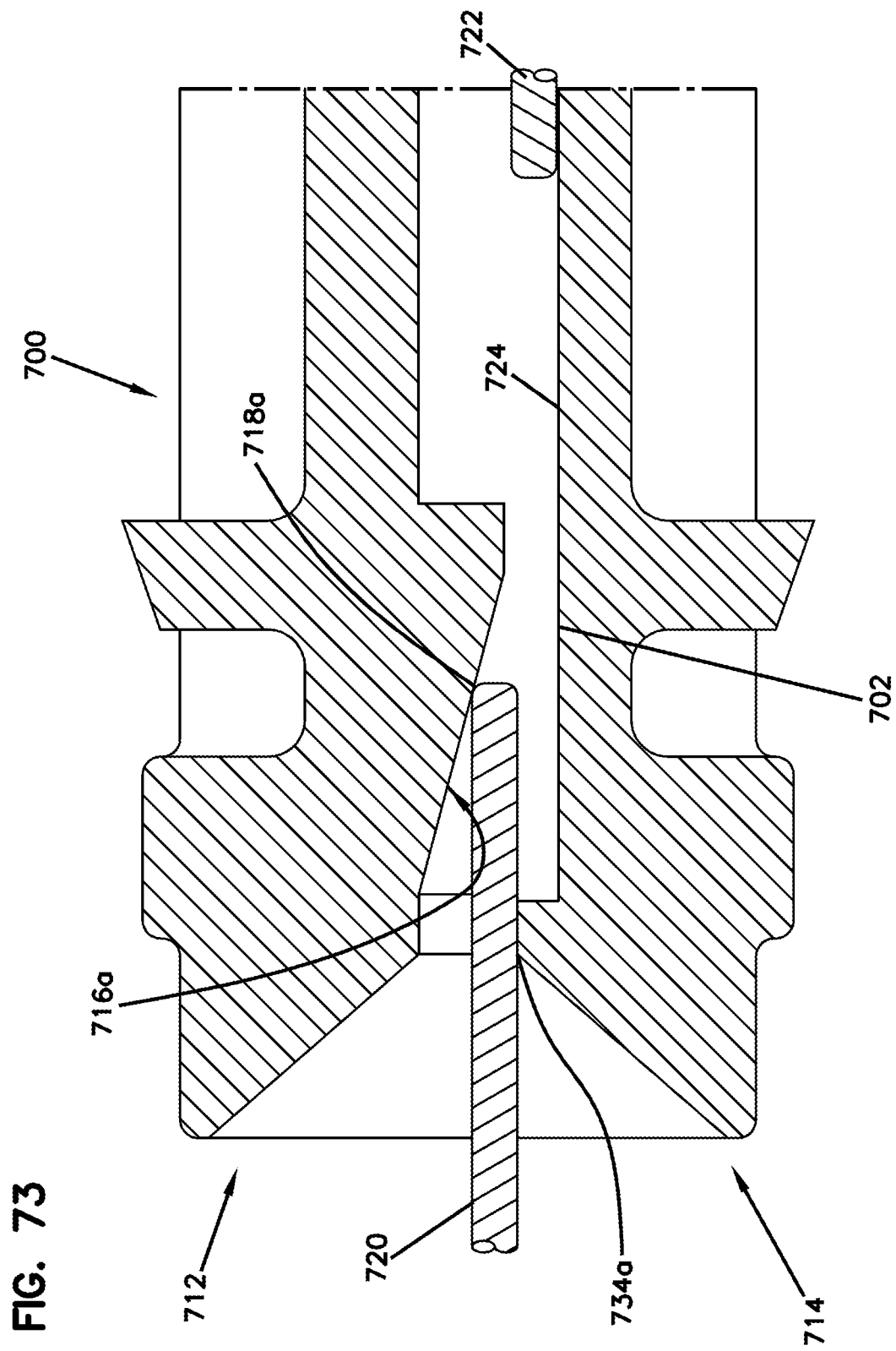
Figure 74:
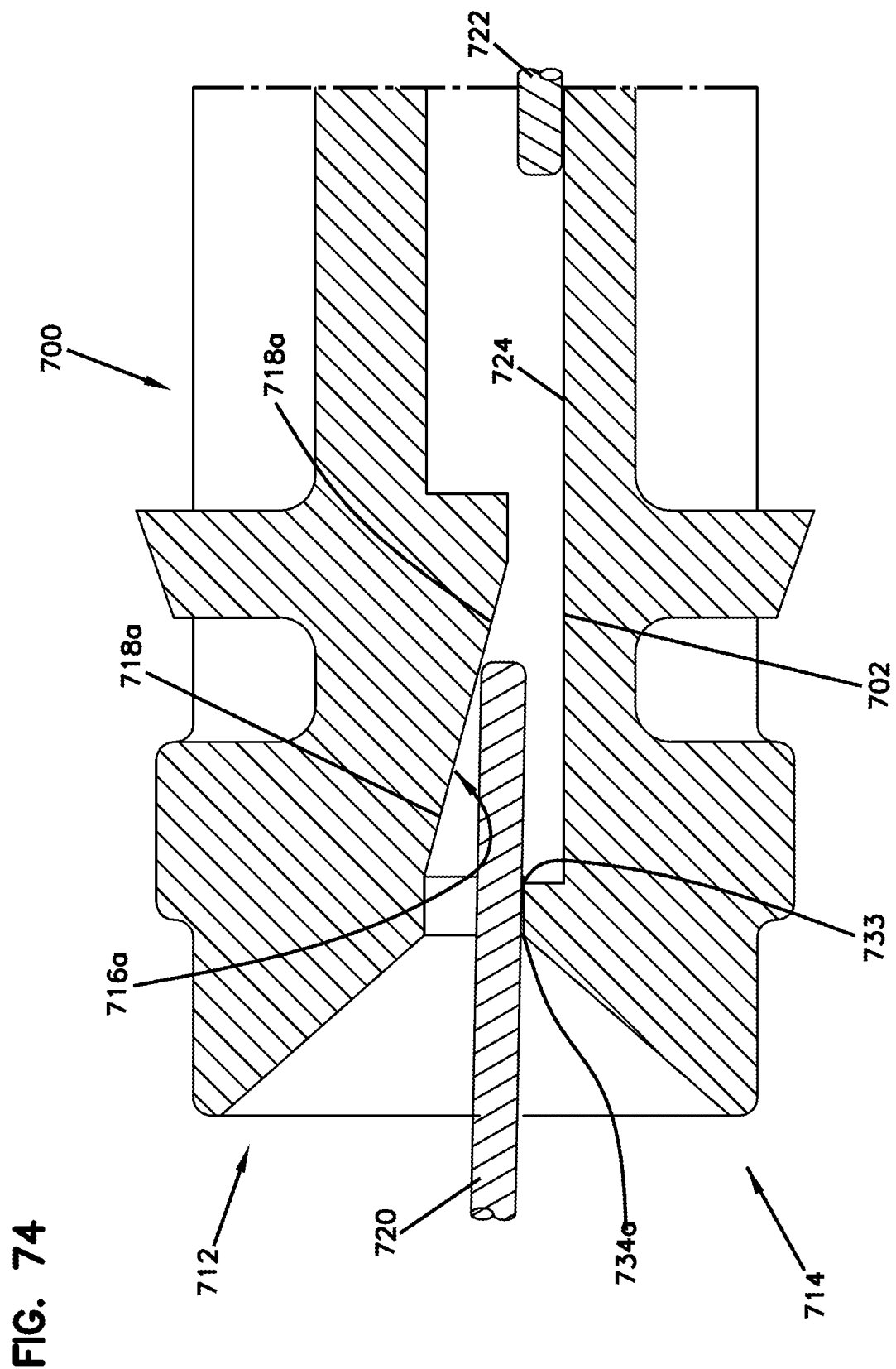
Figure 75:
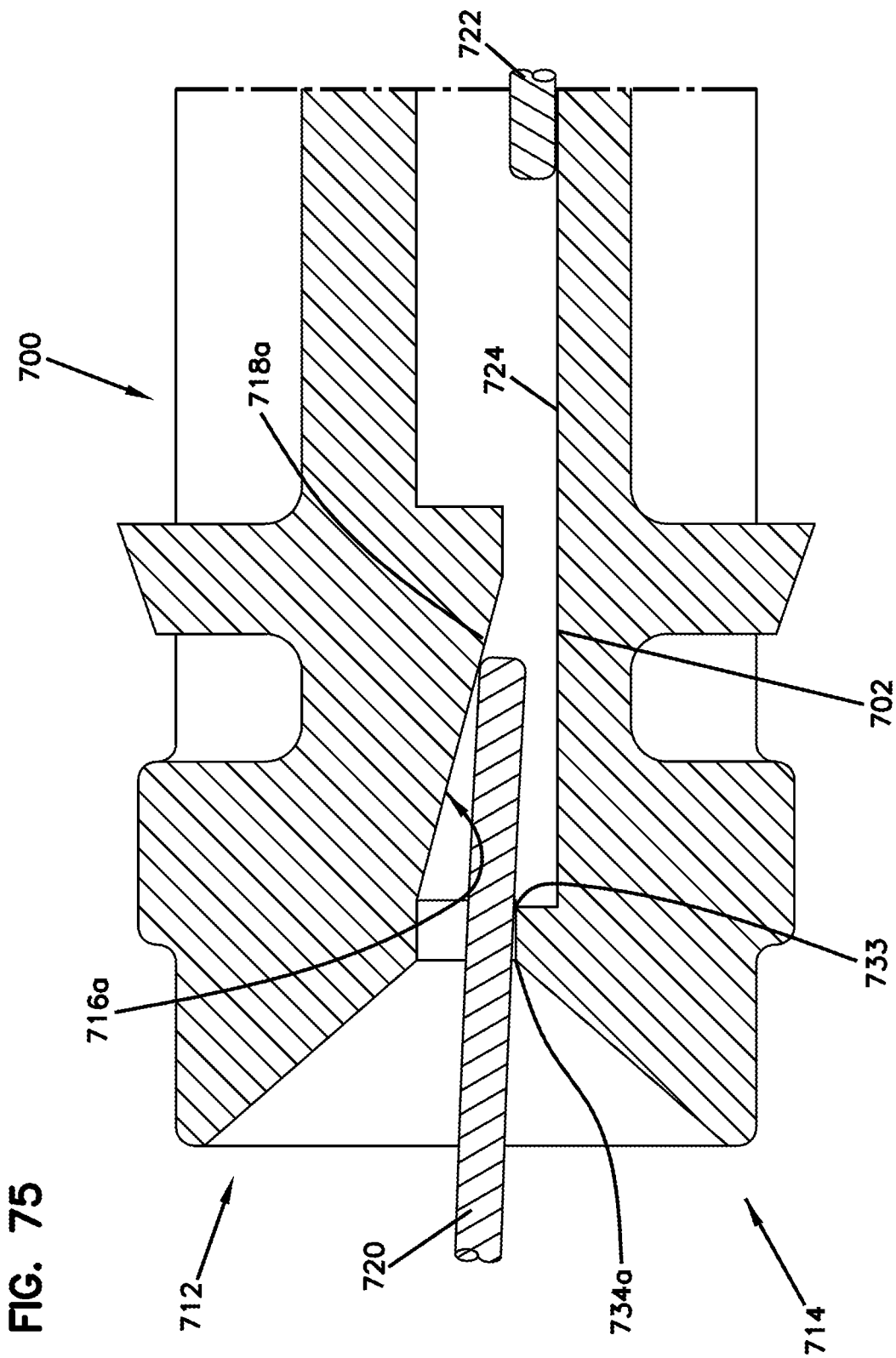
Figure 76:
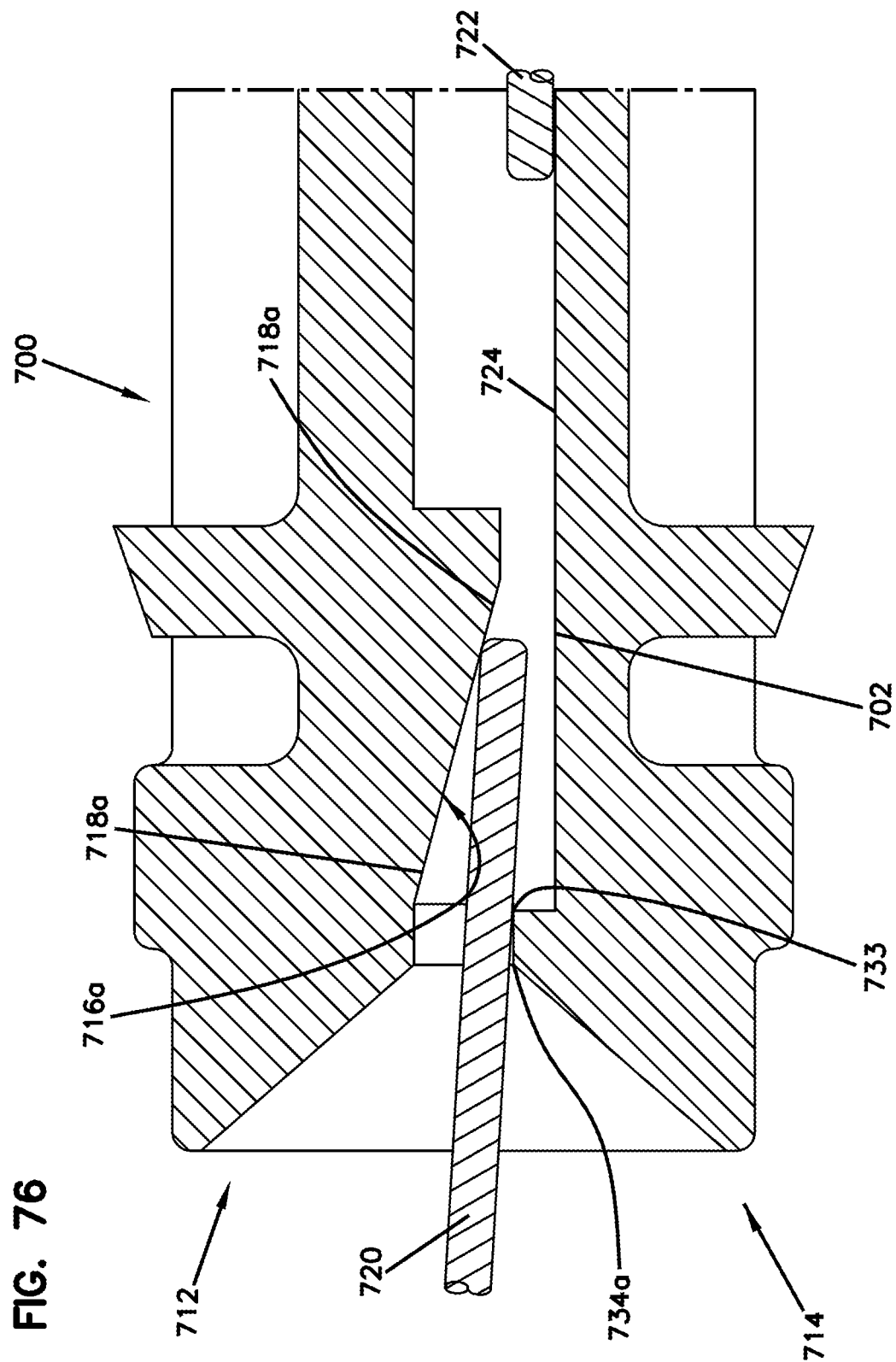
Figure 77:
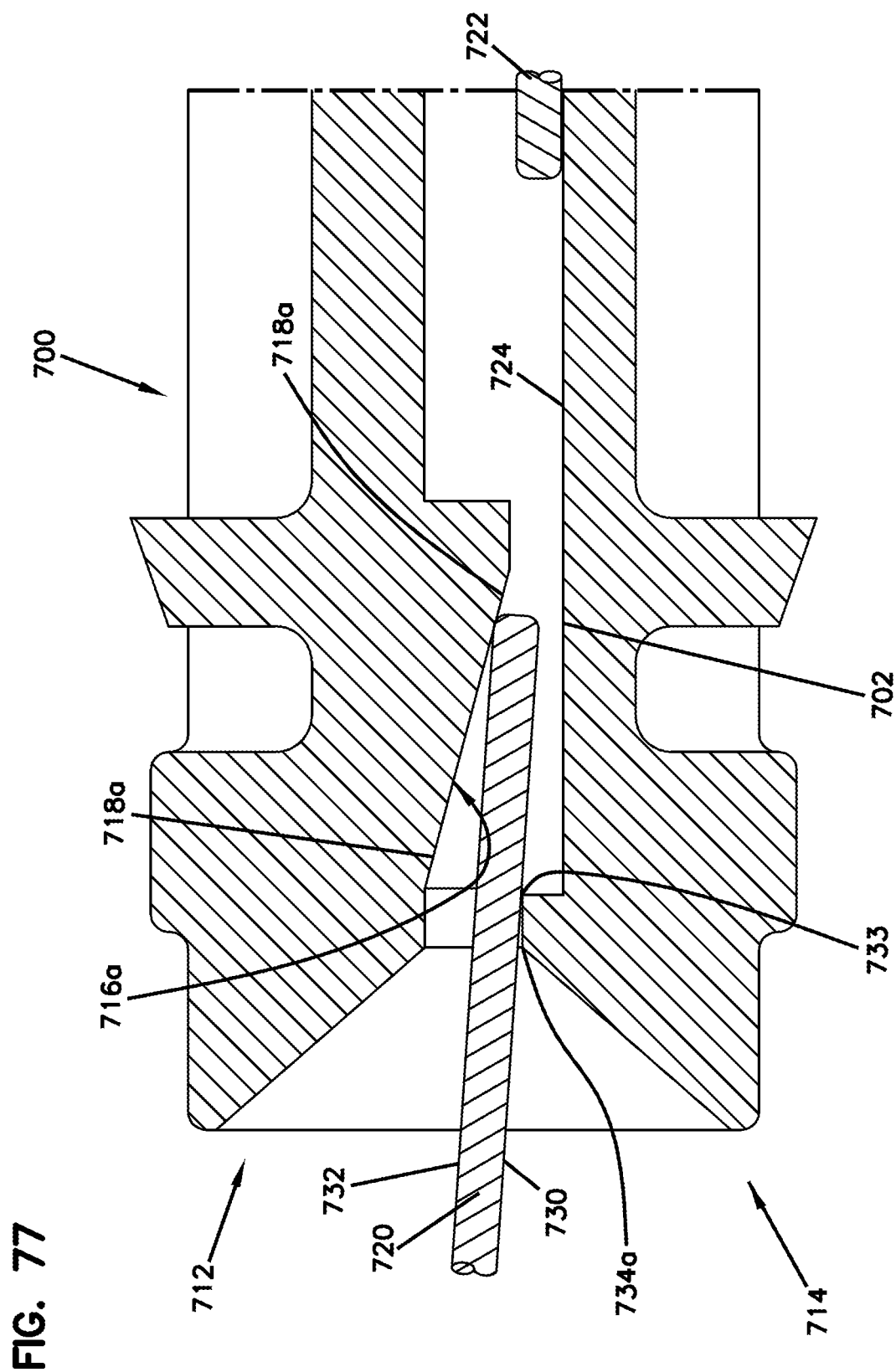

Referring to FIGS. 72-73, a schematic view of the fiber alignment device 700 is depicted with the first optical fiber 720 shown inserted therein through the front end 704. The first optical fiber 720 can enter straight therein and can be guided by the transition portions 708. The first optical fiber 720 can encounter three different structures of the fiber alignment device 700 when being inserted therein. The three different structures of the fiber alignment device 700 include the alignment groove structure 702, the first angled transition surface 718a, and the stabilization structure 734a.

FIGS. 74-77 show further increments of the first optical fiber 720 during a relative movement of the first optical fiber 720 through the fiber insertion opening 710 of the fiber alignment device 700. While the first optical fiber 720 is being inserted further through the fiber alignment device 700, the first optical fiber 720 can engage with the first angled transition surface 718a. The first angled transition surface 718a deflects the first optical fiber 720 to an angled orientation relative to the alignment groove structure 702 and the fiber insertion axis 610. The first angled transition surface 718a can be arranged and configured to angle downward toward the alignment groove structure 702 and can be oblique relative to the fiber insertion axis 610. That is, the first angled transition surface 718a can provide a tapered lead-in to direct the first optical fiber 720 into the alignment groove structure 702 through the larger open top side 736 (see FIG. 64A) of the alignment groove structure 702. In certain examples, the first angled transition surface 718a can have a v-groove like configuration and can widen (e.g., in a funnel-like manner) as it extends away from the mid-plane 727 of the fiber alignment device 700 and toward the front end 704 of the fiber alignment device 700.

While the first optical fiber 720 is inserted further into the fiber alignment device 700, the first angled transition surface 718a causes the first optical fiber 720 to bend downward and transition into the alignment groove structure 702. The first optical fiber 720 forms a bend portion 721 while under the stress of the first angled transition surface 718a. When the first optical fiber 720 starts to bend, the first optical fiber 720 engages the contact locations 733 of the stabilization structure 734a. The stabilization structure 734a engages the first side 730 of the first optical fiber 720 to support the first optical fiber 720 when the first optical fiber 720 moves under stress of the first angled transition surface 718a.

FIGS. 78-82 are schematics that show the first optical fiber 720 in discrete positions as the first optical fiber 720 is inserted further into the fiber alignment device 700.

The first optical fiber 720 has been inserted to engage the deflection structure 719a (e.g., fiber deflection structure) of the projection 716a. The deflection structure 719a engages the second side 732 of the first optical fiber 720 to deflect the first optical fiber 720 such that the first optical fiber 720 flexes into the alignment groove structure 702 at an angle.

Figure 79:
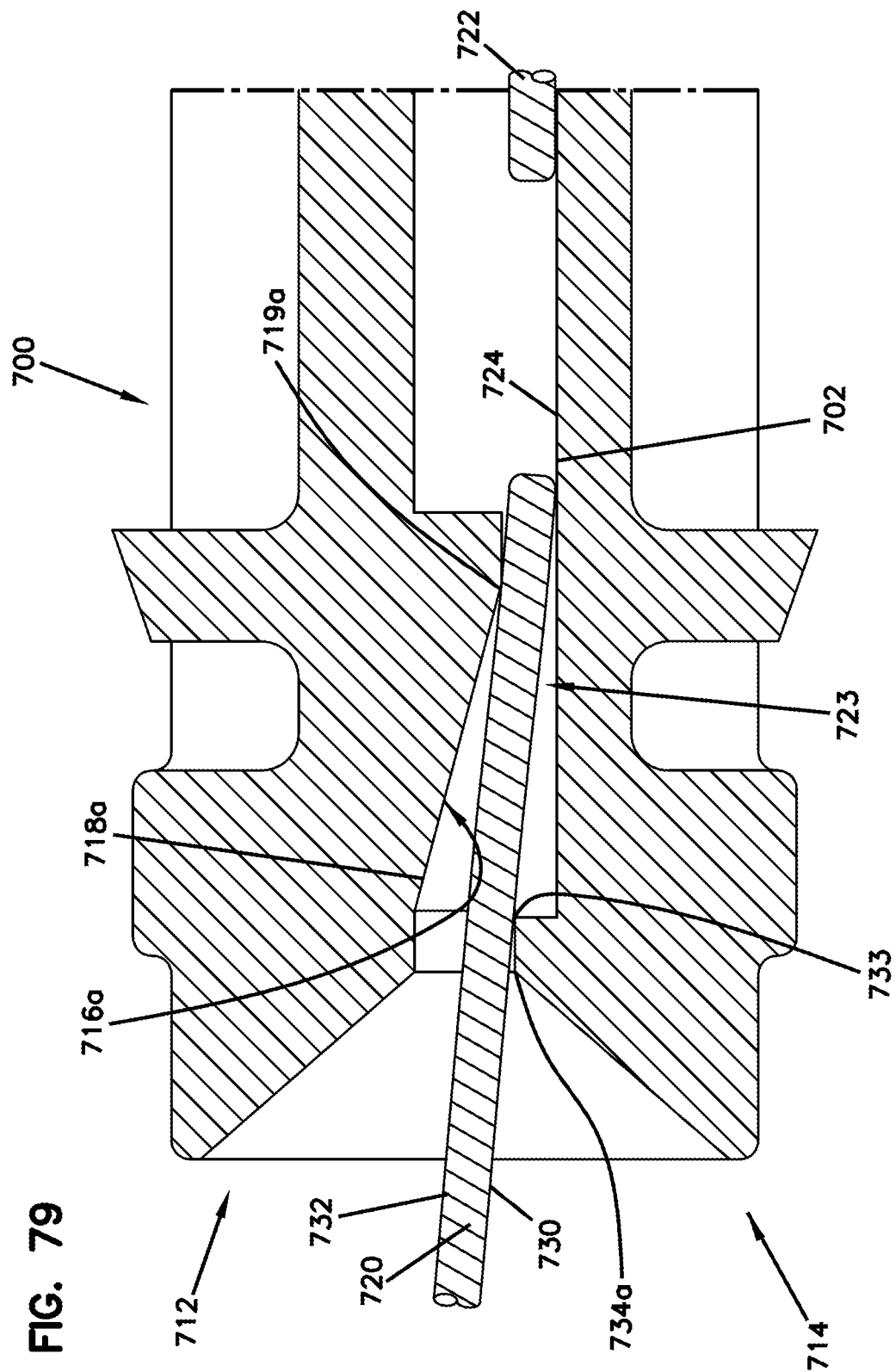

FIG. 79 depicts when the first optical fiber 720 hits contact alignment surfaces 724 of the alignment groove structure 702, the inherent flexibility of the first optical fiber 720 causes the first optical fiber 720 to flex again. The contact alignment surfaces 724 of the alignment groove structure 702 face upward in the same direction as the contact locations 733 of the stabilization structure 734a.

The position of the deflection structure 719a and the alignment groove structure 702 can cause the first optical fiber 720 to be configured in a state of flex such that as the first optical fiber 720 moves further into the fiber alignment device 700, the first optical fiber 720 can start to lay down flat in the alignment groove structure 702. The alignment groove structure 702 engages the first side 730 of the first optical fiber 720 when the first optical fiber 720 is positioned therein. The bend portion 721 of the first optical fiber 720 provides a spring force to hold the first optical fiber 720 in the alignment groove structure 702.

Figure 80:
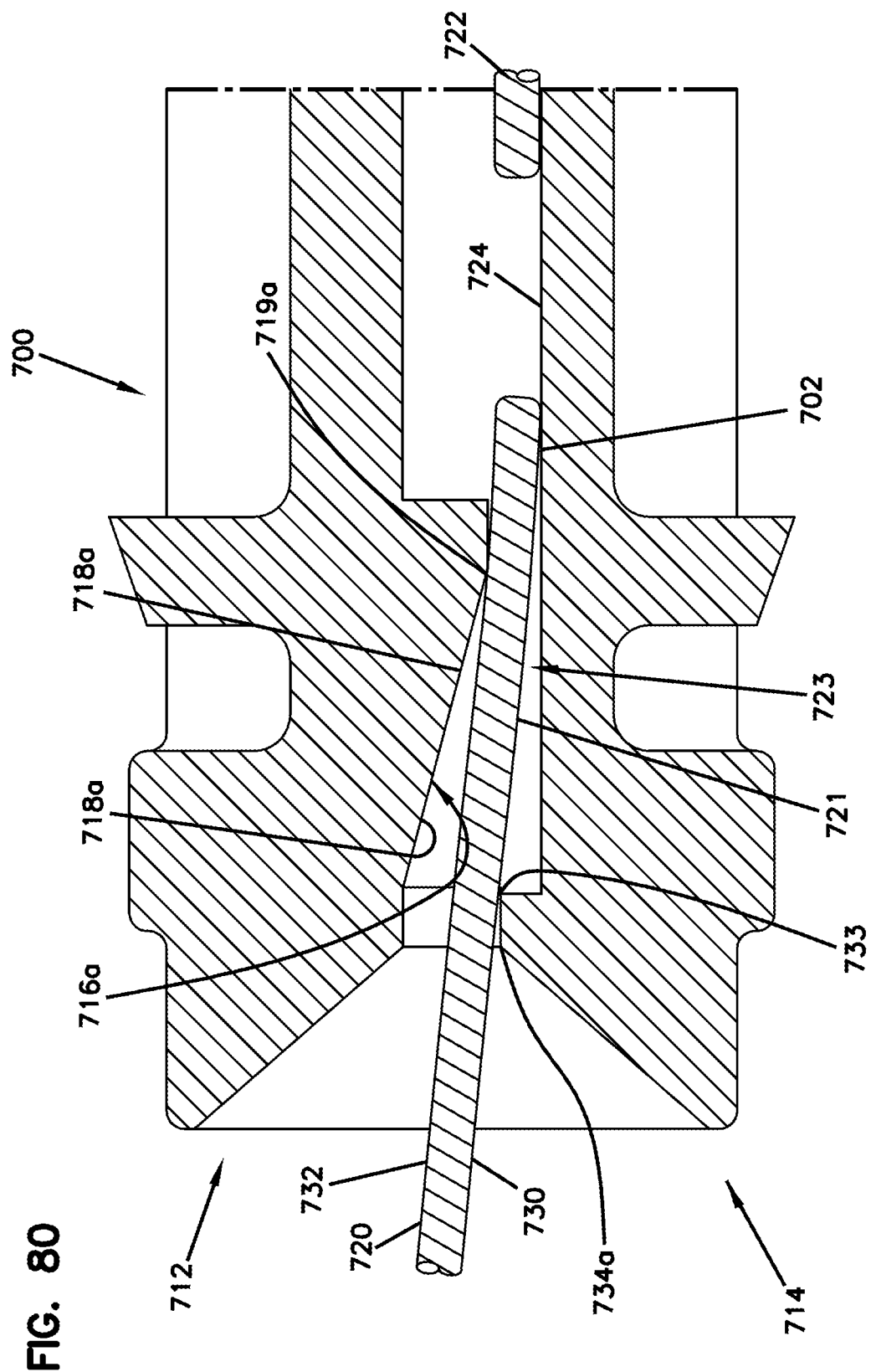
Figure 81:
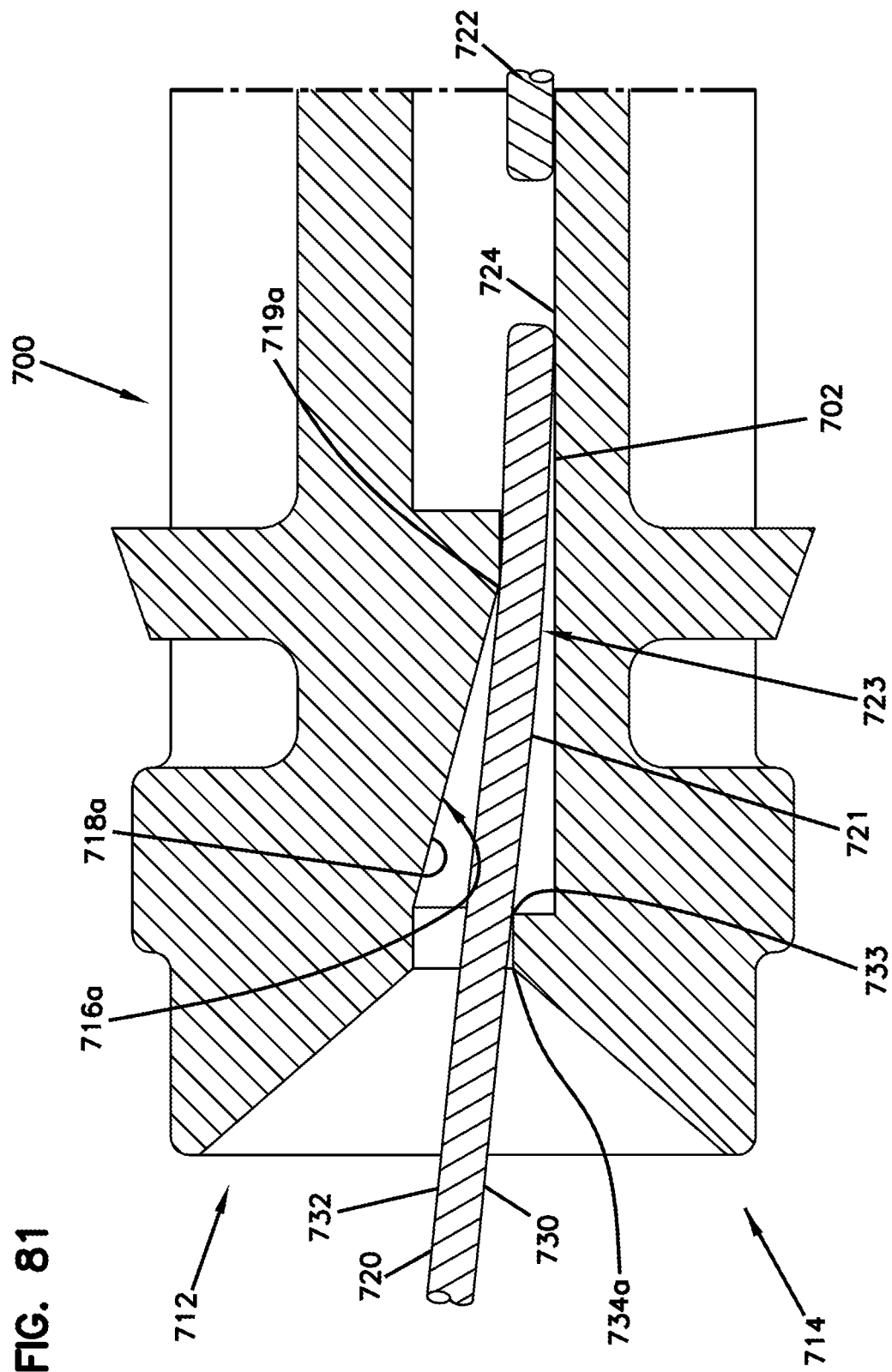

Referring to FIGS. 80-81, the deflection structure 719a can create a stress on the first optical fiber 720 to force the first optical fiber 720 downward while the stabilization structure 734a supports and stabilizes the first optical fiber 720 while the first optical fiber 720 as the first optical fiber 720 is inserted into fiber alignment device 700. The stabilization structure 734a causes the first optical fiber 720 to form a "S" curve. That is, the deflection structure 719a and the stabilization structure 734a are relatively positioned to cause a slight "S" bend 723 in the first optical fiber 720 between the deflection structure 719a and the stabilization structure 734a.

Figure 82:
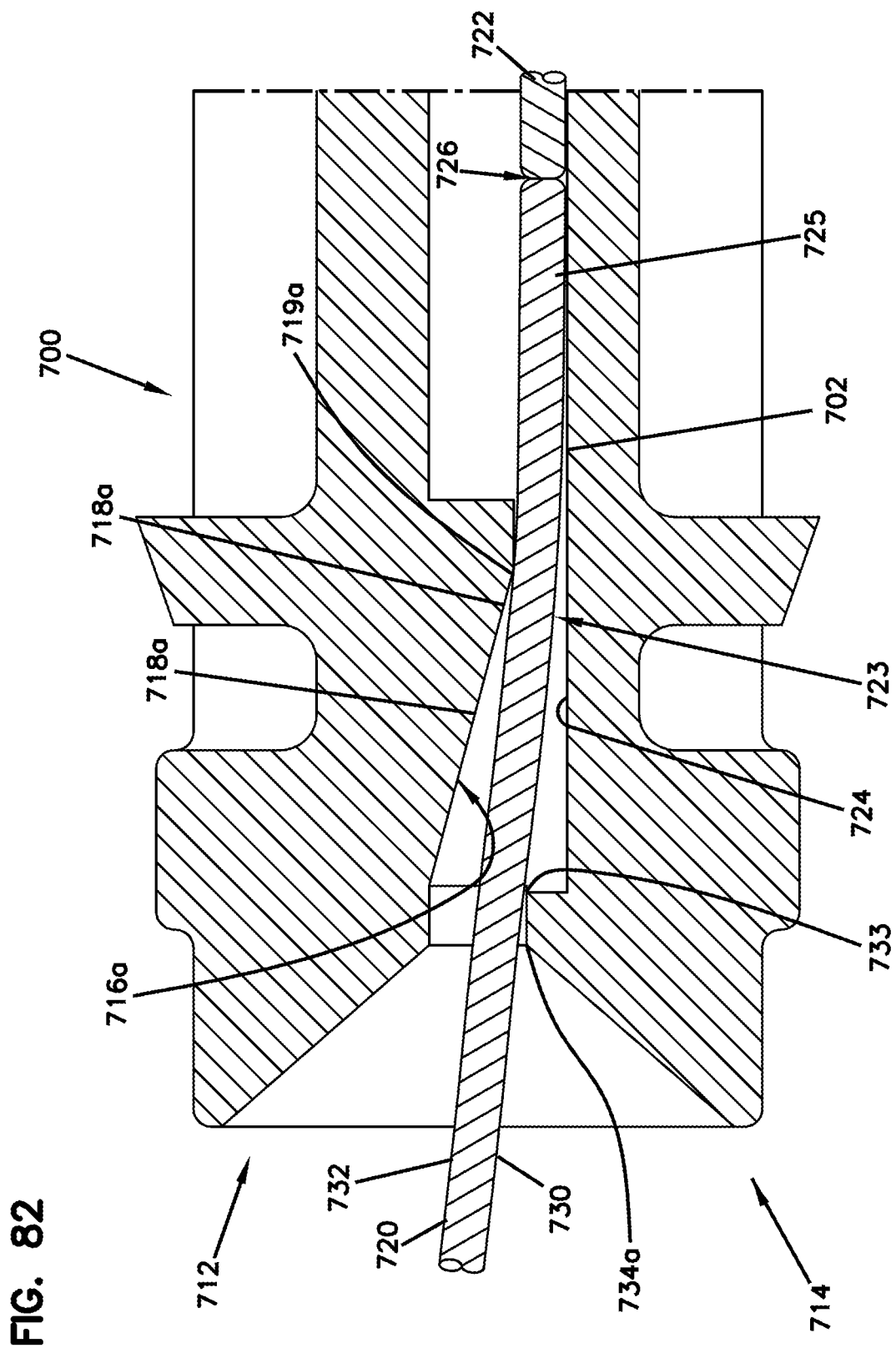

Referring to FIG. 82, the first optical fiber 720 has elastic properties that allows the first optical fiber 720 to lay flat within the alignment groove structure 702 and to create a flatten fiber portion 725. The flatten fiber portion 725 can be positioned between the deflection structure 719a and the mid-plane 727. The first optical fiber 720 can hit contact surfaces 724 of the fiber alignment groove 702 such that the first optical fiber 720 remains down and flat within the fiber alignment groove 702. The elasticity of the first optical fiber 720 holds the first optical fiber 720 within the fiber alignment groove 702. As such, there is no need for a rigid bore style or spring style alignment.

Turning again to FIG. 69, an endface 717 (see FIG. 71) of the first angled transition surface 718a and the contact locations 733 of the stabilization structure 734a may overlap (e.g., the endface 717 may be located lower than the top of the stabilization structure 734a). In some examples, the vertical spacing between the bottom endface 717 of the first angled transition surface 718a and the top contact locations 733 of the stabilization structure 734a can be less than a diameter D of the first optical fiber 720.

In certain examples, the fiber alignment device 700 has a length L of about 8 mm, although variations are possible. The point of deflection of the first optical fiber 720 can be within about 5 mm of the intended coupling location 726 (e.g., fiber to fiber interface location) of the first optical fiber 720, although alternatives are possible.

Various modifications and alterations of this disclosure will become apparent to those skilled in the art without departing from the scope and spirit of this disclosure, and it should be understood that the scope of this disclosure is not to be unduly limited to the illustrated examples set forth herein.

What is claimed is:

1. An alignment system comprising:
a first housing piece without v-grooves;
a second housing piece adapted to mate with the first housing piece via a snap-fit connection such that the first housing piece is positioned as a top cover over the second housing piece;
a groove-type alignment structure defined in the second housing piece; and
a plate including a main body and a plurality of elastic members separated into independent elastic members by slots defined in the main body, wherein free ends of the plurality of elastic members cooperate with the groove-type alignment structure, wherein the free ends of the plurality of elastic members each include a tab portion and extensions that extend upwardly from opposite sides of the tab portion in a direction toward the first housing piece, the plate being positioned between the first and second housing pieces;
wherein the second housing piece includes recessed regions formed in a top surface thereof, the recessed regions being centrally positioned between front and rear ends of the second housing piece.

2. The alignment system of claim 1, wherein the groove-type alignment structure includes rods.

3. The alignment system of claim 1, wherein the groove-type alignment structure is integral with the second housing piece.

4. The alignment system of claim 1, wherein the plate comprises metal.

5. The alignment system of claim 1, wherein the plurality of elastic members include base ends monolithically connected with the main body, the plurality of elastic members extending from opposite ends of the main body such that the free ends of the plurality of elastic members are opposing one another.

6. The alignment system of claim 5, wherein the opposing free ends of the plurality of elastic members are separated by an intermediate gap centrally located between opposite ends of the main body of the plate.

7. The alignment system of claim 5, wherein the free ends of the plurality of elastic members project from the main body of the plate closer to the groove-type alignment structure.

8. An alignment system comprising:
a first housing piece without v-grooves;
a second housing piece adapted to mate with the first housing piece via a snap-fit connection such that the first housing piece is positioned as a top cover over the second housing piece;
a groove-type alignment structure defined in the second housing piece; and
a plate including a main body and a plurality of elastic members separated into independent elastic members by slots defined in the main body, wherein the plurality of elastic members cooperate with the groove-type alignment structure, the plate being positioned between the first and second housing pieces;
wherein the plurality of elastic members include base ends monolithically connected with the main body, the plurality of elastic members extending from opposite ends of the main body such that free ends of the plurality of elastic members are opposing one another;
wherein the free ends of the plurality of elastic members each include a tab portion that projects from the main body of the plate closer to the groove-type alignment structure; and
wherein the free ends of the plurality of elastic members include extensions that extend upwardly from opposite sides of the tab portions in a direction toward the first housing piece.

* * * * *